US 10,131,146 B2

(12) United States Patent
Okushima et al.

(10) Patent No.: US 10,131,146 B2
(45) Date of Patent: Nov. 20, 2018

(54) LIQUID EJECTION HEAD AND LIQUID EJECTION APPARATUS

(71) Applicant: CANON KABUSHIKI KAISHA, Tokyo (JP)

(72) Inventors: Shingo Okushima, Kawasaki (JP); Seiichiro Karita, Saitama (JP); Takatsuna Aoki, Yokohama (JP); Noriyasu Nagai, Tokyo (JP); Eisuke Nishitani, Tokyo (JP); Yumi Komamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/383,204

(22) Filed: Dec. 19, 2016

(65) Prior Publication Data

US 2017/0197409 A1  Jul. 13, 2017

(30) Foreign Application Priority Data

Jan. 8, 2016  (JP) .................................. 2016-003082
Dec. 14, 2016 (JP) .................................. 2016-242619

(51) Int. Cl.
*B41J 2/145* (2006.01)
*B41J 2/14* (2006.01)

(52) U.S. Cl.
CPC ............. *B41J 2/145* (2013.01); *B41J 2/1404* (2013.01); *B41J 2/14145* (2013.01); *B41J 2202/12* (2013.01)

(58) Field of Classification Search
CPC ....... B41J 2/145; B41J 2/1404; B41J 2/14145
See application file for complete search history.

(56) References Cited

U.S. PATENT DOCUMENTS 7,128,406 B2  10/2006  Dixon et al.
8,002,392 B2   8/2011  Lee et al.
(Continued)

FOREIGN PATENT DOCUMENTS

EP    2 371 545 A1   10/2011
JP    2002-533247 A  10/2002
(Continued)

OTHER PUBLICATIONS

Extended European Search Report dated Jun. 27, 2017, in European Patent Application No. 17000023.6.
(Continued)

*Primary Examiner* — Jason Uhlenhake
(74) *Attorney, Agent, or Firm* — Fitzpatrick, Cella, Harper & Scinto

(57) ABSTRACT

Provided is a liquid ejection head comprising: an ejection opening row along a first direction; a pressure chamber with print-element; a passage communicating with the pressure chamber; a supply opening row along the first direction with supply openings extending in a second direction to supply liquid to the passage; a collection opening row along the first direction with collection openings extending in the second direction to collect a liquid from the passage; a first common supply passage along the first direction to supply a liquid to the supply opening row; a first common collection passage along the first direction to collect a liquid from the collection opening row; a first supply side communication opening extending in the second direction to supply a liquid to the first common supply passage; and a first collection side communication opening extending in the second direction to collect a liquid from the first common collection passage, wherein at least one of the first supply side communication opening and the first collection side communication opening is provided at a plurality of positions.

36 Claims, 48 Drawing Sheets

(56) References Cited

U.S. PATENT DOCUMENTS

| | | | |
|---|---|---|---|
| 8,517,518 B2 | 8/2013 | Kashu et al. | |
| 9,162,453 B2 | 10/2015 | Cruz-Uribe et al. | |
| 9,724,926 B2 | 8/2017 | Keefe et al. | |
| 2003/0058307 A1 | 3/2003 | Eguchi et al. | |
| 2008/0204533 A1 | 8/2008 | Nathan et al. | |
| 2010/0208010 A1* | 8/2010 | Inoue | B41J 2/14145 |
| | | | 347/85 |
| 2012/0007921 A1 | 1/2012 | Govyadinov et al. | |
| 2014/0078224 A1 | 3/2014 | Park et al. | |

FOREIGN PATENT DOCUMENTS

| | | |
|---|---|---|
| JP | 2008-173955 A | 7/2008 |
| JP | 2009-179049 A | 8/2009 |
| JP | 2009-233945 A | 10/2009 |
| JP | 2011-062867 A | 3/2011 |
| JP | 2015-051569 A | 3/2015 |
| WO | 2010/044775 A1 | 4/2010 |
| WO | 2013/162606 A1 | 10/2013 |
| WO | 2017/010996 A1 | 1/2017 |

OTHER PUBLICATIONS

U.S. Appl. No. 15/388,430, Shingo Okushima Seiichiro Karita Takatsuna Aoki Noriyasu Nagai Eisuke Nishitani Yoshiyuki Nakagawa, filed Dec. 22, 2016.

U.S. Appl. No. 15/388,792, Shingo Okushima Takatsuna Aoki Seiichiro Karita Noriyasu Nagai Tamaki Sato Tetsushi Ishikawa Yasuaki Tominaga Manabu Otsuka Shuzo Iwanaga Tatsurou Mori Kazuhiro Yamada Akira Yamamoto Zentaro Tamenaga Akio Saito, filed Dec. 22, 2016.

U.S. Appl. No. 15/390,847, Shingo Okushima Seiichiro Karita Takatsuna Aoki Noriyasu Nagai, filed Dec. 27, 2016.

U.S. Appl. No. 15/409,973, Yumi Komamiya Takatsuna Aoki Shingo Okushima Takuto Moriguchi, filed Jan. 19, 2017.

Office Action dated Aug. 28, 2018, in Japanese Patent Application No. 2017-197658.

* cited by examiner

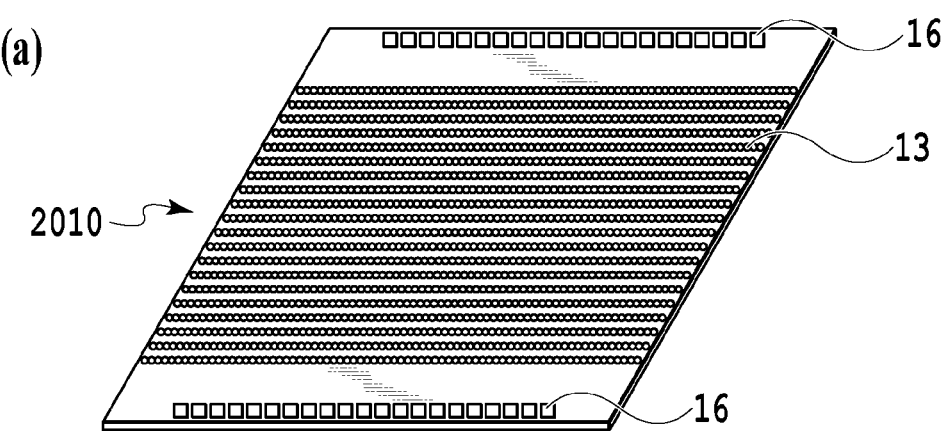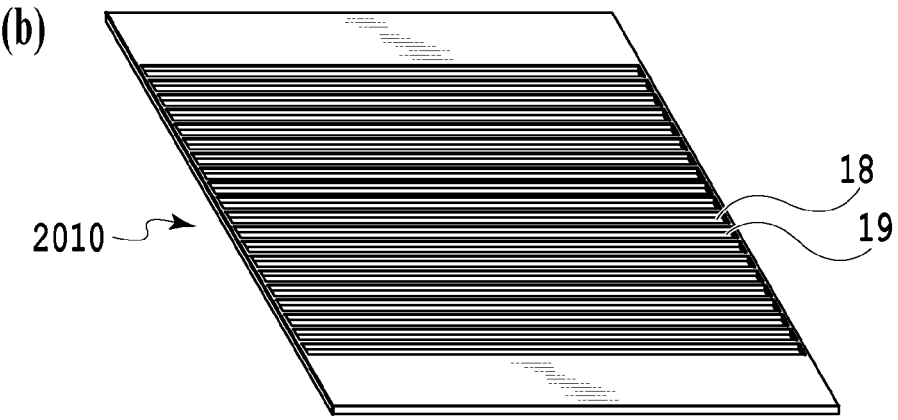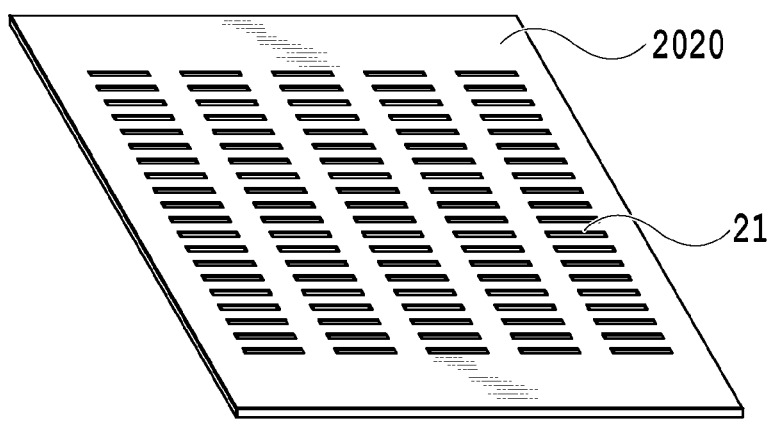
FIG.20

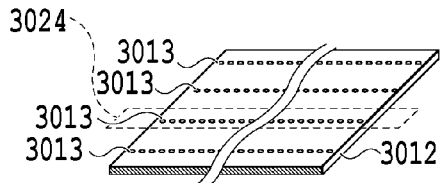
FIG.22A
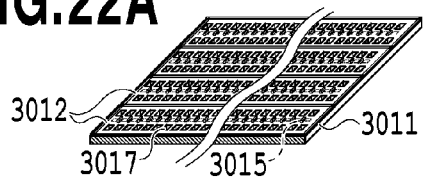
FIG.22B
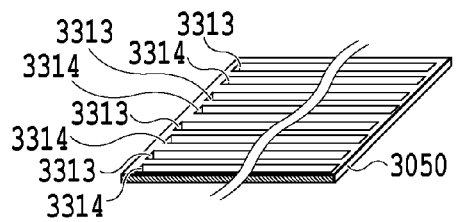
FIG.22C
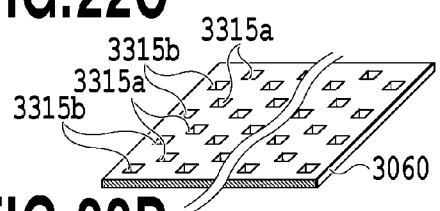
FIG.22D
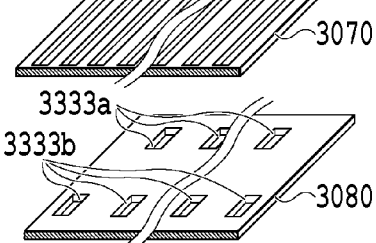
FIG.22E
FIG.22F
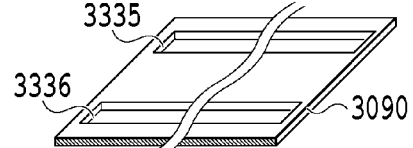
FIG.22G
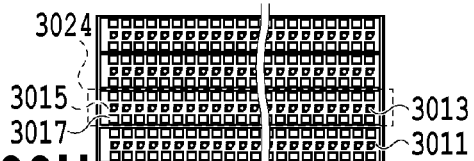
FIG.22H
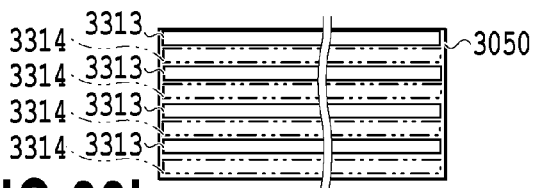
FIG.22I
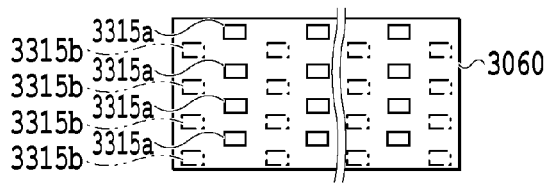
FIG.22J
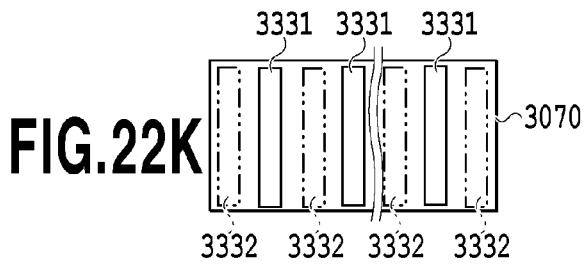
FIG.22K
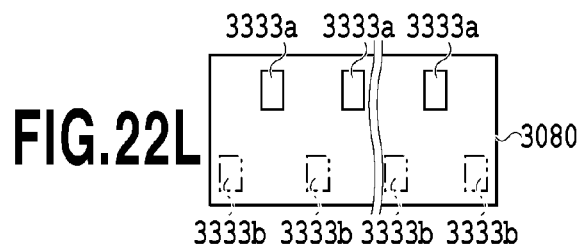
FIG.22L
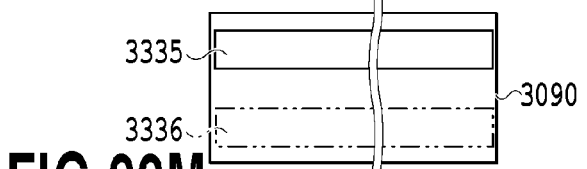
FIG.22M

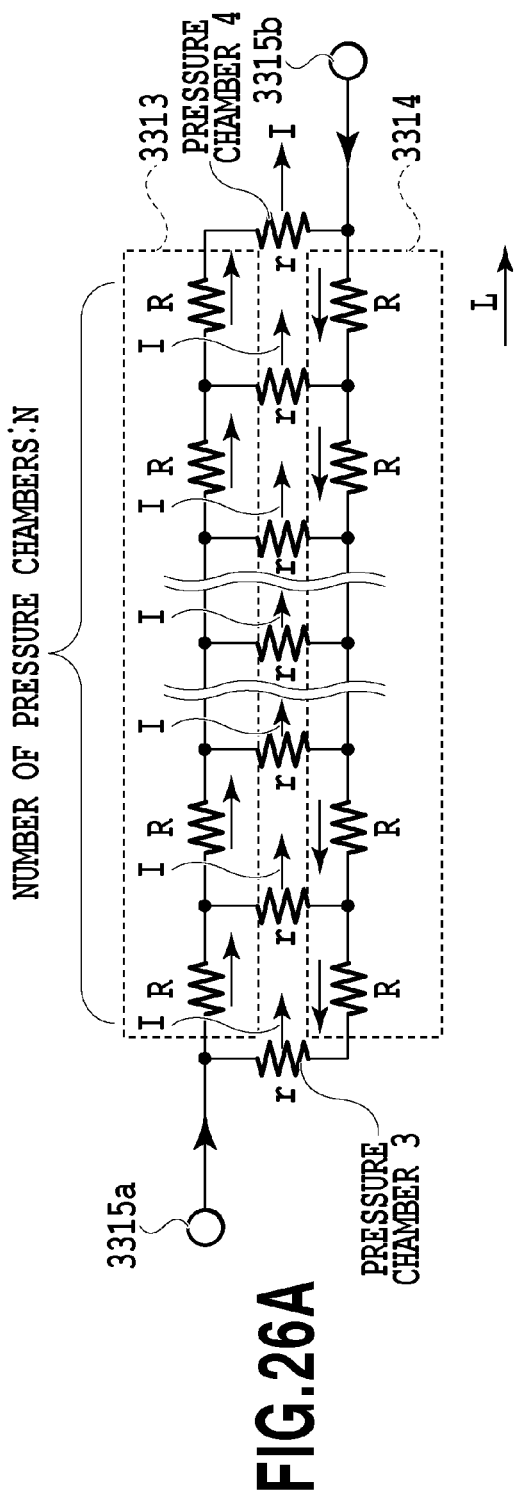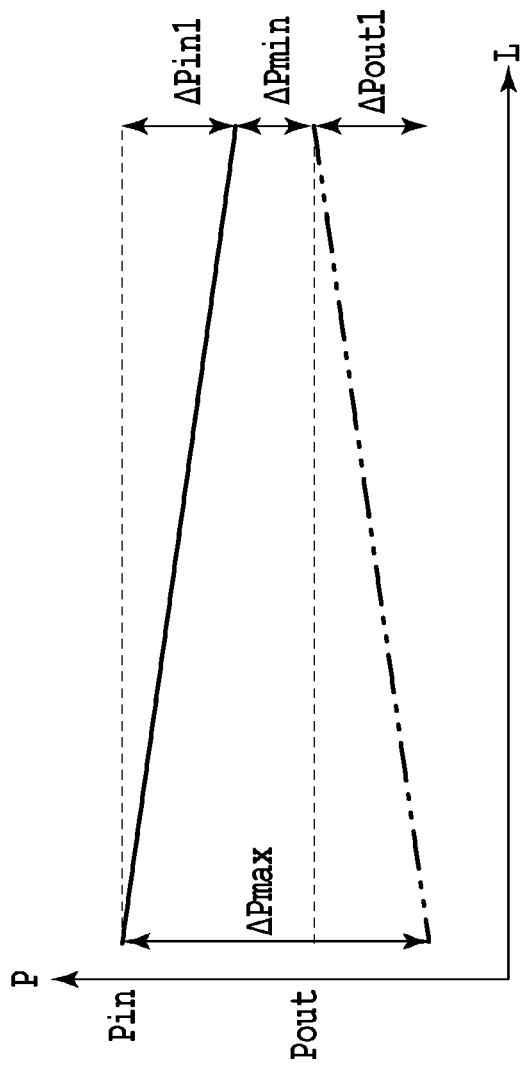
FIG.26A
FIG.26B

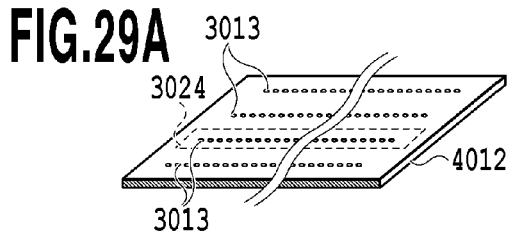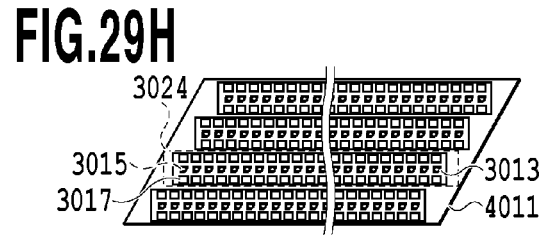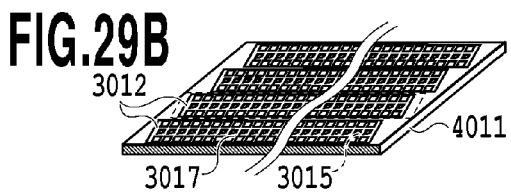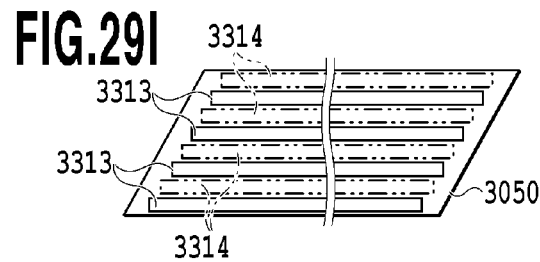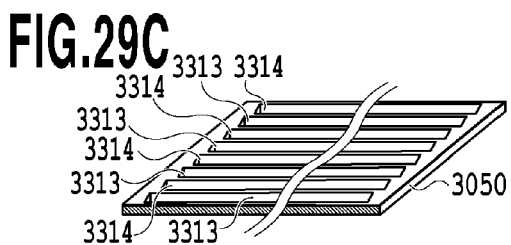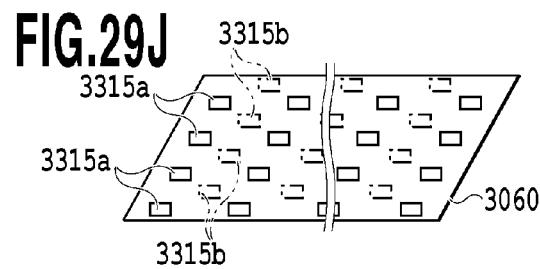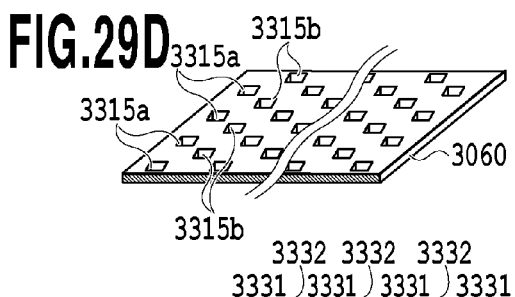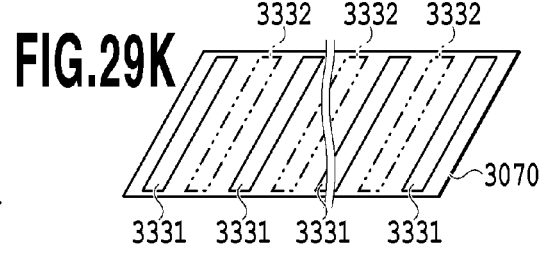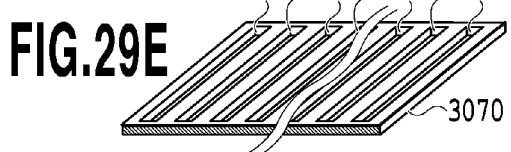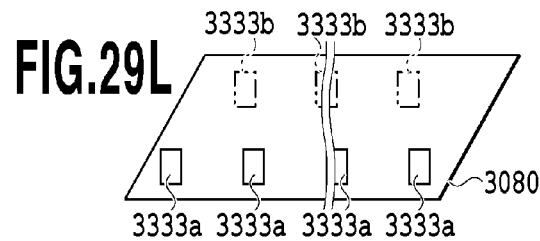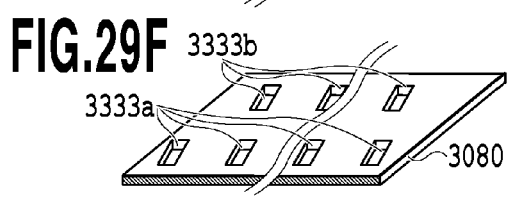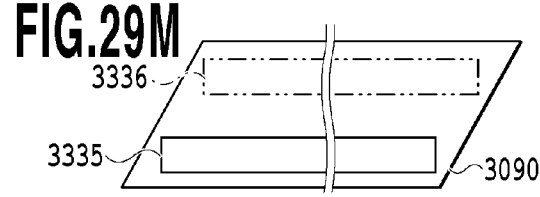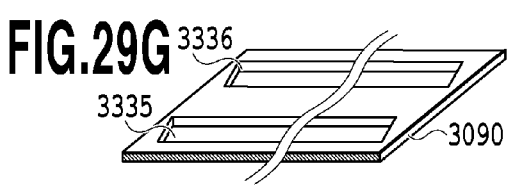

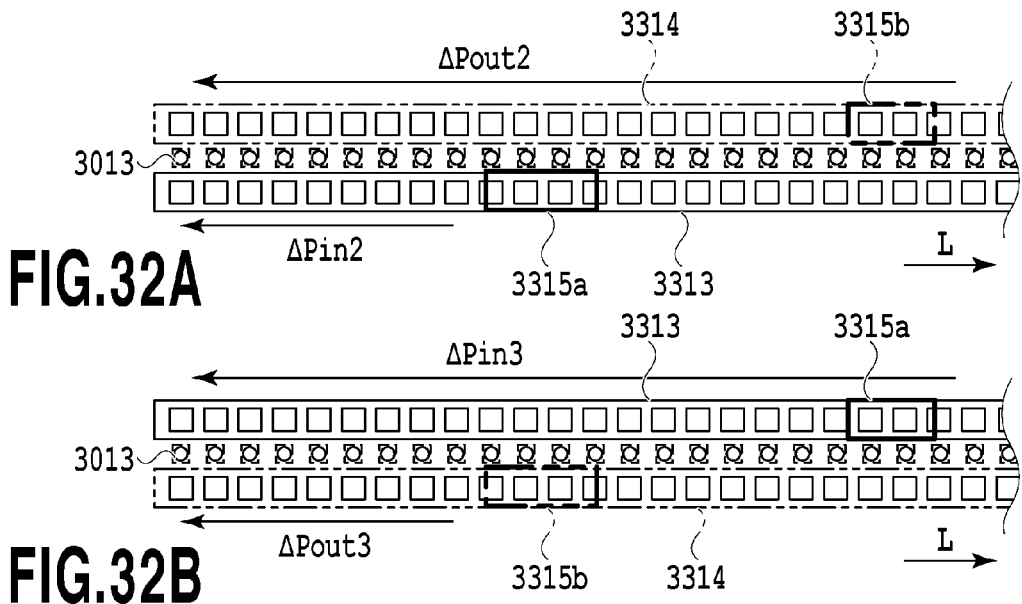
FIG.32A
FIG.32B
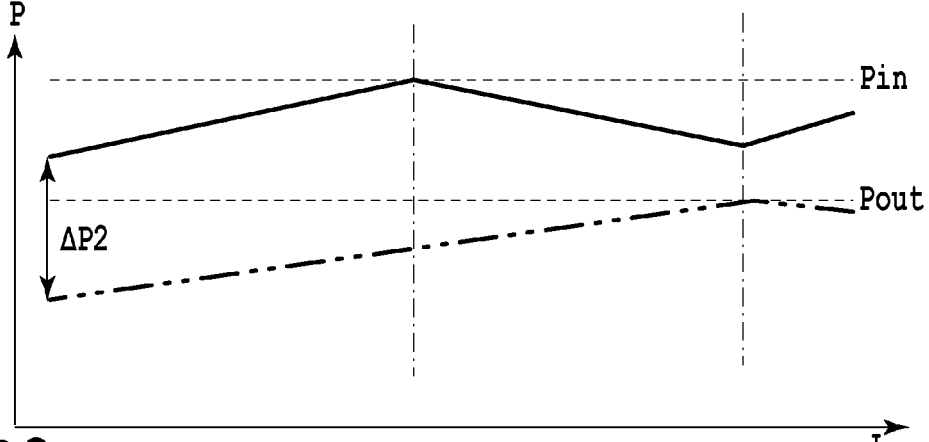
FIG.32C
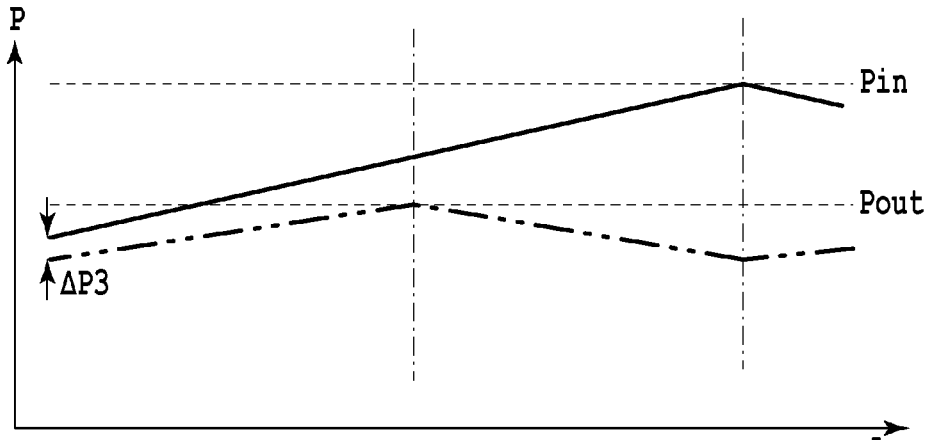
FIG.32D

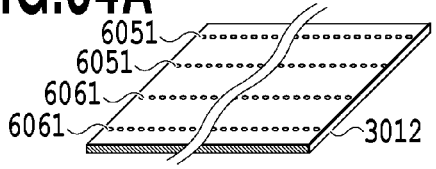
FIG.34A
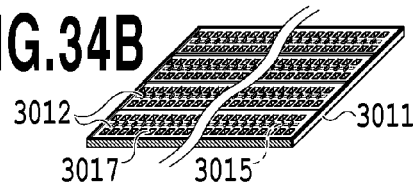
FIG.34B
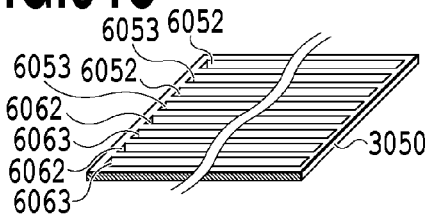
FIG.34C
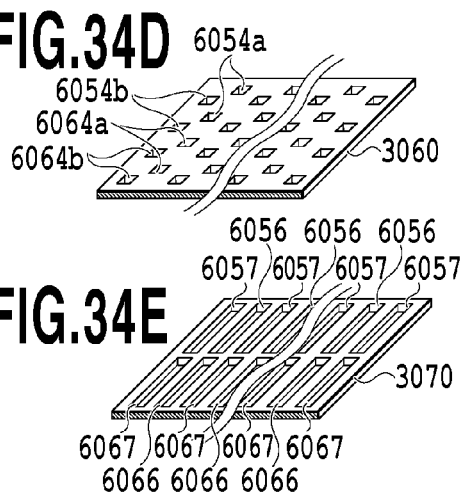
FIG.34D
FIG.34E
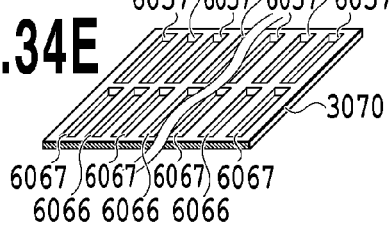
FIG.34F
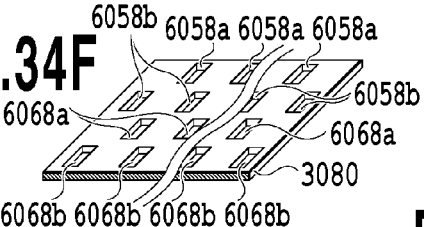
FIG.34G
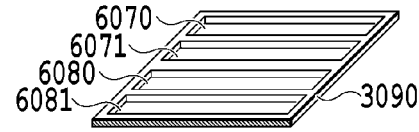
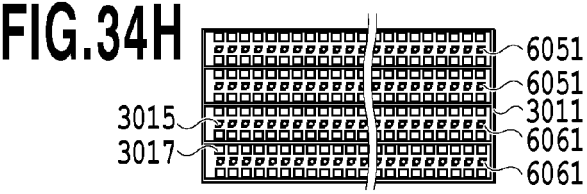
FIG.34H
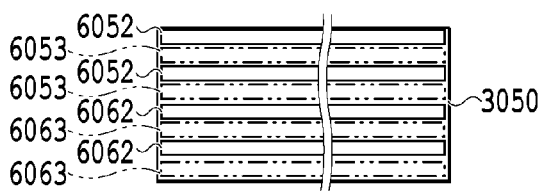
FIG.34I
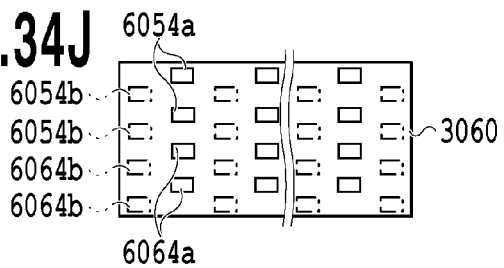
FIG.34J
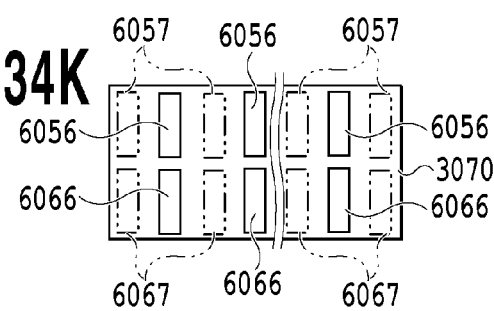
FIG.34K
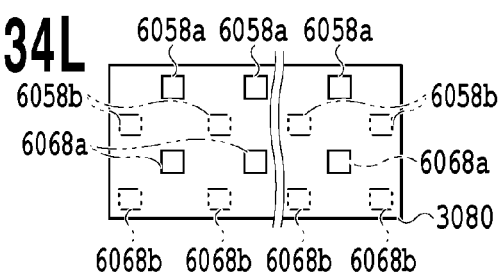
FIG.34L
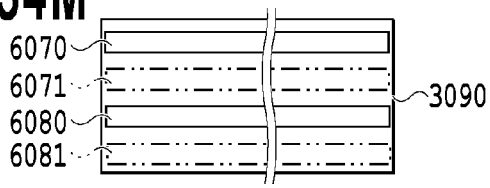
FIG.34M

LIQUID EJECTION HEAD AND LIQUID EJECTION APPARATUS

BACKGROUND OF THE INVENTION

Field of the Invention

The present invention relates to a liquid ejection head and a liquid ejection apparatus capable of ejecting a liquid such as ink from an ejection opening.

Description of the Related Art

In an inkjet technology that prints an image by ejecting a liquid such as ink, there has been an increasing demand for a high-accuracy and high-quality printing operation in accordance with various application fields of an inkjet printing operation in recent years. In order to improve the accuracy of the printing operation, there is known a method of improving a printing resolution by densely arranging a plurality of ejection openings. Further, in order to realize a high-quality printing operation, there is a need to suppress ink from being thickened due to an evaporation of moisture in an ejection opening in that the thick ink causes a decrease in ejection speed of a liquid droplet or a modulation in color concentration.

As a method of suppressing the ink from being thickened by the evaporation of moisture in the ejection opening, there is known a method in which ink inside a pressure chamber having an ejection opening disposed therein is caused to flow forcedly so that the thick ink staying inside the pressure chamber flows to the outside. However, when a circulation flow amount of the ink flowing in each pressure chamber becomes uneven or a pressure in each pressure chamber becomes uneven, a problem arises in that a difference in ejection characteristic or color concentration between the ejection openings increases. In order to handle this problem, Japanese Patent Laid-Open No. 2009-179049 discloses a method in which a passage resistance of a pressure chamber is kept at $\frac{1}{100}$ or less of a passage resistance of a passage supplying ink to the pressure chamber and a passage resistance of a passage collecting ink from the pressure chamber.

However, when the number of the ejection openings constituting an ejection opening row is increased or a gap between the ejection opening rows is narrowed in order to densely arrange the plurality of ejection openings, a problem in Japanese Patent Laid-Open No. 2009-179049 is found. That is, it is found that a change in circulation flow amount of the ink flowing in each pressure chamber or a change in pressure of each pressure chamber is not easily suppressed. When the number of the ejection openings constituting the ejection opening row increases, a distribution of the ejection openings in the row direction of the ejection opening row (the row extension direction) is widened. For that reason, a change in circulation flow amount of the ink flowing in each pressure chamber or a change in pressure of each pressure chamber easily occurs between the plurality of pressure chambers arranged in the row direction of the ejection opening row. Further, when the plurality of ejection opening rows are arranged with high density, it is difficult to increase the width of the passage extending in the row direction of the ejection opening row (the length in the arrangement direction of the plurality of ejection opening rows) due to a relation between the adjacent passages. For that reason, greater pressure loss is generated. As a result, there is a case in which a change in circulation flow amount of the ink flowing in each pressure chamber or a change in pressure of each pressure chamber occurs between the plurality of pressure chambers arranged in the row direction of the ejection opening row.

SUMMARY OF THE INVENTION

Here, the invention is made in view of the above-described circumstances and an object of the invention is to suppress a change in pressure or a change in circulation flow amount of a liquid flowing through a passage of a liquid ejection head having a plurality of ejection openings densely arranged therein.

A liquid ejection head of the invention is a liquid ejection head including: an ejection opening row in which a plurality of ejection openings ejecting a liquid are disposed in a first direction; a pressure chamber in which a print element generating energy used to eject a liquid is disposed; a passage which communicates with the pressure chamber; a supply opening row in which a plurality of supply openings extending in a second direction intersecting a face provided with the print element and supplying a liquid to the passage are arranged in the first direction; a collection opening row in which a plurality of collection openings extending in the second direction and collecting a liquid from the passage are arranged in the first direction; a first common supply passage which extends in the first direction and supplies a liquid to the supply opening row; a first common collection passage which extends in the first direction and collects a liquid from the collection opening row; a first supply side communication opening which extends in the second direction and supplies a liquid to the first common supply passage; and a first collection side communication opening which extends in the second direction and collects a liquid from the first common collection passage, wherein at least one of the first supply side communication opening and the first collection side communication opening is provided at a plurality of positions.

According to the invention, it is possible to suppress a change in circulation flow amount and a change in pressure of the liquid flowing inside the liquid ejection head.

Further features of the present invention will become apparent from the following description of exemplary embodiments (with reference to the attached drawings).

BRIEF DESCRIPTION OF THE DRAWINGS

FIG. 20 is a schematic diagram illustrating the print element board;

FIGS. 22A to 22M are exploded views illustrating a main part of a liquid ejection head according to a first embodiment of the invention;

FIG. 26A is an equivalent circuit diagram illustrating a part of the liquid ejection head according to the first embodiment;

FIG. 26B is a diagram illustrating a pressure distribution inside a passage of the liquid ejection head according to the first embodiment;

FIGS. 29A to 29M are exploded views illustrating a main part of a liquid ejection head according to a second embodiment of the invention;

FIGS. 32A to 32D are diagrams illustrating a change in circulation flow amount according to the second embodiment;

FIGS. 34A to 34M are exploded views illustrating a liquid ejection head according to a fourth embodiment of the invention;

DESCRIPTION OF THE EMBODIMENTS

Hereinafter, a liquid ejection head and a liquid ejection apparatus according to the embodiment of the invention will be described with reference to the drawings.

Additionally, the liquid ejection head and the liquid ejection apparatus of the invention can be applied to a printer, a copying machine, a facsimile machine having a communication system, a word processor having a printer, and an industrial printing apparatus combined with various processing devices. For example, the liquid ejection head and the liquid ejection apparatus can be used to manufacture a biochip or print an electronic circuit.

Further, since the application examples and the embodiments to be described below are detailed examples of the invention, various technical limitations thereof can be made. However, the embodiments are not limited to the embodiments or the other detailed methods of the specification and can be modified within the spirit of the invention.

The application examples of the present invention are described below.

(First Application Example)
(Description of Inkjet Printing Apparatus)

Figure 1:
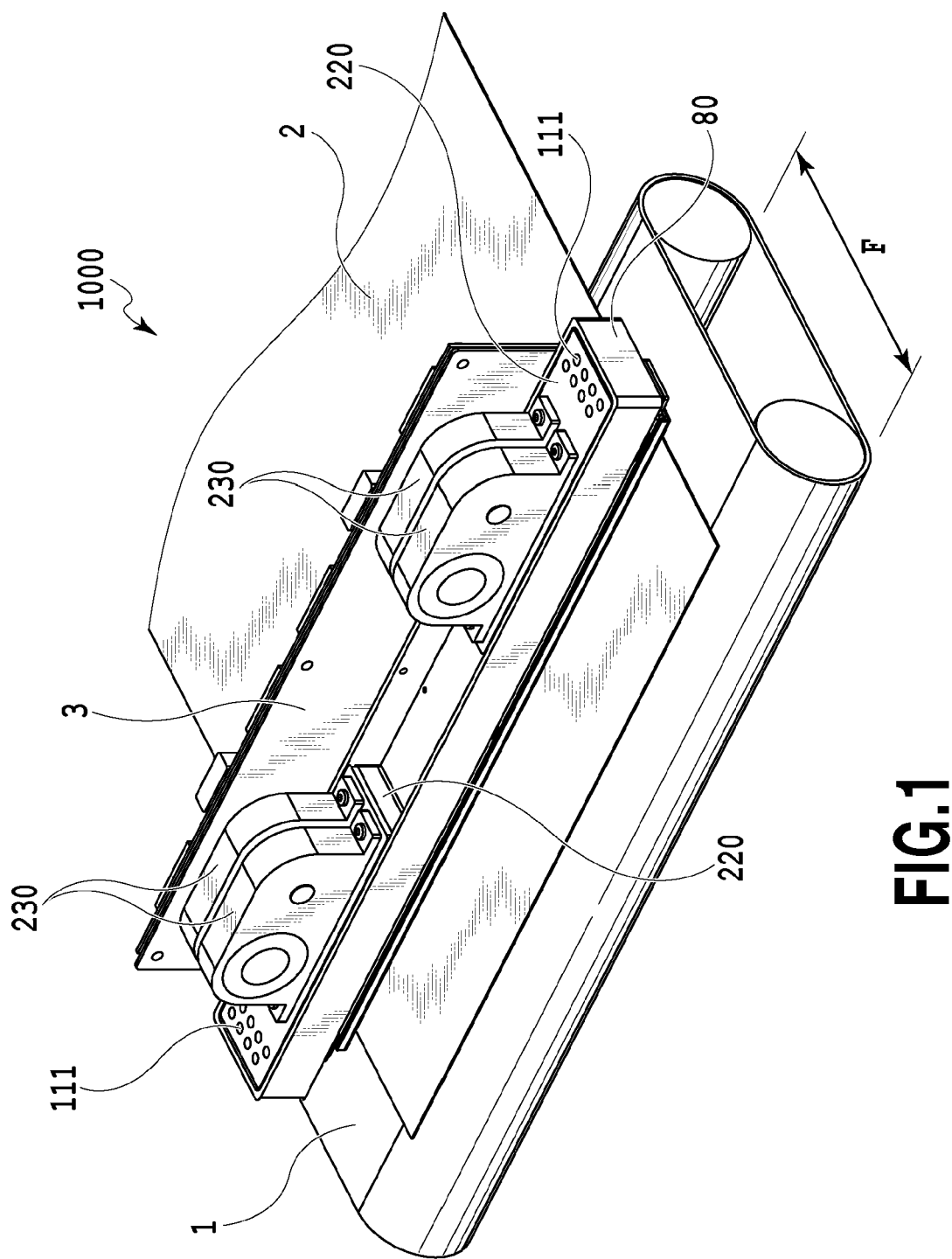
FIG. 1 is a diagram illustrating a schematic configuration of a liquid ejection apparatus that ejects a liquid.

FIG. 1 is a diagram illustrating a schematic configuration of a liquid ejection apparatus that ejects a liquid in the invention and particularly an inkjet printing apparatus (hereinafter, also referred to as a printing apparatus) 1000 that prints an image by ejecting ink. The printing apparatus 1000 includes a conveying unit 1 which conveys a print medium 2 and a line type (page wide type) liquid ejection head 3 which is disposed to be substantially orthogonal to the conveying direction of the print medium 2. Then, the printing apparatus 1000 is a line type printing apparatus which continuously prints an image at one pass by ejecting ink onto the relative moving print mediums 2 while continuously or intermittently conveying the print mediums 2. The liquid ejection head 3 includes a negative pressure control unit 230 which controls a pressure (a negative pressure) inside a circulation path, a liquid supply unit 220 which communicates with the negative pressure control unit 230 so that a fluid can flow therebetween, a liquid connection portion 111 which serves as an ink supply opening and an ink discharge opening of the liquid supply unit 220, and a casing 80. The print medium 2 is not limited to a cut sheet and may be also a continuous roll medium.

The liquid ejection head 3 can print a full color image by inks of cyan C, magenta M, yellow Y, and black K and is fluid-connected to a liquid supply member, a main tank, and a buffer tank (see FIG. 2 to be described later) which serve as a supply path supplying a liquid to the liquid ejection head 3. Further, the control unit which supplies power and transmits an ejection control signal to the liquid ejection head 3 is electrically connected to the liquid ejection head 3. The liquid path and the electric signal path in the liquid ejection head 3 will be described later.

The printing apparatus 1000 is an inkjet printing apparatus that circulates a liquid such as ink between a tank and the liquid ejection head 3 as described later. The circulation mode includes a first circulation mode in which the liquid is circulated by the activation of two circulation pumps (for high and low pressures) at the downstream side of the liquid ejection head 3 and a second circulation mode in which the liquid is circulated by the activation of two circulation pumps (for high and low pressures) at the upstream side of the liquid ejection head 3. Hereinafter, the first circulation mode and the second circulation mode of the circulation will be described.

(Description of First Circulation Mode)

Figure 2:
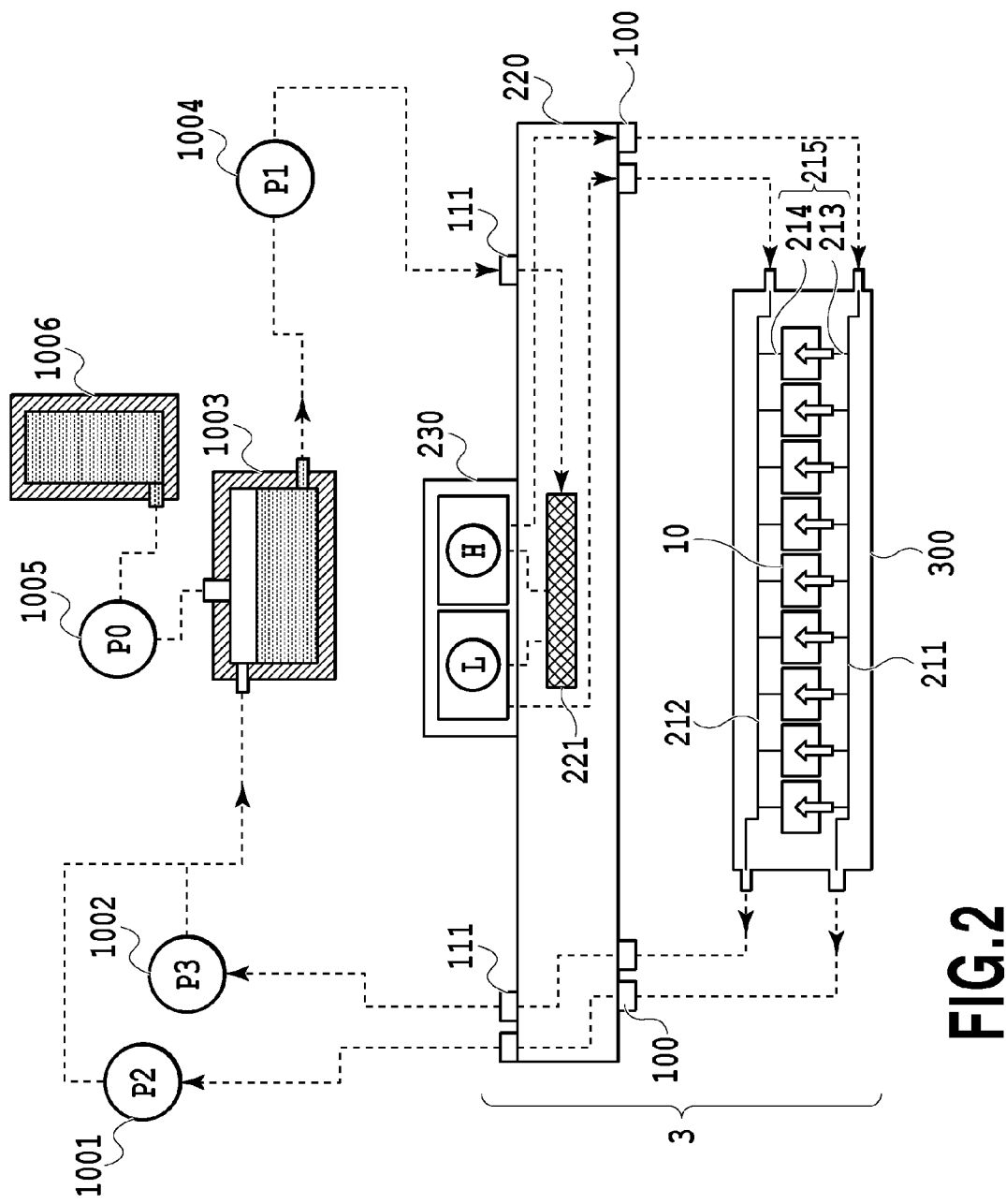
FIG. 2 is a schematic diagram illustrating a first circulation mode in a circulation path applied to a printing apparatus.

FIG. 2 is a schematic diagram illustrating the first circulation mode in the circulation path applied to the printing apparatus 1000 of the application example. The liquid ejection head 3 is fluid-connected to a first circulation pump (the high pressure side) 1001, a first circulation pump (the low pressure side) 1002, and a buffer tank 1003. Further, in FIG. 2, in order to simplify a description, a path through which ink of one color of cyan C, magenta M, yellow Y, and black K flows is illustrated. However, in fact, four colors of circulation paths are provided in the liquid ejection head 3 and the printing apparatus body.

In the first circulation mode, ink inside a main tank 1006 is supplied into the buffer tank 1003 by a replenishing pump 1005 and then is supplied to the liquid supply unit 220 of the liquid ejection head 3 through the liquid connection portion 111 by a second circulation pump 1004. Subsequently, the ink which is adjusted to two different negative pressures (high and low pressures) by the negative pressure control unit 230 connected to the liquid supply unit 220 is circulated while being divided into two passages having the high and low pressures. The ink inside the liquid ejection head 3 is circulated in the liquid ejection head by the action of the first circulation pump (the high pressure side) 1001 and the first circulation pump (the low pressure side) 1002 at the downstream side of the liquid ejection head 3, is discharged from the liquid ejection head 3 through the liquid connection portion 111, and is returned to the buffer tank 1003.

The buffer tank 1003 which is a sub-tank is connected to the main tank 1006 and includes an atmosphere communication opening (not illustrated) to communicate the inside of the tank with the outside and thus can discharge bubbles inside the ink to the outside. The replenishing pump 1005 is provided between the buffer tank 1003 and the main tank 1006. The replenishing pump 1005 delivers the ink from the main tank 1006 to the buffer tank 1003 after the ink is consumed by the ejection (the discharge) of the ink from the ejection opening of the liquid ejection head 3 in the printing operation and the suction collection operation.

Two first circulation pumps 1001 and 1002 draw the liquid from the liquid connection portion 111 of the liquid ejection head 3 so that the liquid flows to the buffer tank 1003. As the first circulation pump, a displacement pump having quantitative liquid delivery ability is desirable. Specifically, a tube pump, a gear pump, a diaphragm pump, and a syringe pump can be exemplified. However, for example, a general constant flow valve or a general relief valve may be disposed at an outlet of a pump to ensure a predetermined flow rate. When the liquid ejection head 3 is driven, the first circulation pump (the high pressure side) 1001 and the first circulation pump (the low pressure side) 1002 are operated so that the ink flows at a predetermined flow rate through a common supply passage 211 and a common collection passage 212. Since the ink flows in this way, the temperature of the liquid ejection head 3 during a printing operation is kept at an optimal temperature. The predetermined flow rate when the liquid ejection head 3 is driven is desirably set to be equal to or higher than a flow rate at which a difference in temperature among the print element boards 10 inside the liquid ejection head 3 does not influence printing quality. Above all, when a too high flow rate is set, a difference in negative pressure among the print element boards 10 increases due to the influence of pressure loss of the passage inside a liquid ejection unit 300 and thus unevenness in density in an image is caused. For that reason, it is desirable to set the flow rate in consideration of a difference in temperature and a difference in negative pressure among the print element boards 10.

The negative pressure control unit 230 is provided in a path between the second circulation pump 1004 and the liquid ejection unit 300. The negative pressure control unit 230 is operated to keep a pressure at the downstream side (that is, a pressure near the liquid ejection unit 300) of the negative pressure control unit 230 at a predetermined pressure even when the flow rate of the ink changes in the circulation system due to a difference in ejection amount per unit area. As two negative pressure control mechanisms constituting the negative pressure control unit 230, any mechanism may be used as long as a pressure at the downstream side of the negative pressure control unit 230 can be controlled within a predetermined range or less from a desired set pressure.

As an example, a mechanism such as a so-called "pressure reduction regulator" can be employed. In the circulation passage of the application example, the upstream side of the negative pressure control unit 230 is pressurized by the second circulation pump 1004 through the liquid supply unit 220. With such a configuration, since an influence of a water head pressure of the buffer tank 1003 with respect to the liquid ejection head 3 can be suppressed, a degree of freedom in layout of the buffer tank 1003 of the printing apparatus 1000 can be widened.

As the second circulation pump 1004, a turbo pump or a displacement pump can be used as long as a predetermined head pressure or more can be exhibited in the range of the ink circulation flow rate used when the liquid ejection head 3 is driven. Specifically, a diaphragm pump can be used.

Further, for example, a water head tank disposed to have a certain water head difference with respect to the negative pressure control unit 230 can be also used instead of the second circulation pump 1004. As illustrated in FIG. 2, the negative pressure control unit 230 includes two negative pressure adjustment mechanisms respectively having different control pressures. Among two negative pressure adjustment mechanisms, a relatively high pressure side (indicated by "H" in FIG. 2) and a relatively low pressure side (indicated by "L" in FIG. 2) are respectively connected to the common supply passage 211 and the common collection passage 212 inside the liquid ejection unit 300 through the liquid supply unit 220.

The liquid ejection unit 300 is provided with the common supply passage 211, the common collection passage 212, and an individual passage 215 (an individual supply passage 213 and an individual collection passage 214) communicating with the print element board. The negative pressure control mechanism H is connected to the common supply passage 211, the negative pressure control mechanism L is connected to the common collection passage 212, and a differential pressure is formed between two common passages. Then, since the individual passage 215 communicates with the common supply passage 211 and the common collection passage 212, a flow (a flow indicated by an arrow direction of FIG. 2) is generated in which a part of the liquid flows from the common supply passage 211 to the common collection passage 212 through the passage formed inside the print element board 10.

In this way, the liquid ejection unit 300 has a flow in which a part of the liquid passes through the print element boards 10 while the liquid flows to pass through the common supply passage 211 and the common collection passage 212. For this reason, heat generated by the print element boards 10 can be discharged to the outside of the print element board 10 by the ink flowing through the common supply passage 211 and the common collection passage 212. With such a configuration, the flow of the ink can be generated even in the pressure chamber or the ejection opening not ejecting the liquid when an image is printed by the liquid ejection head 3. Accordingly, the thickening of the ink can be suppressed in such a manner that the viscosity of the ink thickened inside the ejection opening is decreased. Further, the thickened ink or the foreign material in the ink can be discharged toward the common collection passage 212. For this reason, the liquid ejection head 3 of the application example can print a high-quality image at a high speed.

(Description of Second Circulation Mode)

Figure 3:
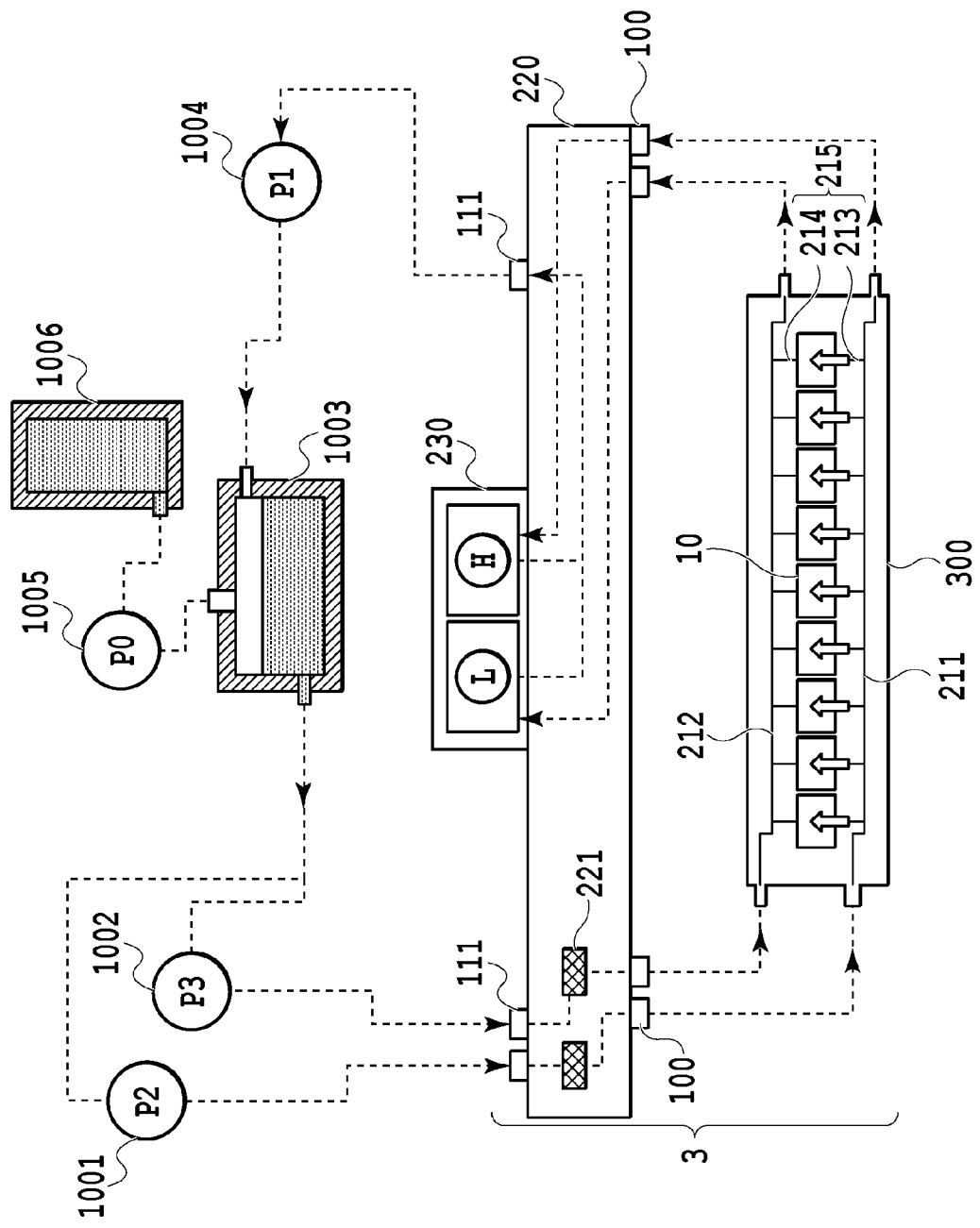
FIG. 3 is a schematic diagram illustrating a second circulation mode in the circulation path applied to the printing apparatus.

FIG. 3 is a schematic diagram illustrating the second circulation mode which is a circulation mode different from the first circulation mode in the circulation path applied to the printing apparatus of the application example. A main difference from the first circulation mode is that two negative pressure control mechanisms constituting the negative pressure control unit 230 both control a pressure at the upstream side of the negative pressure control unit 230 within a predetermined range from a desired set pressure. Further, another difference from the first circulation mode is that the second circulation pump 1004 serves as a negative pressure source which reduces a pressure at the downstream side of the negative pressure control unit 230. Further, still another difference is that the first circulation pump (the high pressure side) 1001 and the first circulation pump (the low pressure side) 1002 are disposed at the upstream side of the liquid ejection head 3 and the negative pressure control unit 230 is disposed at the downstream side of the liquid ejection head 3.

In the second circulation mode, the ink inside the main tank 1006 is supplied to the buffer tank 1003 by the replenishing pump 1005. Subsequently, the ink is divided into two passages and is circulated in two passages at the high pressure side and the low pressure side by the action of the negative pressure control unit 230 provided in the liquid ejection head 3. The ink which is divided into two passages at the high pressure side and the low pressure side is supplied to the liquid ejection head 3 through the liquid connection portion 111 by the action of the first circulation pump (the high pressure side) 1001 and the first circulation pump (the low pressure side) 1002. Subsequently, the ink circulated inside the liquid ejection head by the action of the first circulation pump (the high pressure side) 1001 and the first circulation pump (the low pressure side) 1002 is discharged from the liquid ejection head 3 through the liquid connection portion 111 by the negative pressure control unit 230. The discharged ink is returned to the buffer tank 1003 by the second circulation pump 1004.

In the second circulation mode, the negative pressure control unit 230 stabilizes a change in pressure at the upstream side (that is, the liquid ejection unit 300) of the negative pressure control unit 230 within a predetermined range from a predetermined pressure even when a change in flow rate is caused by a change in ejection amount per unit area. In the circulation passage of the application example, the downstream side of the negative pressure control unit 230 is pressurized by the second circulation pump 1004 through the liquid supply unit 220. With such a configuration, since an influence of a water head pressure of the buffer tank 1003 with respect to the liquid ejection head 3 can be suppressed, the layout of the buffer tank 1003 in the printing apparatus 1000 can have many options.

Instead of the second circulation pump 1004, for example, a water head tank disposed to have a predetermined water head difference with respect to the negative pressure control unit 230 can be also used. Similarly to the first circulation mode, in the second circulation mode, the negative pressure control unit 230 includes two negative pressure control mechanisms respectively having different control pressures. Among two negative pressure adjustment mechanisms, a high pressure side (indicated by "H" in FIG. 3) and a low pressure side (indicated by "L" in FIG. 3) are respectively connected to the common supply passage 211 or the common collection passage 212 inside the liquid ejection unit 300 through the liquid supply unit 220. When the pressure of the common supply passage 211 is set to be higher than the pressure of the common collection passage 212 by two negative pressure adjustment mechanisms, a flow of the liquid is formed from the common supply passage 211 to the common collection passage 212 through the individual passage 215 and the passages formed inside the print element boards 10.

In such a second circulation mode, the same liquid flow as that of the first circulation mode can be obtained inside the liquid ejection unit 300, but there are two advantages different from those of the first circulation mode. As a first advantage, in the second circulation mode, since the negative pressure control unit 230 is disposed at the downstream side of the liquid ejection head 3, there is low concern that a foreign material or a trash produced from the negative pressure control unit 230 flows into the liquid ejection head 3. As a second advantage, in the second circulation mode, a maximal value of the flow rate necessary for the liquid from the buffer tank 1003 to the liquid ejection head 3 is smaller than that of the first circulation mode. The reason is as below.

In the case of the circulation in the print standby state, the sum of the flow rates of the common supply passage 211 and the common collection passage 212 is set to a flow rate A. The value of the flow rate A is defined as a minimal flow rate necessary to adjust the temperature of the liquid ejection head 3 in the print standby state so that a difference in temperature inside the liquid ejection unit 300 falls within a desired range. Further, the ejection flow rate obtained when the ink is ejected from all ejection openings of the liquid ejection unit 300 (the full ejection state) is defined as a flow rate F (the ejection amount per each ejection opening×the ejection frequency per unit time×the number of the ejection openings).

Figure 4:
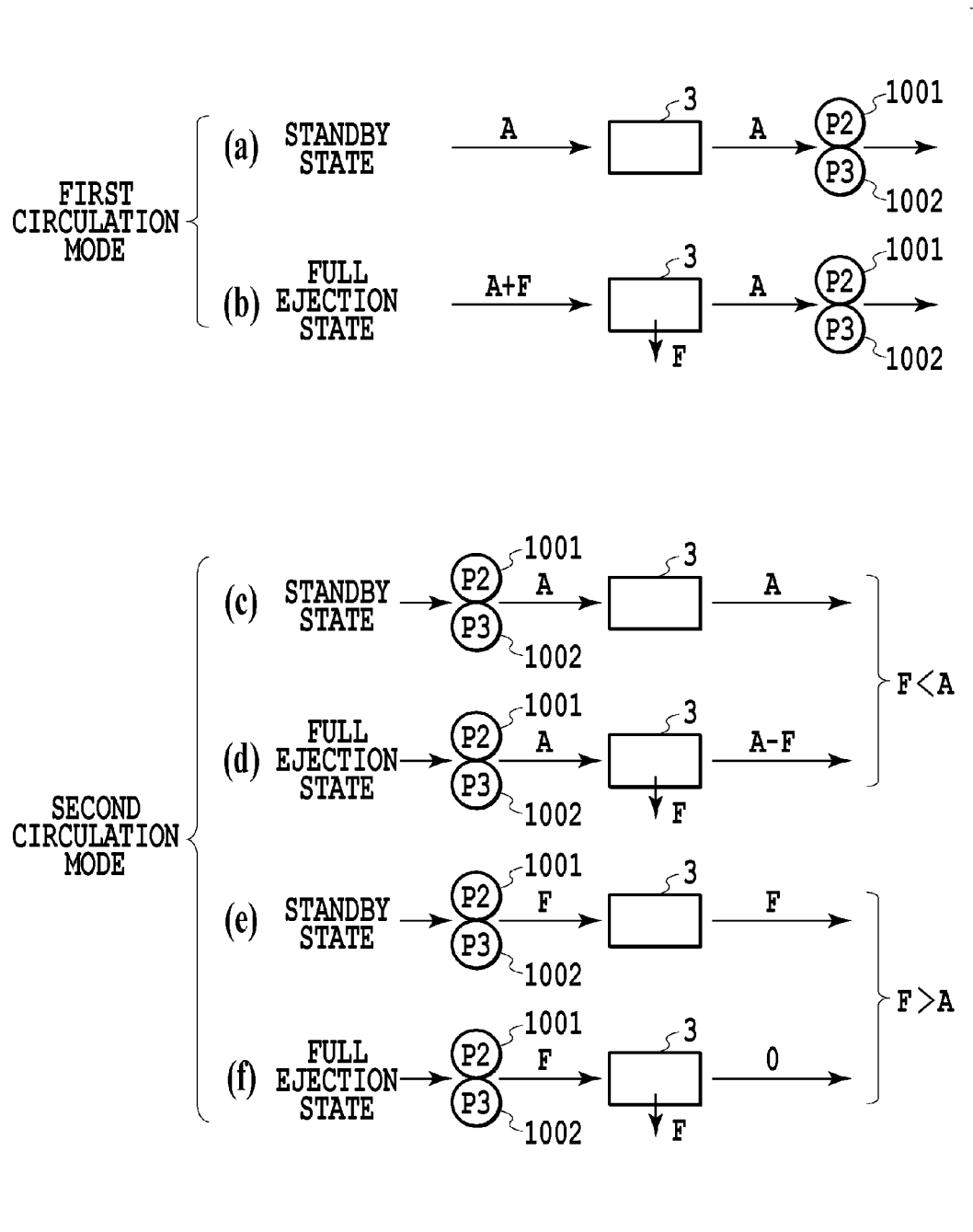
FIG. 4 is a schematic diagram illustrating a difference in ink inflow amount to a liquid ejection head.

FIG. 4 is a schematic diagram illustrating a difference in ink inflow amount to the liquid ejection head between the first circulation mode and the second circulation mode. FIG. 4(a) illustrates the standby state in the first circulation mode and FIG. 4(b) illustrates the full ejection state in the first circulation mode. FIGS. 4(c) to 4(f) illustrate the second circulation mode. Here, FIGS. 4(c) and 4(d) illustrate a case where the flow rate F is lower than the flow rate A and FIGS. 4(e) and 4(f) illustrate a case where the flow rate F is higher than the flow rate A. In this way, the flow rates in the standby state and the full ejection state are illustrated.

In the case of the first circulation mode (FIGS. 4(a) and 4(b)) in which the first circulation pump 1001 and the first circulation pump 1002 each having a quantitative liquid delivery ability are disposed at the downstream side of the liquid ejection head 3, the total flow rate of the first circulation pump 1001 and the first circulation pump 1002 is set to be the flow rate A. By the flow rate A, the temperature inside the liquid ejection unit 300 in the standby state can be managed. Then, in the case of the full ejection state of the liquid ejection head 3, the total flow rate of the first circulation pump 1001 and the first circulation pump 1002 remains to be the flow rate A. However, a maximal flow rate of the liquid supplied to the liquid ejection head 3 is obtained such that the flow rate F consumed by the full ejection is added to the flow rate A of the total flow rate by the action of the negative pressure generated by the ejection of the liquid ejection head 3. Thus, a maximal value of the supply amount to the liquid ejection head 3 satisfies a relation of the flow rate A+the flow rate F since the flow rate F is added to the flow rate A (FIG. 4(b)).

Meanwhile, in the case of the second circulation mode (FIGS. 4(c) to 4(f)) in which the first circulation pump 1001 and the first circulation pump 1002 are disposed at the upstream side of the liquid ejection head 3, the supply amount to the liquid ejection head 3 necessary for the print standby state is the flow rate A similarly to the first circulation mode. Thus, when the flow rate A is higher than the flow rate F (FIGS. 4(c) and 4(d)) in the second circulation mode in which the first circulation pump 1001 and the first circulation pump 1002 are disposed at the upstream side of the liquid ejection head 3, the flow rate A is sufficient as the supply amount to the liquid ejection head 3 even in the full ejection state. At that time, the discharge flow rate of the liquid ejection head 3 satisfies a relation of the flow rate A−the flow rate F (FIG. 4(d)).

However, when the flow rate F is higher than the flow rate A (FIGS. 4(e) and 4(f)), the flow rate is insufficient when the flow rate of the liquid supplied to the liquid ejection head 3 is set to be the flow rate A in the full ejection state. For that reason, when the flow rate F is higher than the flow rate A, the supply amount to the liquid ejection head 3 needs to be set to the flow rate F. At that time, since the flow rate F is consumed by the liquid ejection head 3 in the full ejection state, the flow rate of the liquid discharged from the liquid ejection head 3 becomes almost zero (FIG. 4(f)). In addition, if the liquid is ejected but not as in the full ejection state when the flow rate F is higher than the flow rate A, the liquid which is attracted by the amount consumed by the ejection of the flow rate F is discharged from the liquid ejection head 3. Further, when the flow rate A and the flow rate F are equal to each other, the flow rate A (or the flow rate F) is supplied to the liquid ejection head 3 and the flow rate F is consumed by the liquid ejection head 3. For this reason, the flow rate discharged from the liquid ejection head 3 becomes almost zero.

In this way, in the case of the second circulation mode, the total value of the flow rates set for the first circulation pump 1001 and the first circulation pump 1002, that is, the maximal value of the necessary supply flow rate becomes a large value among the flow rate A and the flow rate F. For this reason, as long as the liquid ejection unit 300 having the same configuration is used, the maximal value of the supply amount necessary for the second circulation mode (the flow rate A or the flow rate F) becomes smaller than the maximal value of the supply flow rate necessary for the first circulation mode (the flow rate A+the flow rate F).

For that reason, in the case of the second circulation mode, the degree of freedom of the applicable circulation pump increases. For example, a circulation pump having a simple configuration and low cost can be used or a load of a cooler (not illustrated) provided in a main body side path can be reduced. Accordingly, there is an advantage that the cost of the printing apparatus can be decreased. This advantage is high in the line head having a relatively large value of the flow rate A or the flow rate F. Accordingly, a line head having a long longitudinal length among the line heads is beneficial.

Meanwhile, there are cases where the first circulation mode is more advantageous than the second circulation mode. That is, in the second circulation mode, since the flow rate of the liquid flowing through the liquid ejection unit 300 in the print standby state is maximal, a higher negative pressure is applied to the ejection openings as the ejection amount per unit area of the image (hereinafter, also referred to as a low-duty image) becomes smaller. For this reason, when the passage width is narrow and the negative pressure is high, a high negative pressure is applied to the ejection opening in printing of the low-duty image in which unevenness easily appears. Accordingly, there is concern that printing quality may be deteriorated in accordance with an increase in the number of so-called satellite droplets ejected along with main droplets of the ink.

Meanwhile, in the case of the first circulation mode, since a high negative pressure is applied to the ejection opening when the image (hereinafter, also referred to as a high-duty image) having a large ejection amount per unit area is formed, there is an advantage that an influence of satellite droplets on the image is small even when many satellite droplets are generated. These wo circulation modes can be desirably selected in consideration of the specifications (the ejection flow rate F, the minimal circulation flow rate A, and the passage resistance inside the head) of the liquid ejection head and the printing apparatus body.

(Description of Third Circulation Mode)

Figure 41:
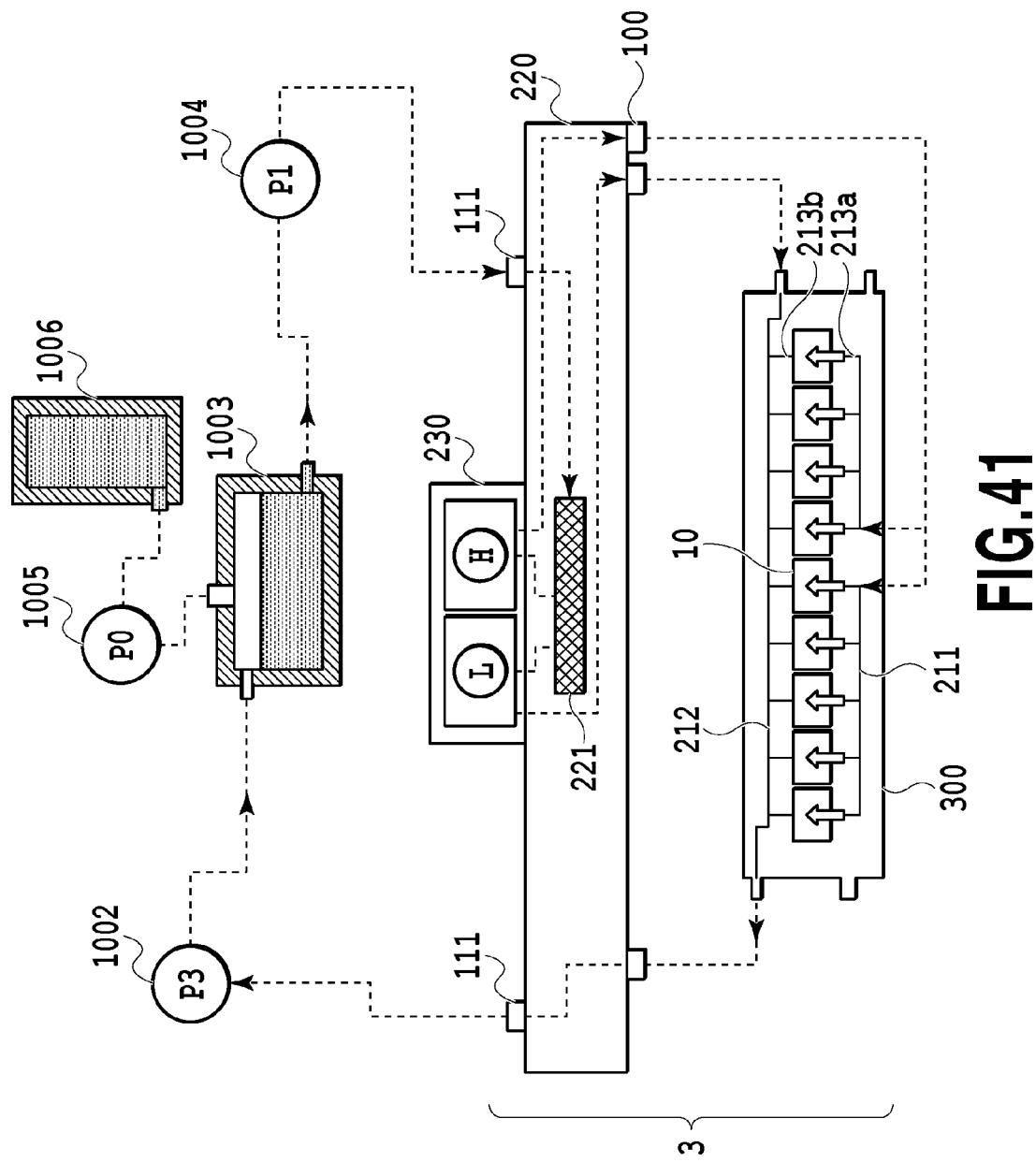
FIG. 41 is an explanatory diagram illustrating a third circulation mode.

FIG. 41 is a schematic diagram illustrating a third circulation mode which is one mode of the circulation path applied to the printing apparatus of the application example. A description of the same functions and configurations as those of the first and second circulation modes will be omitted and only a difference will be mainly described.

In the circulation path, the liquid is supplied into the liquid ejection head 3 from three positions, that is, two positions of the center portion of the liquid ejection head 3 and one position of one end of the liquid ejection head 3. The liquid flowing from the common supply passage 211 to each pressure chamber 23 is collected by the common collection passage 212 and is collected to the outside from the collection opening at the other end of the liquid ejection head 3. The individual supply passage 213 communicates with the common supply passage 211 and the common collection passage 212, and the print element board 10 and the pressure chamber 23 disposed inside the print element board are provided in the path of the individual supply passage 213. Accordingly, a part of the liquid flown by the first circulation pump 1002 flows from the common supply passage 211 to the common collection passage 212 while passing through the pressure chamber 23 of the print element board 10 (see an arrow of FIG. 41). This is because a differential pressure is generated between a pressure adjustment mechanism H connected to the common supply passage 211 and a pressure adjustment mechanism L connected to the common collection passage 212 and the first circulation pump 1002 is connected only to the common collection passage 212.

In this way, in the liquid ejection unit 300, a flow of the liquid passing through the common collection passage 212 and a flow of the liquid flowing from the common supply passage 211 to the common collection passage 212 while passing through the pressure chamber 23 inside each print element board 10 are generated. For this reason, heat generated by each print element board 10 can be discharged to the outside of the print element board 10 by the flow from the common supply passage 211 to the common collection passage 212 while pressure loss is suppressed. Further, according to the circulation mode, the number of the pumps which are liquid transporting units can be decreased compared with the first and second circulation modes.

(Description of Configuration of Liquid Ejection Head)

Figure 5A:
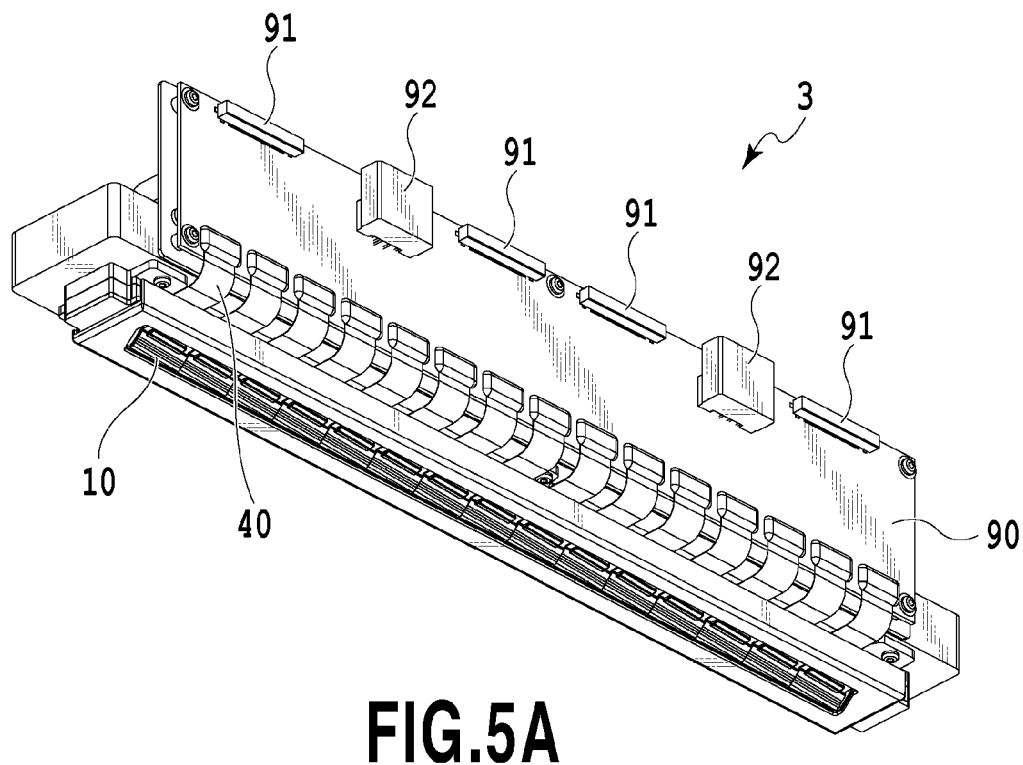
FIG. 5A is a perspective view illustrating the liquid ejection head.
Figure 5B:
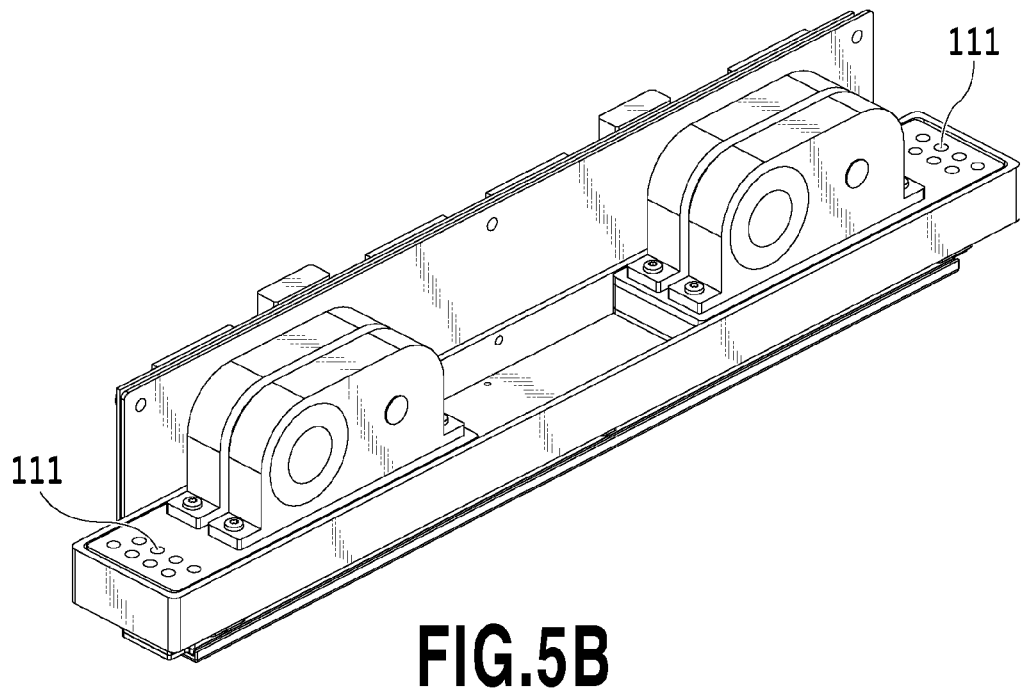
FIG. 5B is a perspective view illustrating the liquid ejection head.

A configuration of the liquid ejection head 3 according to the first application example will be described. FIGS. 5A and 5B are perspective views illustrating the liquid ejection head 3 according to the application example. The liquid ejection head 3 is a line type liquid ejection head in which fifteen print element boards 10 capable of ejecting inks of four colors of cyan C, magenta M, yellow Y, and black K are arranged in series on one print element board 10 (an in-line arrangement). As illustrated in FIG. 5A, the liquid ejection head 3 includes the print element boards 10 and a signal input terminal 91 and a power supply terminal 92 which are electrically connected to each other through a flexible circuit board 40 and an electric wiring board 90 capable of supplying electric energy to the print element board 10.

The signal input terminal 91 and the power supply terminal 92 are electrically connected to the control unit of the printing apparatus 1000 so that an ejection drive signal and power necessary for the ejection are supplied to the print element board 10. When the wirings are integrated by the electric circuit inside the electric wiring board 90, the number of the signal input terminals 91 and the power supply terminals 92 can be decreased compared with the number of the print element boards 10. Accordingly, the number of electrical connection components to be separated when the liquid ejection head 3 is assembled to the printing apparatus 1000 or the liquid ejection head is replaced decreases.

As illustrated in FIG. 5B, the liquid connection portions 111 which are provided at both ends of the liquid ejection head 3 are connected to the liquid supply system of the printing apparatus 1000. Accordingly, the inks of four colors including cyan C, magenta M, yellow Y, and black K4 are supplied from the supply system of the printing apparatus 1000 to the liquid ejection head 3 and the inks passing through the liquid ejection head 3 are collected by the supply system of the printing apparatus 1000. In this way, the inks of different colors can be circulated through the path of the printing apparatus 1000 and the path of the liquid ejection head 3.

Figure 6:
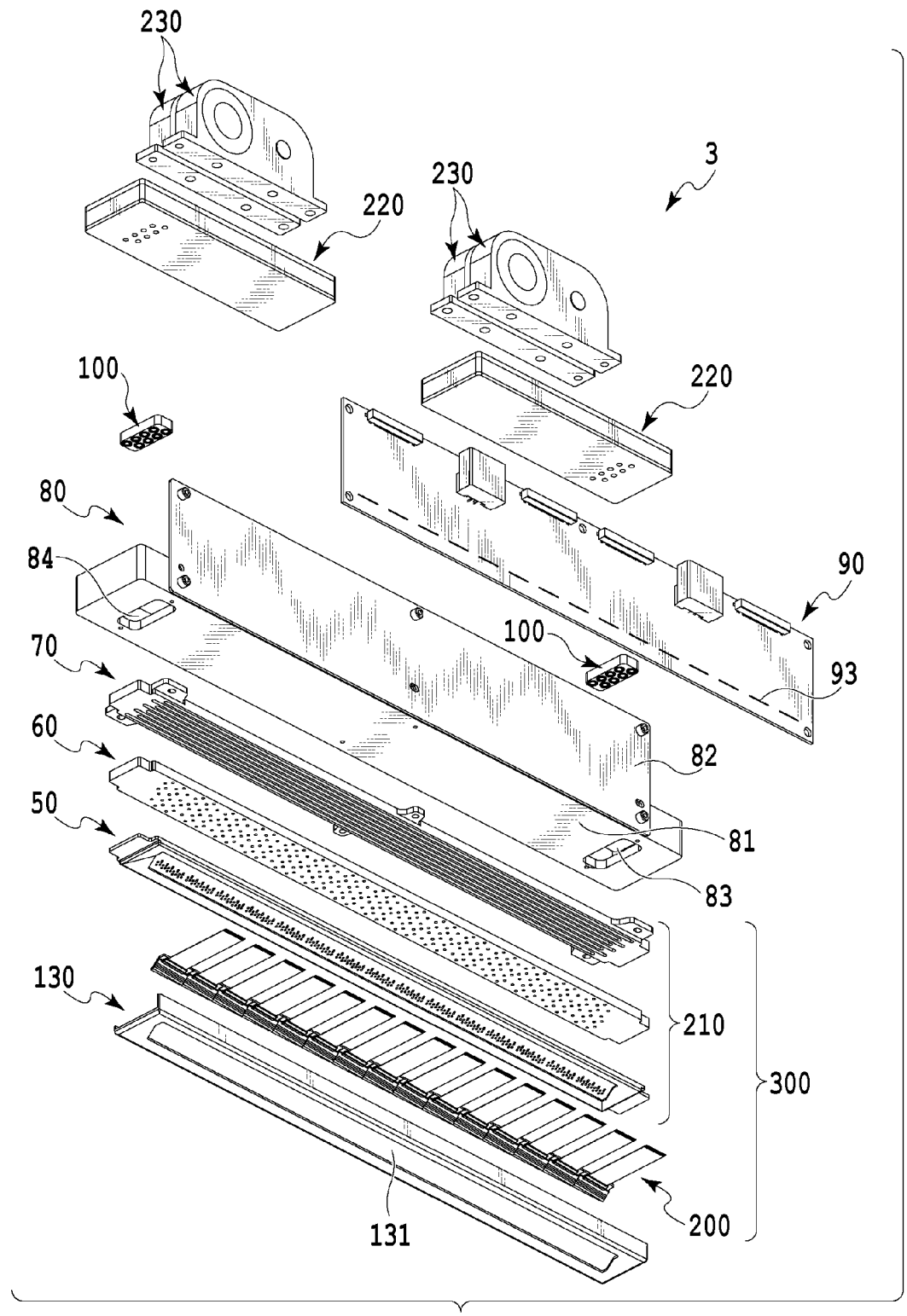
FIG. 6 is an exploded perspective view illustrating components or units constituting the liquid ejection head.

FIG. 6 is an exploded perspective view illustrating components or units constituting the liquid ejection head 3. The liquid ejection unit 300, the liquid supply unit 220, and the electric wiring board 90 are attached to the casing 80. The liquid connection portions 111 (see FIG. 3) are provided in the liquid supply unit 220. Also, in order to remove a foreign material in the supplied ink, filters 221 (see FIGS. 2 and 3) for different colors are provided inside the liquid supply unit 220 while communicating with the openings of the liquid connection portions 111. Two liquid supply units 220 respectively corresponding to two colors are provided with the filters 221. The liquid passing through the filter 221 is supplied to the negative pressure control unit 230 disposed on the liquid supply unit 220 disposed to correspond to each color.

The negative pressure control unit 230 is a unit which includes different colors of negative pressure control valves. By the function of a spring member or a valve provided therein, a change in pressure loss inside the supply system (the supply system at the upstream side of the liquid ejection head 3) of the printing apparatus 1000 caused by a change in flow rate of the liquid is largely decreased. Accordingly, the negative pressure control unit 230 can stabilize a change negative pressure at the downstream side (the liquid ejection unit 300) of the negative pressure control unit within a predetermined range. As described in FIG. 2, two negative pressure control valves of different colors are built inside the negative pressure control unit 230. Two negative pressure control valves are respectively set to different control pressures. Here, the high pressure side communicates with the common supply passage 211 (see FIG. 2) inside the liquid ejection unit 300 and the low pressure side communicates with the common collection passage 212 (see FIG. 2) through the liquid supply unit 220.

The casing 80 includes a liquid ejection unit support portion 81 and an electric wiring board support portion 82 and ensures the rigidity of the liquid ejection head 3 while supporting the liquid ejection unit 300 and the electric wiring board 90. The electric wiring board support portion 82 is used to support the electric wiring board 90 and is fixed to the liquid ejection unit support portion 81 by a screw. The liquid ejection unit support portion 81 is used to correct the warpage or deformation of the liquid ejection unit 300 to ensure the relative position accuracy among the print element boards 10. Accordingly, stripe and unevenness of a printed medium is suppressed.

For that reason, it is desirable that the liquid ejection unit support portion 81 have sufficient rigidity. As a material, metal such as SUS or aluminum or ceramic such as alumina is desirable. The liquid ejection unit support portion 81 is provided with openings 83 and 84 into which a joint rubber 100 is inserted. The liquid supplied from the liquid supply unit 220 is led to a third passage member 70 constituting the liquid ejection unit 300 through the joint rubber.

The liquid ejection unit 300 includes a plurality of ejection modules 200 and a passage member 210 and a cover member 130 is attached to a face near the print medium in the liquid ejection unit 300. Here, the cover member 130 is a member having a picture frame shaped surface and provided with an elongated opening 131 as illustrated in FIG. 6 and the print element board 10 and a sealing member 110 (see FIG. 10A to be described later) included in the ejection module 200 are exposed from the opening 131. A peripheral frame of the opening 131 serves as a contact face of a cap member that caps the liquid ejection head 3 in the print standby state. For this reason, it is desirable to form a closed space in a capping state by applying an adhesive, a sealing material, and a filling material along the periphery of the opening 131 to fill unevenness or a gap on the ejection opening face of the liquid ejection unit 300.

Next, a configuration of the passage member 210 included in the liquid ejection unit 300 will be described. As illustrated in FIG. 6, the passage member 210 is obtained by laminating a first passage member 50, a second passage member 60, and a third passage member 70 and distributes the liquid supplied from the liquid supply unit 220 to the ejection modules 200. Further, the passage member 210 is a passage member that returns the liquid re-circulated from the ejection module 200 to the liquid supply unit 220. The passage member 210 is fixed to the liquid ejection unit support portion 81 by a screw and thus the warpage or deformation of the passage member 210 is suppressed.

Figure 7:
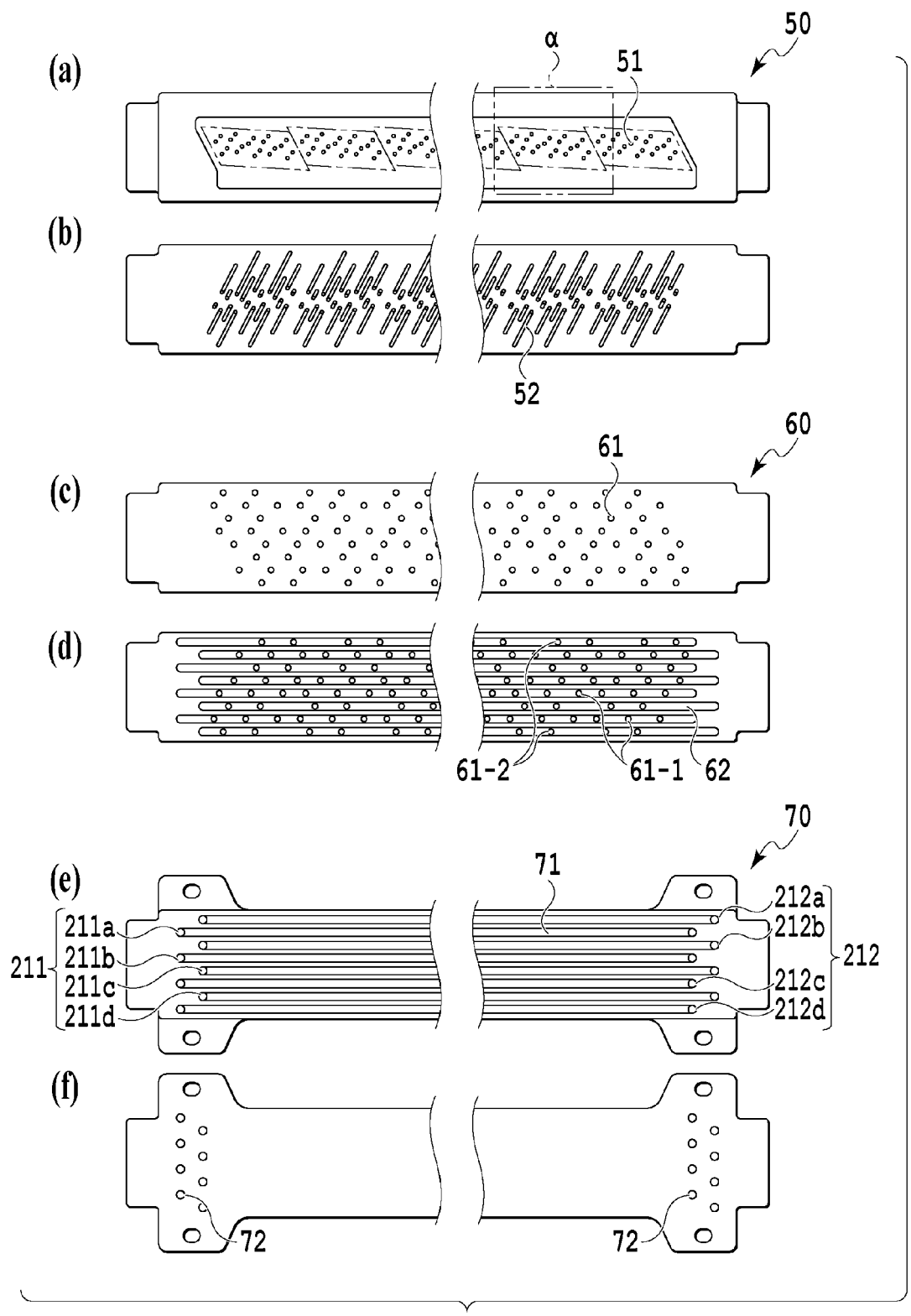
FIG. 7 is a diagram illustrating front and rear faces of first to third passage members.

FIGS. 7(a) to 7(f) are diagrams illustrating front and rear faces of the first to third passage members. FIG. 7(a) illustrates a face onto which the ejection module 200 is mounted in the first passage member 50 and FIG. 7(f) illustrates a face with which the liquid ejection unit support portion 81 comes into contact in the third passage member 70. The first passage member 50 and the second passage member 60 are bonded to teach other so that the parts illustrated in FIGS. 7(b) and 7(c) and corresponding to the contact faces of the passage members face each other and the second passage member and the third passage member are bonded to each other so that the parts illustrated in FIGS. 7(d) and 7(e) and corresponding to the contact faces of the passage members face each other. When the second passage member 60 and the third passage member 70 are bonded to each other, eight common passages (211a, 211b, 211c, 211d, 212a, 212b, 212c, 212d) extending in the longitudinal direction of the passage member are formed by common passage grooves 62 and 71 of the passage members.

Accordingly, a set of the common supply passage 211 and the common collection passage 212 is formed inside the passage member 210 to correspond to each color. The ink is supplied from the common supply passage 211 to the liquid ejection head 3 and the ink supplied to the liquid ejection head 3 is collected by the common collection passage 212. A communication opening 72 (see FIG. 7(f)) of the third passage member 70 communicates with the holes of the joint rubber 100 and is fluid-connected to the liquid supply unit 220 (see FIG. 6). A bottom face of the common passage groove 62 of the second passage member 60 is provided with a plurality of communication openings 61 (a communication opening 61-1 communicating with the common supply passage 211 and a communication opening 61-2 communicating with the common collection passage 212) and communicates with one end of an individual passage groove 52 of the first passage member 50. The other end of the individual passage groove 52 of the first passage member 50 is provided with a communication opening 51 and is fluid-connected to the ejection modules 200 through the communication opening 51. By the individual passage groove 52, the passages can be densely provided at the center side of the passage member.

It is desirable that the first to third passage members be formed of a material having corrosion resistance with respect to a liquid and having a low linear expansion coefficient. As a material, for example, a composite material (resin) obtained by adding inorganic filler such as fiber or fine silica particles to a base material such as alumina, LCP (liquid crystal polymer), PPS (polyphenyl sulfide), PSF (polysulfone), or modified PPE (polyphenylene ether) can be appropriately used. As a method of forming the passage member 210, three passage members may be laminated and adhered to one another. When a resin composite material is selected as a material, a bonding method using welding may be used.

Figure 8:
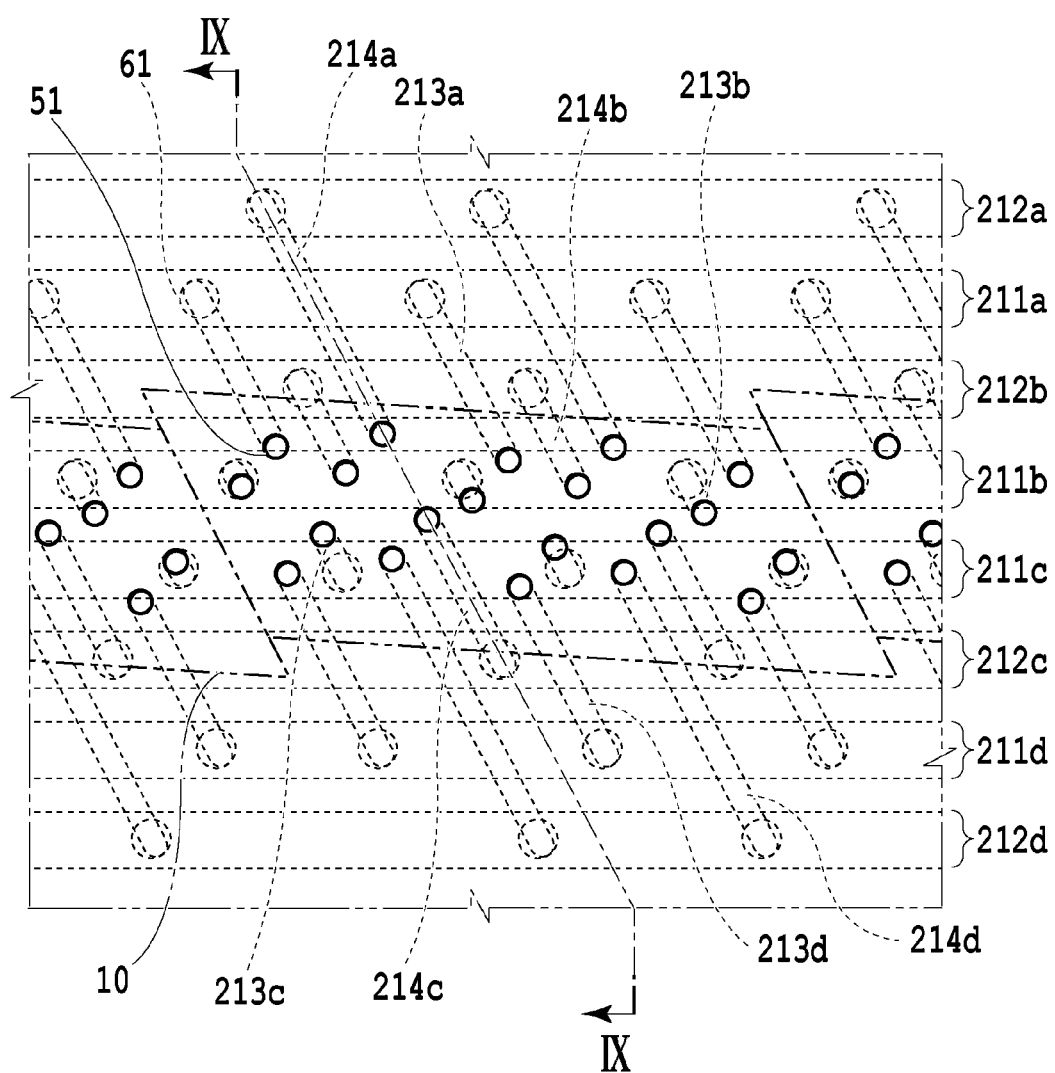
FIG. 8 is a perspective view illustrating a part a of FIG. 7(a) when viewed from an ejection module mounting face.

FIG. 8 is a partially enlarged perspective view illustrating a part α of FIG. 7(a) and illustrating the passages inside the passage member 210 formed by bonding the first to third passage members to one another when viewed from a face onto which the ejection module 200 is mounted in the first passage member 50. The common supply passage 211 and the common collection passage 212 are formed such that the common supply passage 211 and the common collection passage 212 are alternately disposed from the passages of both ends. Here, a connection relation among the passages inside the passage member 210 will be described.

The passage member 210 is provided with the common supply passage 211 (211a, 211b, 211c, 211d) and the common collection passage 212 (212a, 212b, 212c, 212d) extending in the longitudinal direction of the liquid ejection head 3 and provided for each color. The individual supply passages 213 (213a, 213b, 213c, 213d) which are formed by the individual passage grooves 52 are connected to the common supply passages 211 of different colors through the communication openings 61. Further, the individual collection passages 214 (214a, 214b, 214c, 214d) formed by the individual passage grooves 52 are connected to the common collection passages 212 of different colors through the communication openings 61. With such a passage configuration, the ink can be intensively supplied to the print element board 10 located at the center portion of the passage member from the common supply passages 211 through the individual supply passages 213. Further, the ink can be collected from the print element board 10 to the common collection passages 212 through the individual collection passages 214.

Figure 9:
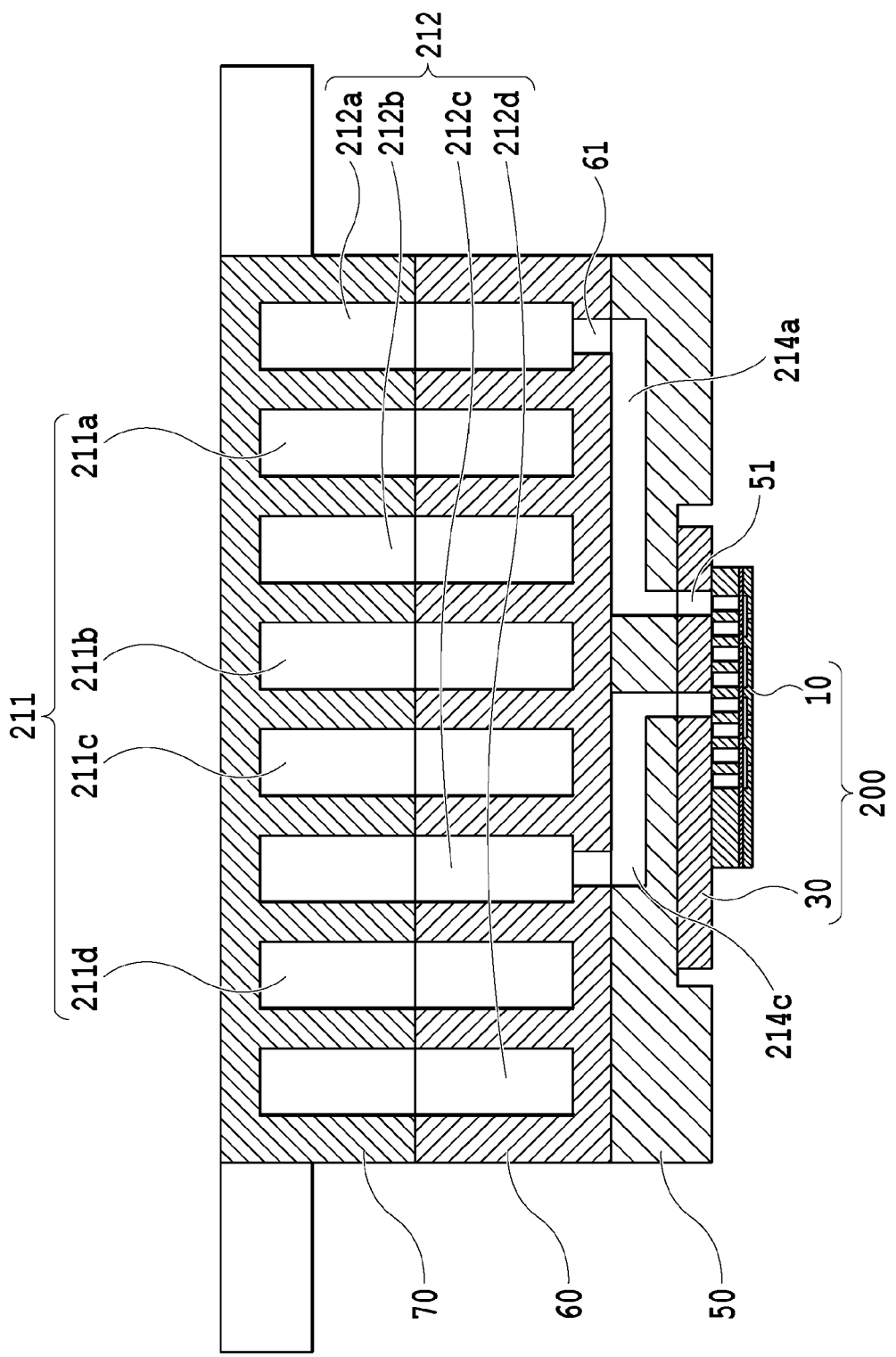
FIG. 9 is a cross-sectional view taken along a line IX-IX of FIG. 8.

FIG. 9 is a cross-sectional view taken along a line IX-IX of FIG. 8. The individual collection passage (214a, 214c) communicates with the ejection module 200 through the communication opening 51. In FIG. 9, only the individual collection passage (214a, 214c) is illustrated, but in a different cross-section, the individual supply passage 213 and the ejection module 200 communicates with each other as illustrated in FIG. 8. A support member 30 and the print element board 10 which are included in each ejection module 200 are provided with passages which supply the ink from the first passage member 50 to a print element 15 provided in the print element board 10. Further, the support member 30 and the print element board 10 are provided with passages which collect (re-circulate) a part or the entirety of the liquid supplied to the print element 15 to the first passage member 50.

Here, the common supply passage 211 of each color is connected to the negative pressure control unit 230 (the high pressure side) of corresponding color through the liquid supply unit 220 and the common collection passage 212 is connected to the negative pressure control unit 230 (the low pressure side) through the liquid supply unit 220. By the negative pressure control unit 230, a differential pressure (a difference in pressure) is generated between the common supply passage 211 and the common collection passage 212. For this reason, as illustrated in FIGS. 8 and 9, a flow is generated in order of the common supply passage 211 of each color, the individual supply passage 213, the print element board 10, the individual collection passage 214, and the common collection passage 212 inside the liquid ejection head of the application example having the passages connected to one another.

(Description of Ejection Module)

Figure 10A:
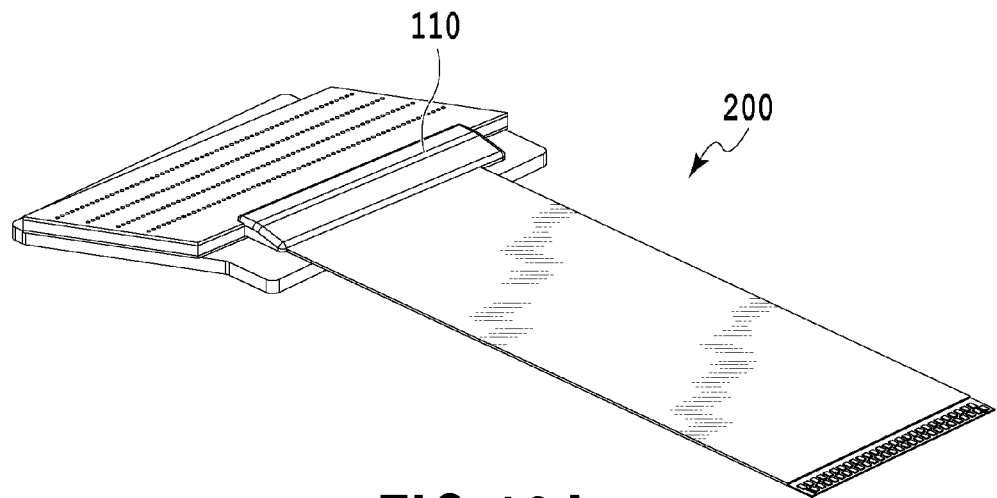
FIG. 10A is a perspective view illustrating one ejection module.
Figure 10B:
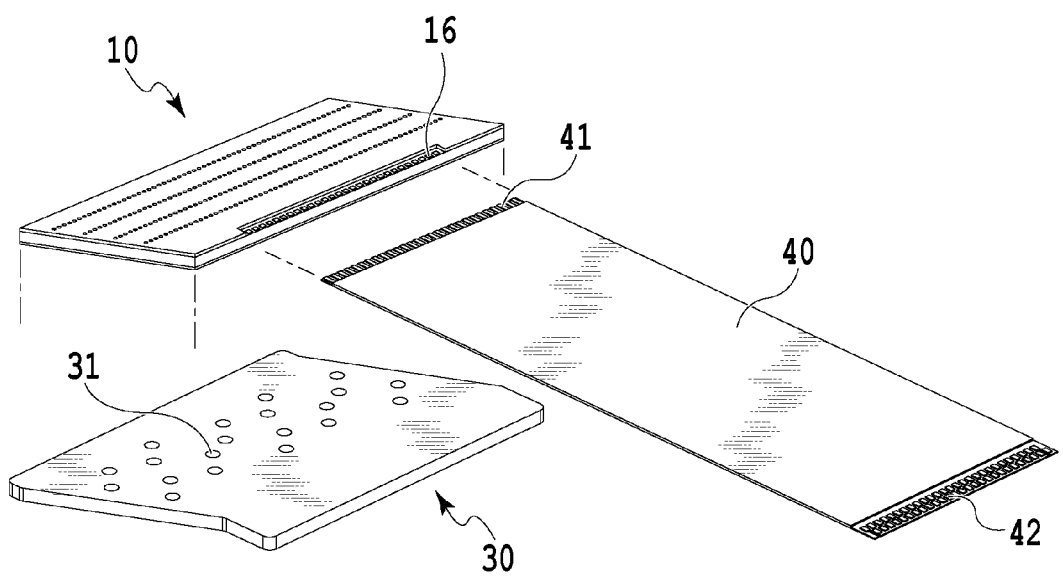
FIG. 10B is an exploded view illustrating one ejection module.

FIG. 10A is a perspective view illustrating one ejection module 200 and FIG. 10B is an exploded view thereof. As a method of manufacturing the ejection module 200, first, the print element board 10 and the flexible circuit board 40 are adhered onto the support member 30 provided with a liquid communication opening 31. Subsequently, a terminal 16 on the print element board 10 and a terminal 41 on the flexible circuit board 40 are electrically connected to each other by wire bonding and the wire bonded portion (the electrical connection portion) is sealed by the sealing member 110.

A terminal 42 which is opposite to the print element board 10 of the flexible circuit board 40 is electrically connected to a connection terminal 93 (see FIG. 6) of the electric wiring board 90. Since the support member 30 serves as a support body that supports the print element board 10 and a passage member that fluid-communicates the print element board 10 and the passage member 210 to each other, it is desirable that the support member have high flatness and sufficiently high reliability while being bonded to the print element board. As a material, for example, alumina or resin is desirable.

(Description of Structure of Print Element Board)

Figure 11A:
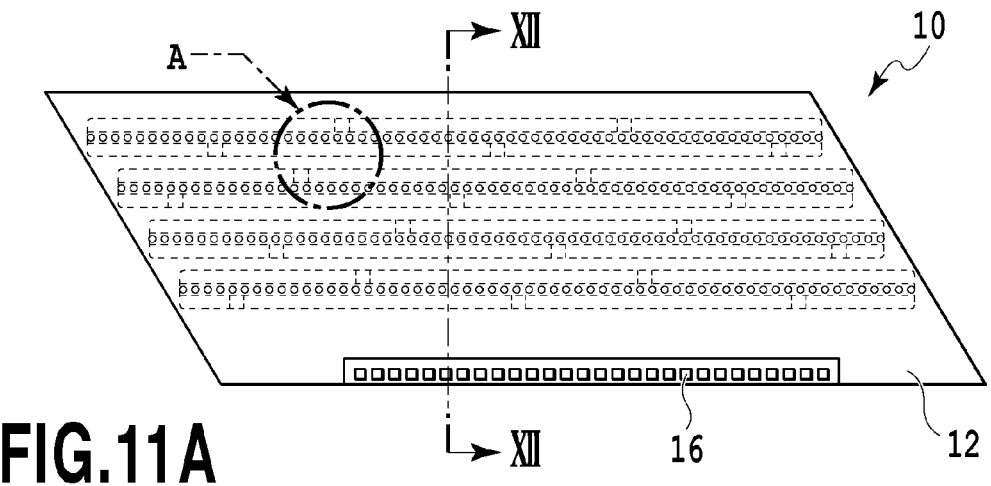
FIG. 11A is a diagram illustrating a print element board.
Figure 11B:
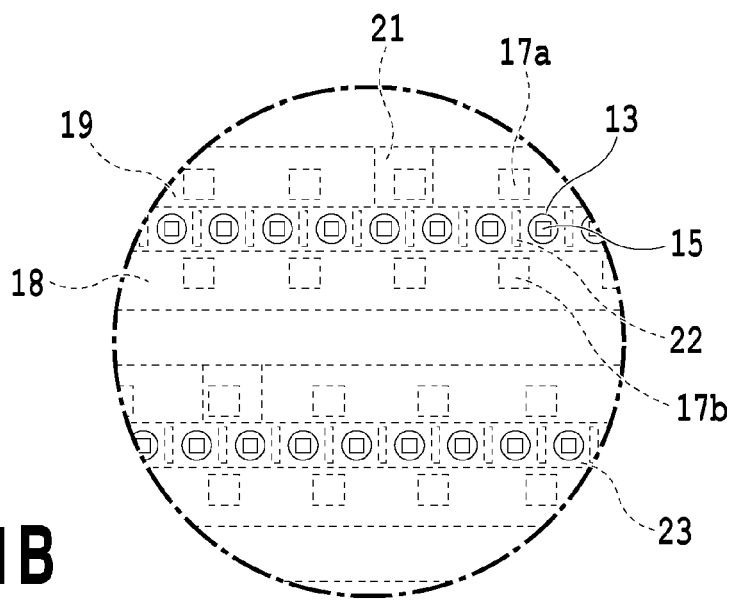
FIG. 11B is a diagram illustrating the print element board.
Figure 11C:
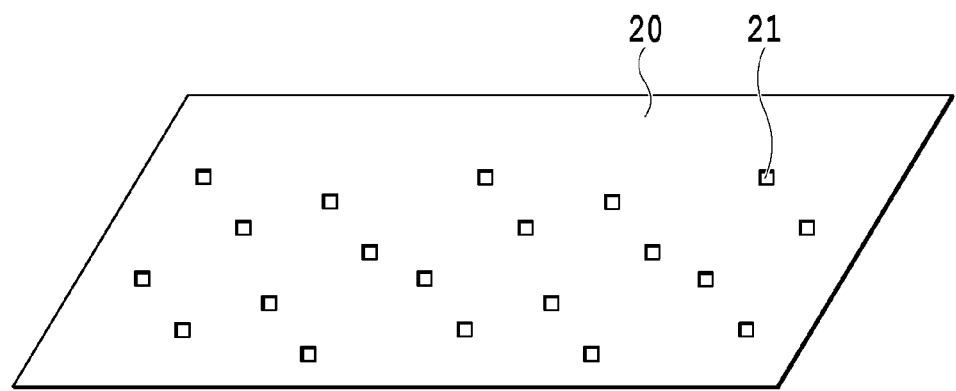
FIG. 11C is a diagram illustrating the print element board.

FIG. 11A is a top view illustrating a face provided with an ejection opening 13 in the print element board 10, FIG. 11B is an enlarged view of a part A of FIG. 11A, and FIG. 11C is a top view illustrating a rear face of FIG. 11A. Here, a configuration of the print element board of the application example will be described. As illustrated in FIG. 11A, an ejection opening forming member of the print element board 10 is provided with four ejection opening rows corresponding to different colors of inks. Further, the extension direction of the ejection opening rows of the ejection openings 13 will be referred to as an "ejection opening row direction". As illustrated in FIG. 11B, the print element 15 serving as an ejection energy generation element for ejecting the liquid by heat energy is disposed at a position corresponding to each ejection opening 13. A pressure chamber 23 provided inside the print element 15 is defined by a partition wall 22.

The print element 15 is electrically connected to the terminal 16 by an electric wire (not illustrated) provided in the print element board 10. Then, the print element 15 boils the liquid while being heated on the basis of a pulse signal input from a control circuit of the printing apparatus 1000 via the electric wiring board 90 (see FIG. 6) and the flexible circuit board 40 (see FIG. 10B). The liquid is ejected from the ejection opening 13 by a foaming force caused by the boiling. As illustrated in FIG. 11B, a liquid supply path 18 extends at one side along each ejection opening row and a liquid collection path 19 extends at the other side along the ejection opening row. The liquid supply path 18 and the liquid collection path 19 are passages that extend in the ejection opening row direction provided in the print element board 10 and communicate with the ejection opening 13 through a supply opening 17a and a collection opening 17b.

As illustrated in FIG. 11C, a sheet-shaped lid member 20 is laminated on a rear face of a face provided with the ejection opening 13 in the print element board 10 and the lid member 20 is provided with a plurality of openings 21 communicating with the liquid supply path 18 and the liquid collection path 19. In the application example, the lid member 20 is provided with three openings 21 for each liquid supply path 18 and two openings 21 for each liquid collection path 19. As illustrated in FIG. 11B, openings 21 of the lid member 20 communicate with the communication openings 51 illustrated in FIG. 7(a).

It is desirable that the lid member 20 have sufficient corrosion resistance for the liquid. From the viewpoint of preventing mixed color, the opening shape and the opening position of the opening 21 need to have high accuracy. For this reason, it is desirable to form the opening 21 by using a photosensitive resin material or a silicon plate as a material of the lid member 20 through photolithography. In this way, the lid member 20 changes the pitch of the passages by the opening 21. Here, it is desirable to form the lid member by a film-shaped member with a thin thickness in consideration of pressure loss.

Figure 12:
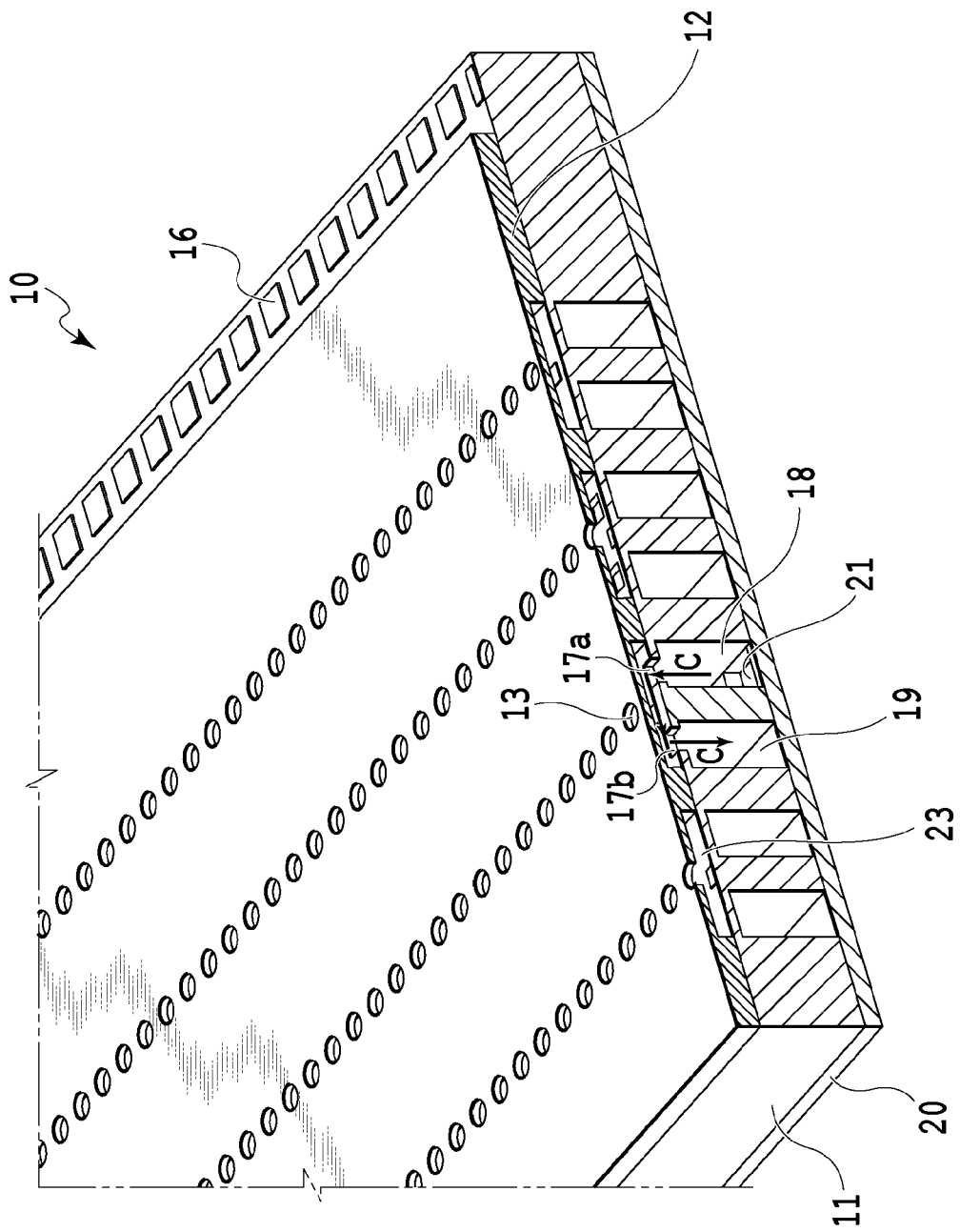
FIG. 12 is a perspective view illustrating a cross-section of the print element board and a lid member.

FIG. 12 is a perspective view illustrating cross-sections of the print element board 10 and the lid member 20 when taken along a line XII-XII of FIG. 11A. Here, a flow of the liquid inside the print element board 10 will be described. The lid member 20 serves as a lid that forms a part of walls of the liquid supply path 18 and the liquid collection path 19 formed in a substrate 11 of the print element board 10. The print element board 10 is formed by laminating the substrate 11 formed of Si and the ejection opening forming member 12 formed of photosensitive resin and the lid member 20 is bonded to a rear face of the substrate 11. One face of the substrate 11 is provided with the print element 15 (see FIG. 11B) and a rear face thereof is provided with grooves forming the liquid supply path 18 and the liquid collection path 19 extending along the ejection opening row.

The liquid supply path 18 and the liquid collection path 19 which are formed by the substrate 11 and the lid member 20 are respectively connected to the common supply passage 211 and the common collection passage 212 inside each passage member 210 and a differential pressure is generated between the liquid supply path 18 and the liquid collection path 19. When the liquid is ejected from the ejection opening 13 to print an image, the liquid inside the liquid supply path 18 provided inside the substrate 11 at the ejection opening not ejecting the liquid flows toward the liquid collection path 19 through the supply opening 17a, the pressure chamber 23, and the collection opening 17b by the differential pressure (see an arrow C of FIG. 12). By the flow, foreign materials, bubbles, and thickened ink produced by the evaporation from the ejection opening 13 in the ejection opening 13 or the pressure chamber 23 not involved with a printing operation can be collected by the liquid collection path 19. Further, the thickening of the ink of the ejection opening 13 or the pressure chamber 23 can be suppressed.

The liquid which is collected to the liquid collection path 19 is collected in order of the communication opening 51 (see FIG. 7(a)) inside the passage member 210, the individual collection passage 214, and the common collection passage 212 through the opening 21 of the lid member 20 and the liquid communication opening 31 (see FIG. 10B) of the support member 30. Then, the liquid is collected by the collection path of the printing apparatus 1000. That is, the liquid supplied from the printing apparatus body to the liquid ejection head 3 flows in the following order to be supplied and collected.

First, the liquid flows from the liquid connection portion 111 of the liquid supply unit 220 into the liquid ejection head 3. Then, the liquid is sequentially supplied through the joint rubber 100, the communication opening 72 and the common passage groove 71 provided in the third passage member, the common passage groove 62 and the communication opening 61 provided in the second passage member, and the individual passage groove 52 and the communication opening 51 provided in the first passage member. Subsequently, the liquid is supplied to the pressure chamber 23 while sequentially passing through the liquid communication opening 31 provided in the support member 30, the opening 21 provided in the lid member 20, and the liquid supply path 18 and the supply opening 17a provided in the substrate 11. In the liquid supplied to the pressure chamber 23, the liquid which is not ejected from the ejection opening 13 sequentially flows through the collection opening 17b and the liquid collection path 19 provided in the substrate 11, the opening 21 provided in the lid member 20, and the liquid communication opening 31 provided in the support member 30. Subsequently, the liquid sequentially flows through the communication opening and the individual passage groove 52 provided in the first passage member, the communication opening 61 and the common passage groove 62 provided in the second passage member, the common passage groove 71 and the communication opening 72 provided in the third passage member 70, and the joint rubber 100. Then, the liquid flows from the liquid connection portion 111 provided in the liquid supply unit 220 to the outside of the liquid ejection head 3.

In the first circulation mode illustrated in FIG. 2, the liquid which flows from the liquid connection portion 111 is supplied to the joint rubber 100 through the negative pressure control unit 230. Further, in the second circulation mode illustrated in FIG. 3, the liquid which is collected from the pressure chamber 23 passes through the joint rubber 100 and flows from the liquid connection portion 111 to the outside of the liquid ejection head through the negative pressure control unit 230. The entire liquid which flows from one end of the common supply passage 211 of the liquid ejection unit 300 is not supplied to the pressure chamber 23 through the individual supply passage 213a.

That is, the liquid may flow from the other end of the common supply passage 211 to the liquid supply unit 220 while not flowing into the individual supply passage 213a by the liquid which flows from one end of the common supply passage 211. In this way, since the path is provided so that the liquid flows therethrough without passing through the print element board 10, the reverse flow of the circulation flow of the liquid can be suppressed even in the print element board 10 including the large passage with a small flow resistance as in the application example. In this way, since the thickening of the liquid in the vicinity of the ejection opening or the pressure chamber 23 can be suppressed in the liquid ejection head 3 of the application example, a slippage or a non-ejection can be suppressed. As a result, a high-quality image can be printed.

(Description of Positional Relation Among Print Element Boards)

Figure 13:
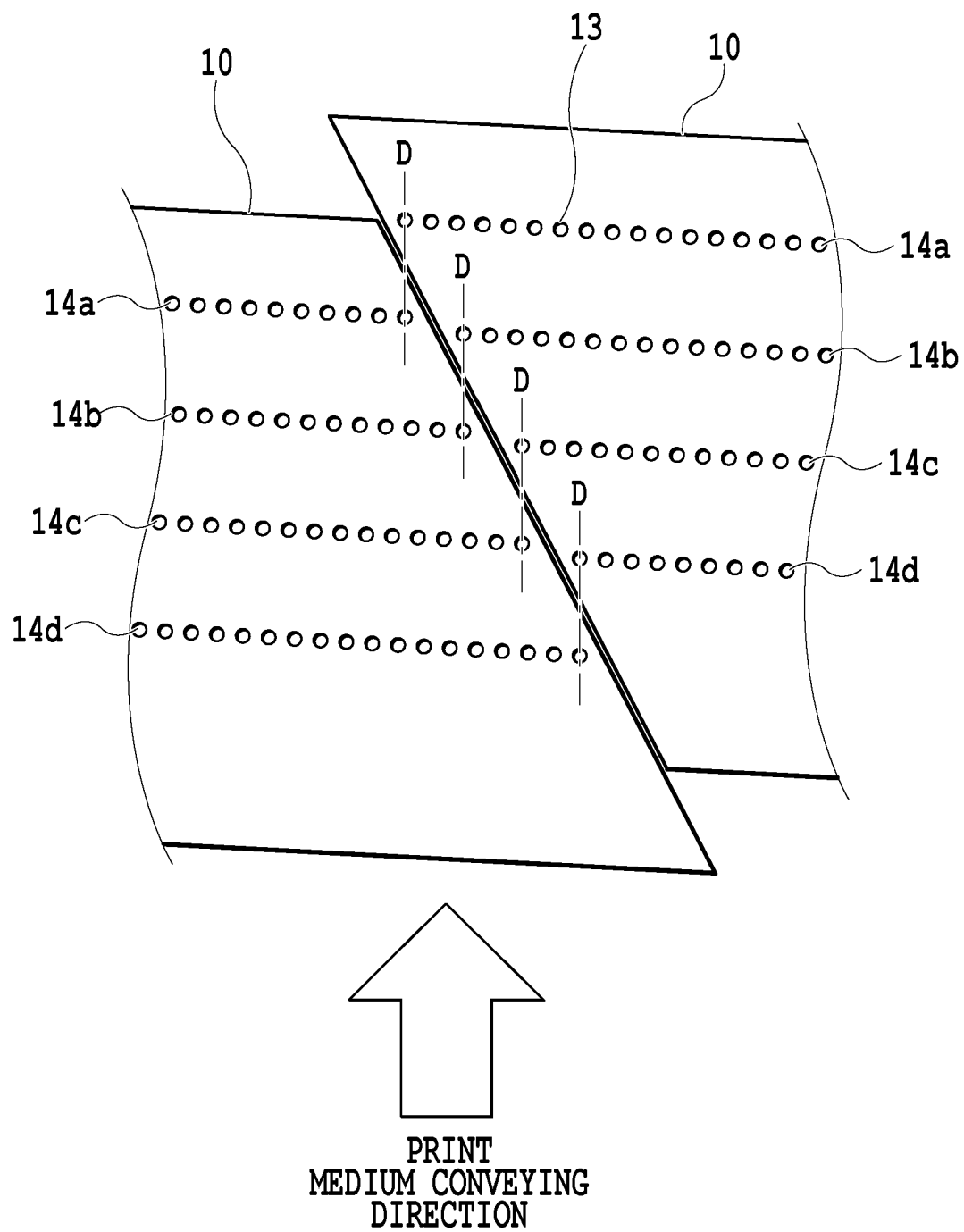
FIG. 13 is a partially enlarged top view of an adjacent portion of the print element board.

FIG. 13 is a partially enlarged top view illustrating an adjacent portion of the print element board in two adjacent ejection modules. In the application example, a substantially parallelogram print element board is used. Ejection opening rows (14a to 14d) having the ejection openings 13 arranged in each print element board 10 are disposed to be inclined while having a predetermined angle with respect to the longitudinal direction of the liquid ejection head 3. Then, the ejection opening row at the adjacent portion between the print element boards 10 is formed such that at least one ejection opening overlaps in the print medium conveying direction. In FIG. 13, two ejection openings on a line D overlap each other.

With such an arrangement, even when a position of the print element board 10 is slightly deviated from a predetermined position, black streaks or missing of a print image cannot be seen by a driving control of the overlapping ejection openings. Even when the print element boards 10 are disposed in a straight linear shape (an in-line shape) instead of a zigzag shape, black streaks or missing at the connection portion between the print element boards 10 can be handled while an increase in the length of the liquid ejection head 3 in the print medium conveying direction is suppressed by the configuration illustrated in FIG. 13. Further, in the application example, a principal plane of the print element board has a parallelogram shape, but the invention is not limited thereto. For example, even when the print element boards having a rectangular shape, a trapezoid shape, and the other shapes are used, the configuration of the invention can be desirably used.

(Description of Modified Example of Configuration of Liquid Ejection Head)

Figure 40:
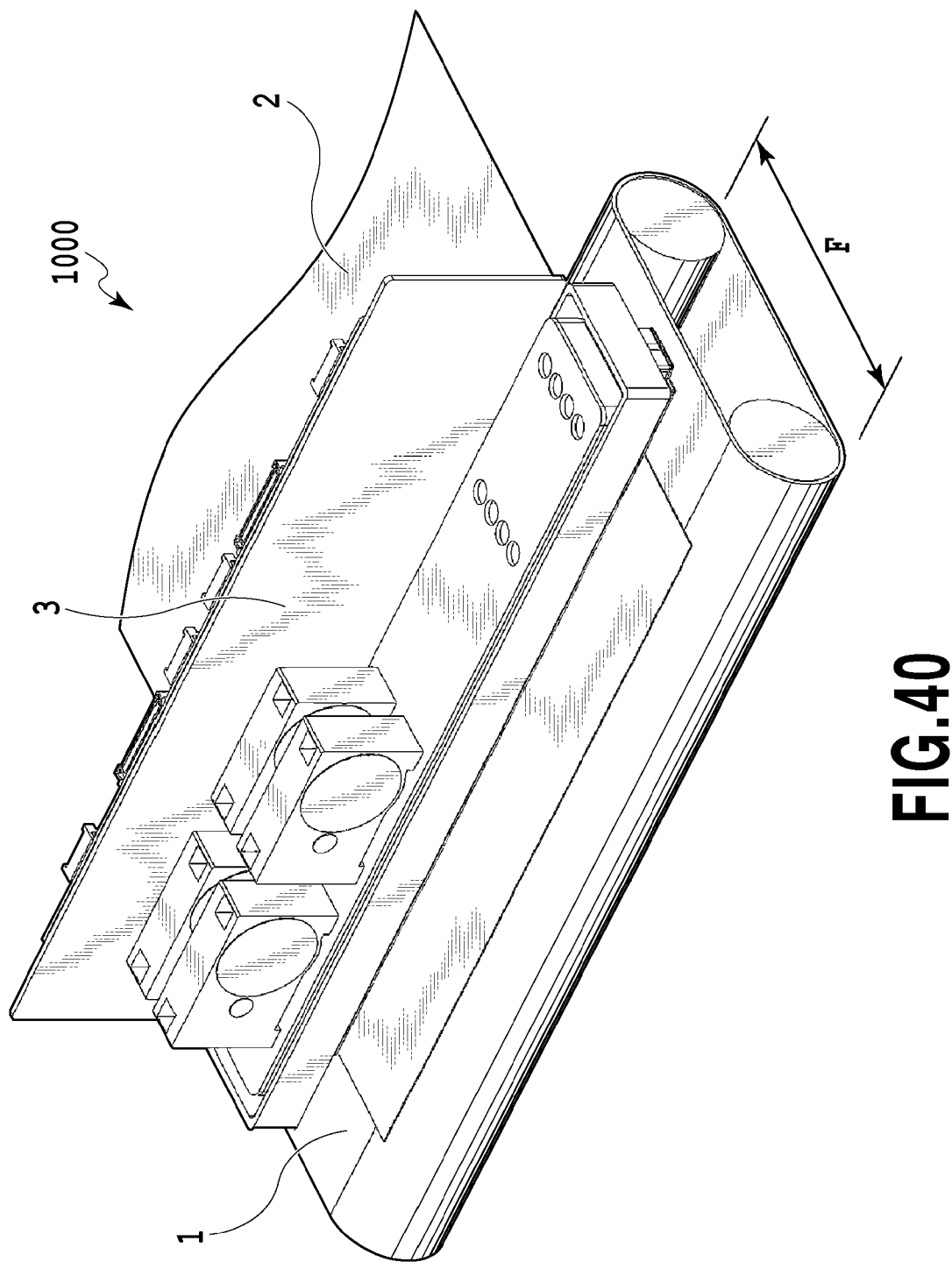
FIG. 40 is an explanatory schematic diagram illustrating a liquid ejection apparatus according to a first application example.
Figure 42A:
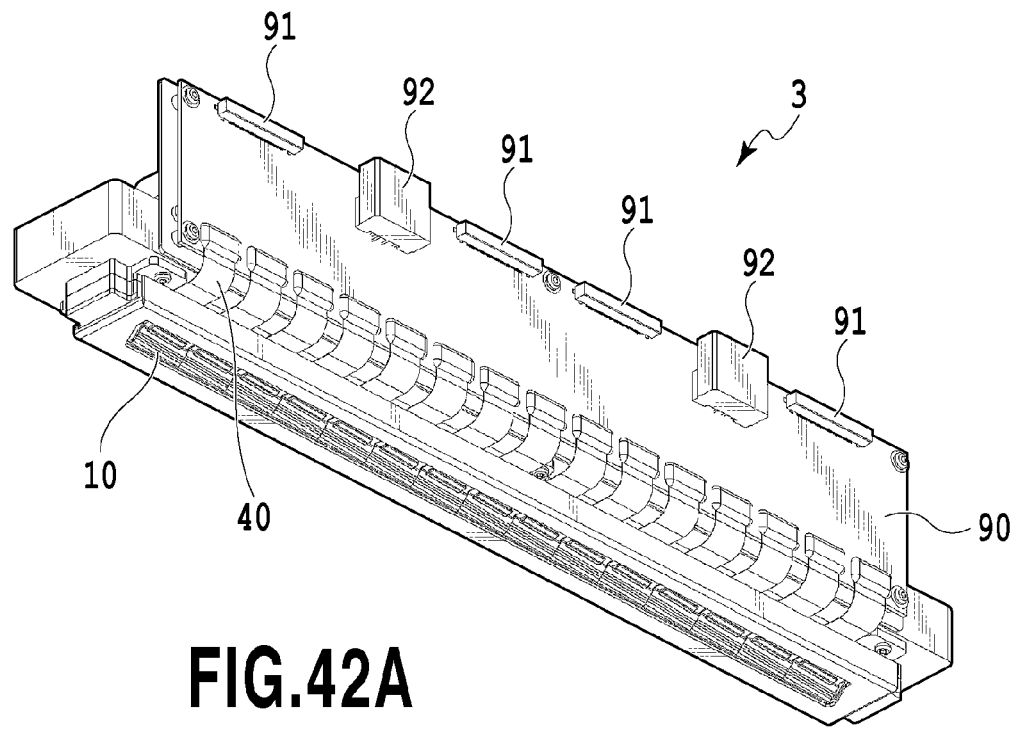
FIGS. 42A and 42B are explanatory diagrams illustrating a liquid ejection head of the first application example.
Figure 42B:
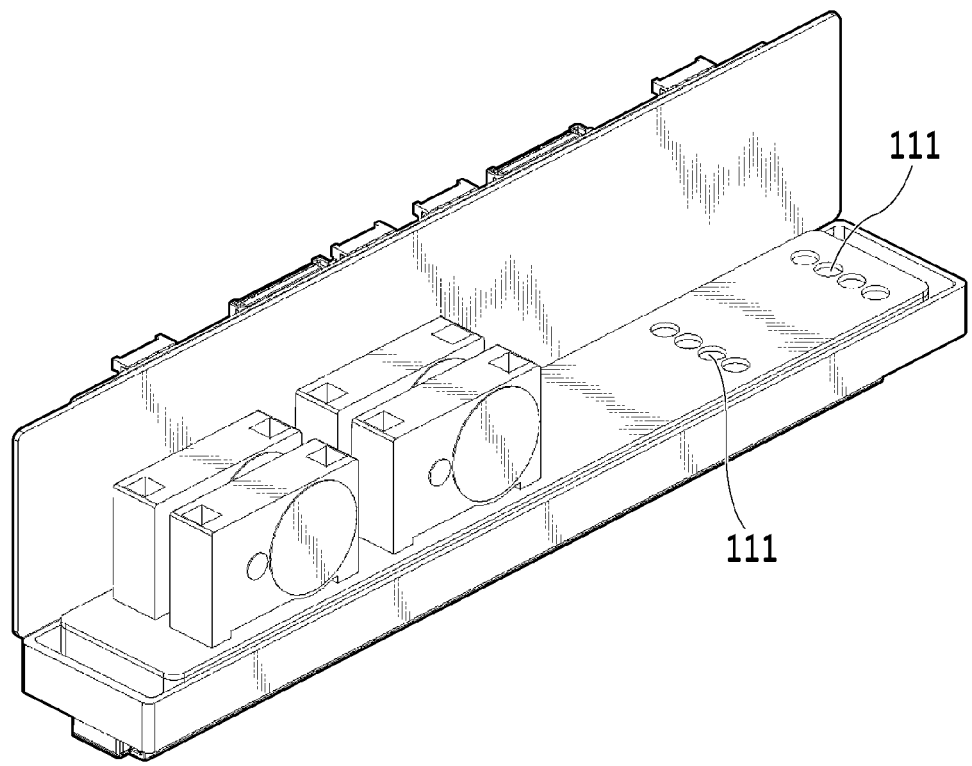
Figure 43:
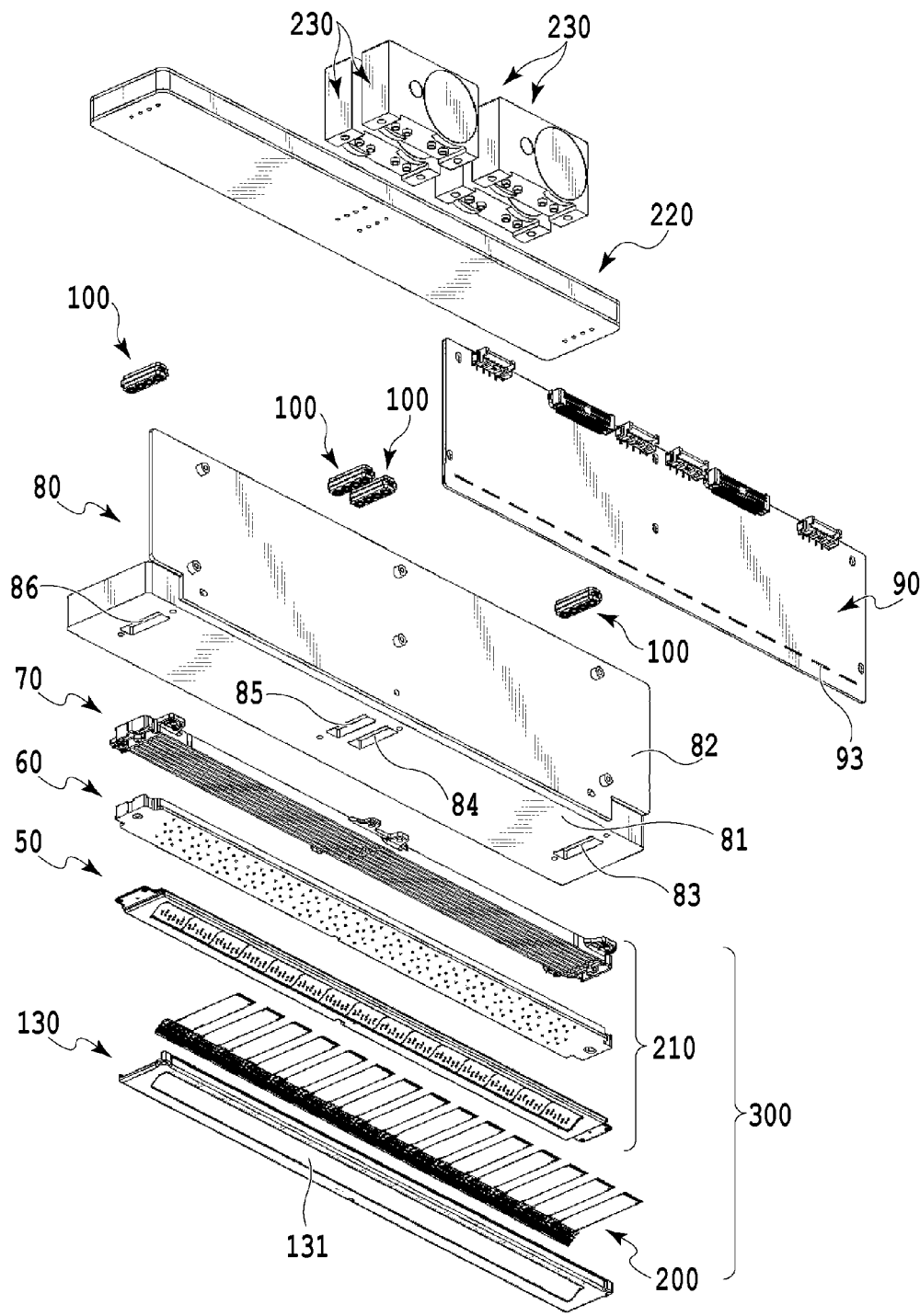
FIG. 43 is an explanatory diagram illustrating the liquid ejection head of the first application example.

A modified example of a configuration of the liquid ejection head illustrated in FIG. 40 and FIGS. 42A to 44 will be described. A description of the same configuration and function as those of the above-described example will be omitted and only a difference will be mainly described. In the modified example, as illustrated in FIGS. 40, 42A and 42B, the liquid connection portions 111 between the liquid ejection head 3 and the outside are intensively disposed at one end side of the liquid ejection head in the longitudinal direction. The negative pressure control units 230 are intensively disposed at the other end side of the liquid ejection head 3 (FIG. 43). The liquid supply unit 220 that belongs to the liquid ejection head 3 is configured as an elongated unit corresponding to the length of the liquid ejection head 3 and includes passages and filters 221 respectively corresponding to four liquids to be supplied. As illustrated in FIG. 43, the positions of the openings 83 to 86 provided at the liquid ejection unit support portion 81 are also located at positions different from those of the liquid ejection head 3.

Figure 44:
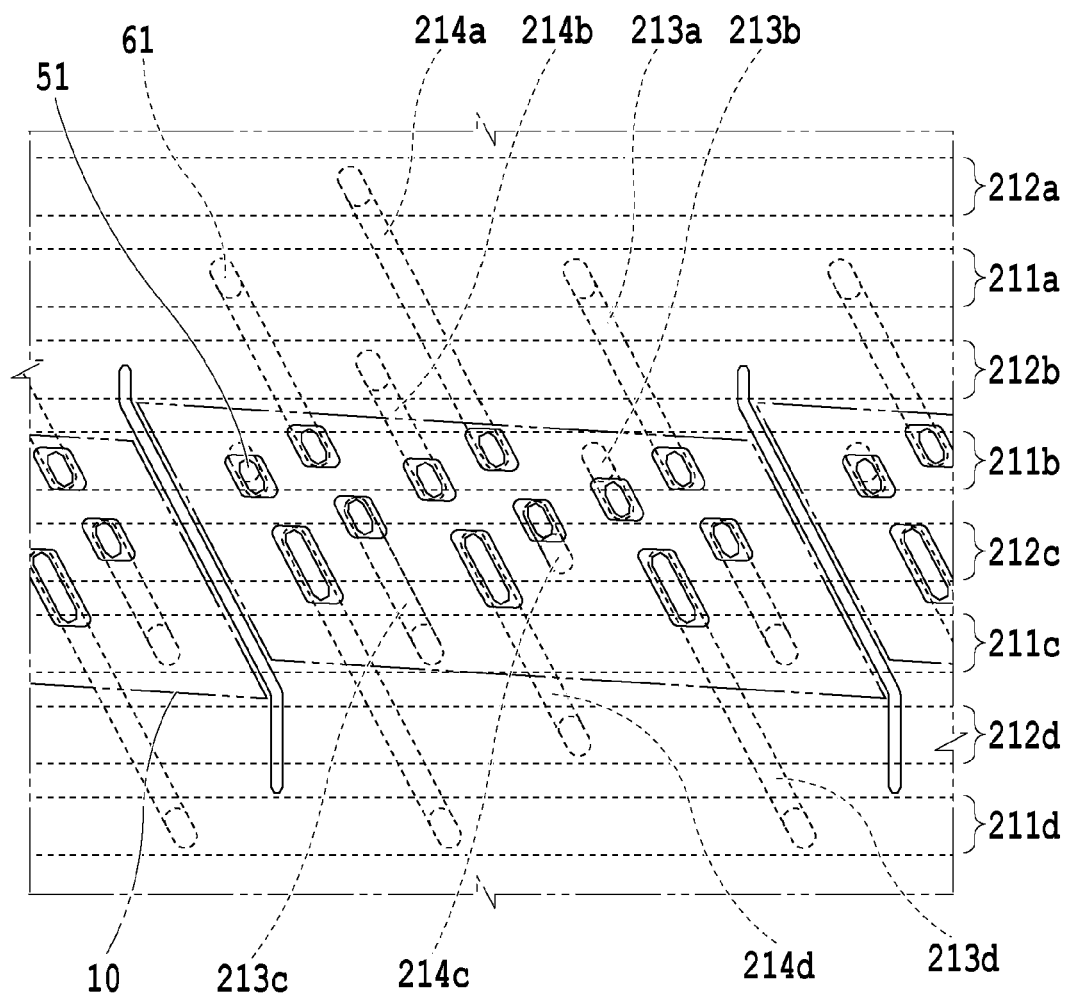
FIG. 44 is an explanatory diagram illustrating the liquid ejection head of the first application example.

FIG. 44 illustrates a lamination state of the passage members 50, 60, and 70. The print element boards 10 are arranged linearly on the upper face of the passage member 50 which is the uppermost layer among the passage members 50, 60, and 70. As the passage which communicates with the opening 21 (FIG. 17) formed at the rear face side of each print element board 10, two individual supply passages 213 and one individual collection passage 214 are provided for each color of the liquid. Accordingly, as the opening 21 which is formed at the lid member 20 provided at the rear face of the print element board 10, two supply openings 21 and one collection opening 21 are provided for each color of the liquid. As illustrated in FIG. 44, the common supply passage 211 and the common collection passage 212 extending along the longitudinal direction of the liquid ejection head 3 are alternately arranged.

(Second Application Example)

Hereinafter, configurations of an inkjet printing apparatus 2000 and a liquid ejection head 2003 according to a second application example of the invention will be described with reference to the drawings. In the description below, only a difference from the first application example will be described and a description of the same components as those of the first application example will be omitted.

(Description of Inkjet Printing Apparatus)

Figure 21:
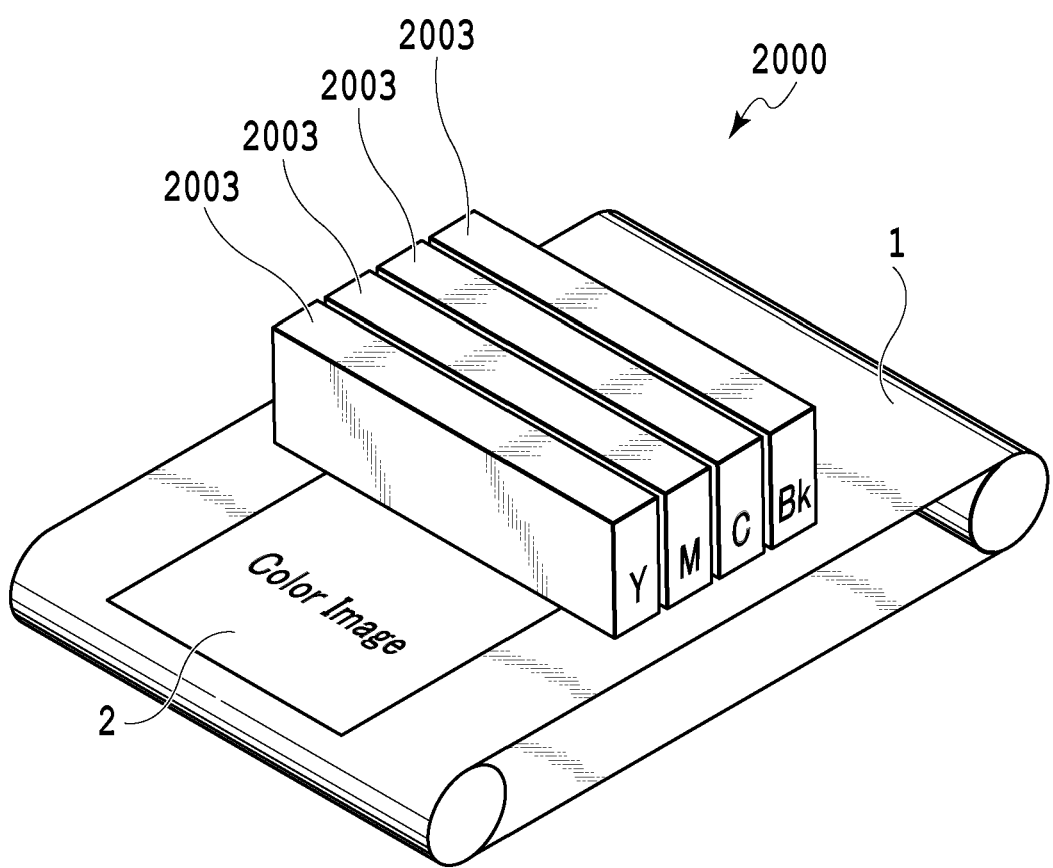
FIG. 21 is a diagram illustrating an inkjet printing apparatus that prints an image by ejecting a liquid.

FIG. 21 is a diagram illustrating the inkjet printing apparatus 2000 according to the application example used to eject the liquid. The printing apparatus 2000 of the application example is different from the first application example in that a full color image is printed on the print medium by a configuration in which four monochromic liquid ejection heads 2003 respectively corresponding to the inks of cyan C, magenta M, yellow Y, and black K are disposed in parallel. In the first application example, the number of the ejection opening rows which can be used for one color is one. However, in the application example, the number of the ejection opening rows which can be used for one color is twenty. For this reason, when print data is appropriately distributed to a plurality of ejection opening rows to print an image, an image can be printed at a higher speed.

Further, even when there are the ejection openings that do not eject the liquid, the liquid is ejected complementarily from the ejection openings of the other rows located at positions corresponding to the non-ejection openings in the print medium conveying direction. The reliability is improved and thus a commercial image can be appropriately printed. Similarly to the first application example, the supply system, the buffer tank 1003 (see FIGS. 2 and 3), and the main tank 1006 (see FIGS. 2 and 3) of the printing apparatus 2000 are fluid-connected to the liquid ejection heads 2003. Further, an electrical control unit which transmits power and ejection control signals to the liquid ejection head 2003 is electrically connected to the liquid ejection heads 2003.

(Description of Circulation Path)

Similarly to the first application example, the first and second circulation modes illustrated in FIG. 2 or 3 can be used as the liquid circulation mode between the printing apparatus 2000 and the liquid ejection head 2003.

(Description of Structure of Liquid Ejection Head)

Figure 14A:
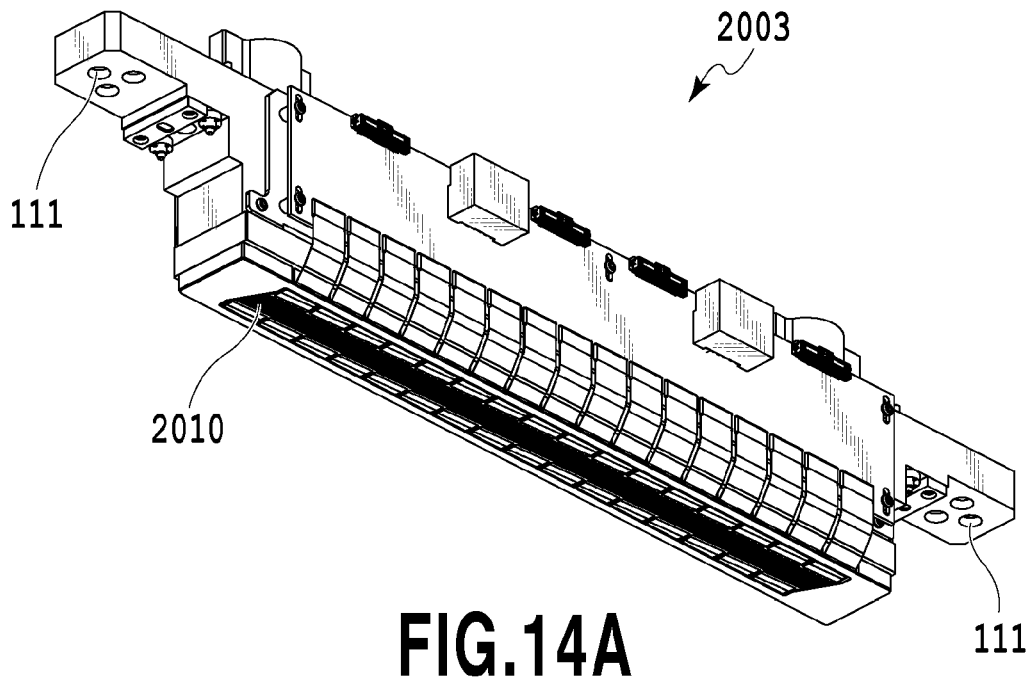
FIG. 14A is a perspective view illustrating the liquid ejection head.
Figure 14B:
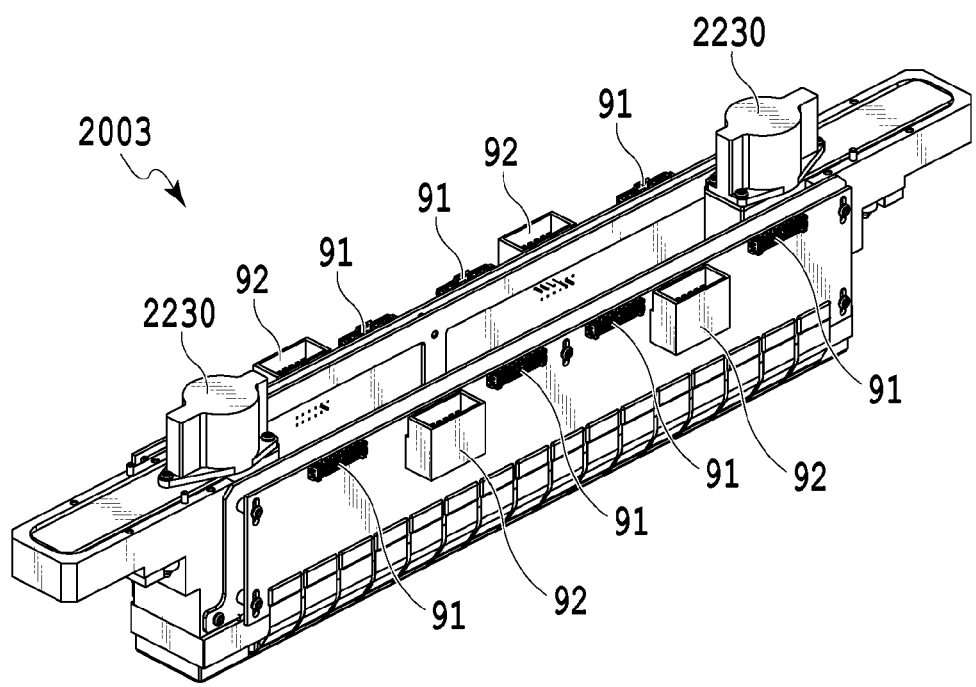
FIG. 14B is a perspective view illustrating the liquid ejection head.

FIGS. 14A and 14B are perspective views illustrating the liquid ejection head 2003 according to the application example. Here, a structure of the liquid ejection head 2003 according to the application example will be described. The liquid ejection head 2003 is an inkjet line type (page wide type) print head which includes sixteen print element boards 2010 arranged linearly in the longitudinal direction of the liquid ejection head 2003 and can print an image by one kind of liquid. Similarly to the first application example, the liquid ejection head 2003 includes the liquid connection portion 111, the signal input terminal 91, and the power supply terminal 92. However, since the liquid ejection head 2003 of the application example includes many ejection opening rows compared with the first application example, the signal input terminal 91 and the power supply terminal 92 are disposed at both sides of the liquid ejection head 2003. This is because a decrease in voltage or a delay in transmission of a signal caused by the wiring portion provided in the print element board 2010 needs to be reduced.

Figure 15:
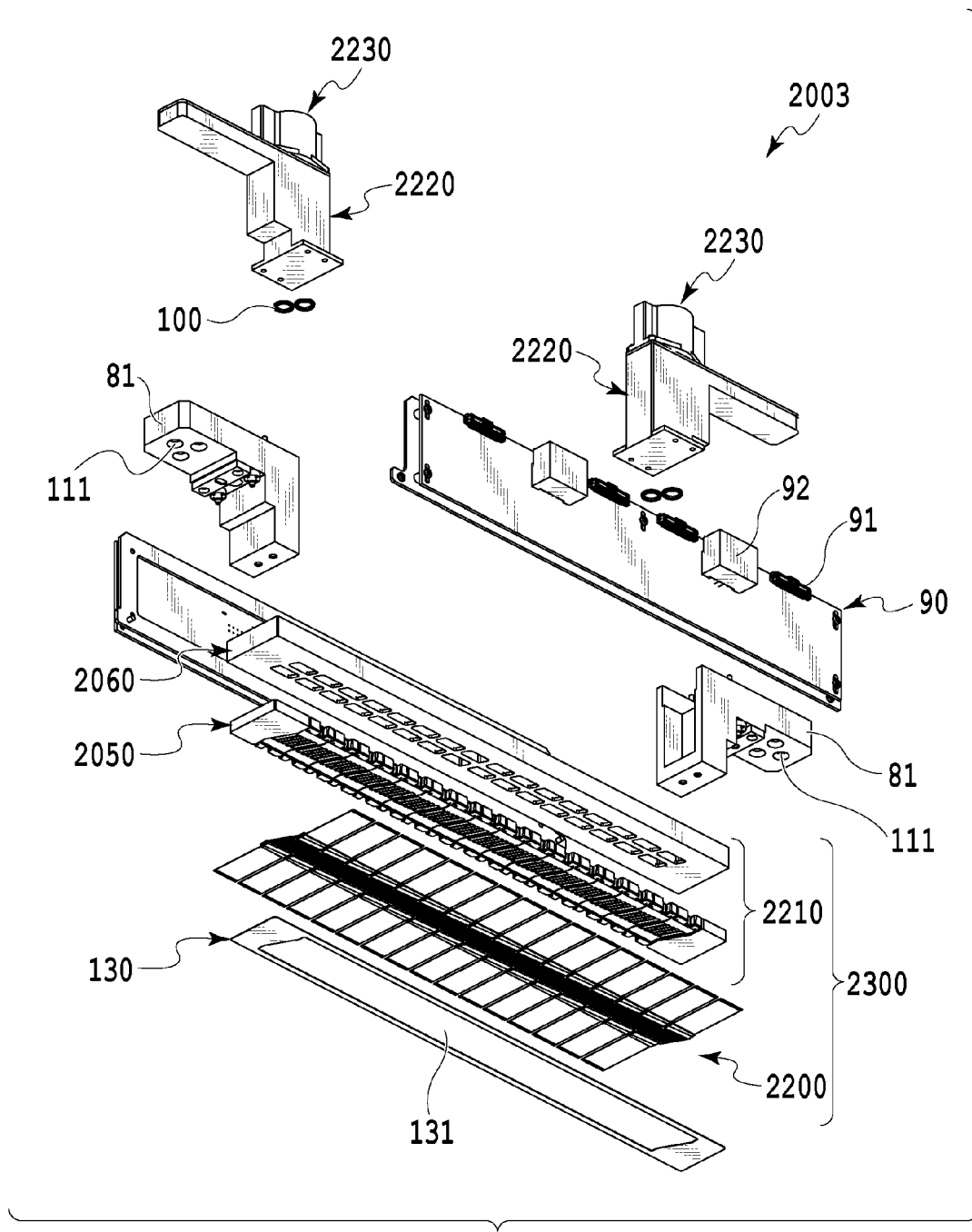
FIG. 15 is an oblique exploded view illustrating the liquid ejection head.

FIG. 15 is an oblique exploded view illustrating the liquid ejection head 2003 and components or units constituting the liquid ejection head 2003 according to the functions thereof. The function of each of units and members or the liquid flow sequence inside the liquid ejection head is basically similar to that of the first application example, but the function of guaranteeing the rigidity of the liquid ejection head is different. In the first application example, the rigidity of the liquid ejection head is mainly guaranteed by the liquid ejection unit support portion 81, but in the liquid ejection head 2003 of the second application example, the rigidity of the liquid ejection head is guaranteed by a second passage member 2060 included in a liquid ejection unit 2300.

The liquid ejection unit support portion 81 of the application example is connected to both ends of the second passage member 2060 and the liquid ejection unit 2300 is mechanically connected to a carriage of the printing apparatus 2000 to position the liquid ejection head 2003. The electric wiring board 90 and a liquid supply unit 2220 including a negative pressure control unit 2230 are connected to the liquid ejection unit support portion 81. Each of two liquid supply units 2220 includes a filter (not illustrated) built therein.

Two negative pressure control units 2230 are set to control a pressure at different and relatively high and low negative pressures. Further, as in FIGS. 14B and 15, when the negative pressure control units 2230 at the high pressure side and the low pressure side are provided at both ends of the liquid ejection head 2003, the flows of the liquid in the common supply passage and the common collection passage extending in the longitudinal direction of the liquid ejection head 2003 face each other in the extending direction. In such a configuration, a heat exchange between the common supply passage and the common collection passage is promoted and thus a difference in temperature inside two common passages is reduced. Accordingly, a difference in temperature of the print element boards 2010 provided along the common passage is reduced. As a result, there is an advantage that unevenness in printing is not easily caused by a difference in temperature.

Next, a detailed configuration of a passage member 2210 of the liquid ejection unit 2300 will be described. As illustrated in FIG. 15, the passage member 2210 is obtained by laminating a first passage member 2050 and a second passage member 2060 and distributes the liquid supplied from the liquid supply unit 2220 to ejection modules 2200. The passage member 2210 serves as a passage member that returns the liquid re-circulated from the ejection module 2200 to the liquid supply unit 2220. The second passage member 2060 of the passage member 2210 is a passage member having a common supply passage and a common collection passage formed therein and improving the rigidity of the liquid ejection head 2003. For this reason, it is desirable that a material of the second passage member 2060 have sufficient corrosion resistance for the liquid and high mechanical strength. Specifically, SUS, Ti, or alumina can be used.

Figure 16:
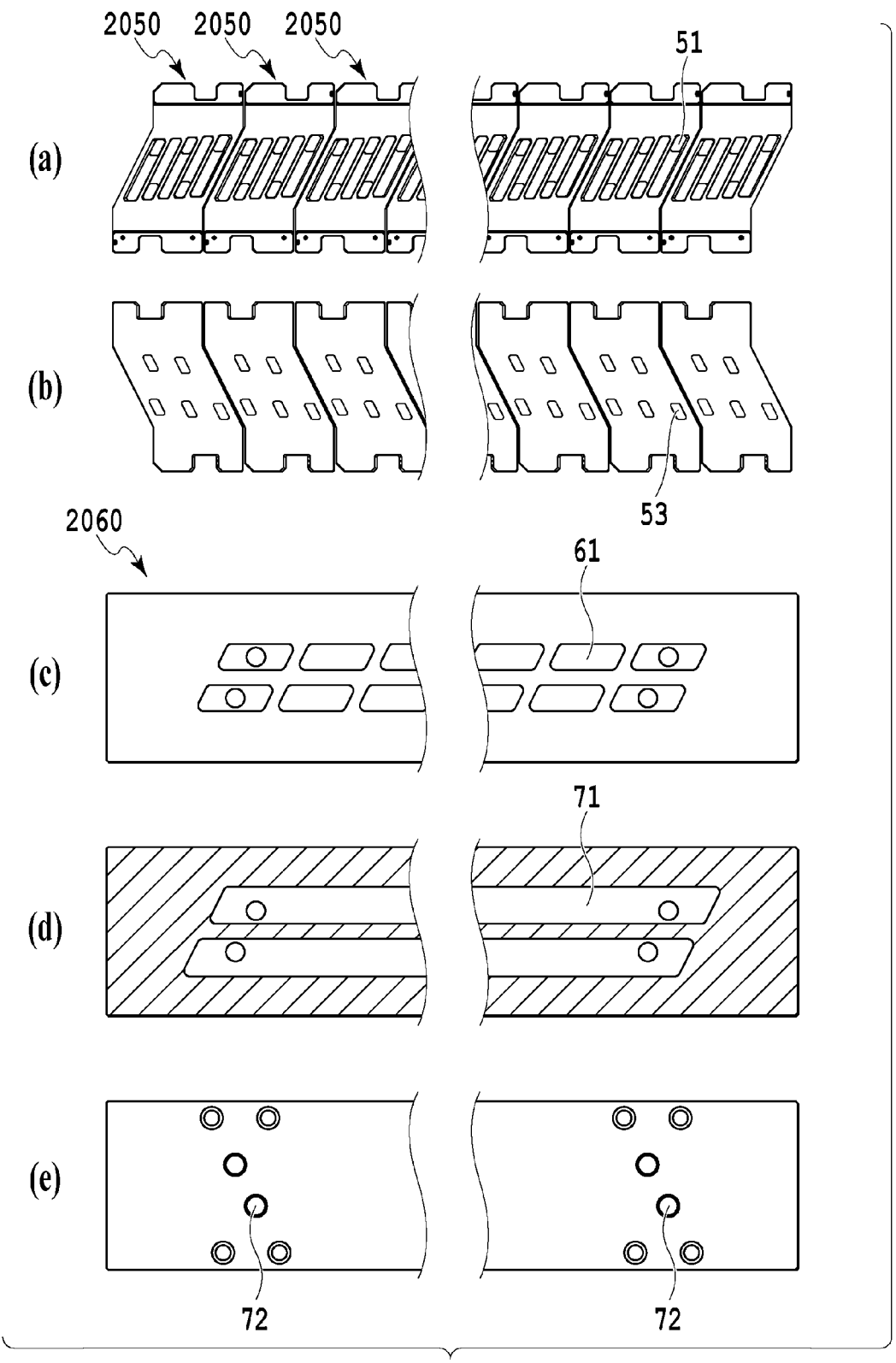
FIG. 16 is a diagram illustrating the first passage member.

FIG. 16(a) is a diagram illustrating a face onto which the ejection module 2200 is mounted in the first passage member 2050 and FIG. 16(b) is a diagram illustrating a rear face thereof and a face contacting the second passage member 2060. Differently from the first application example, the first passage member 2050 of the application example has a configuration in which a plurality of members are disposed adjacently to respectively correspond to the ejection modules 2200. By employing such a split structure, a plurality of modules can be arranged to correspond to a length of the liquid ejection head 2003. Accordingly, this structure can be appropriately used particularly in a relatively long liquid ejection head corresponding to, for example, a sheet having a size of B2 or more.

As illustrated in FIG. 16(a), the communication opening 51 of the first passage member 2050 fluid-communicates with the ejection module 2200. As illustrated in FIG. 16(b), the individual communication opening 53 of the first passage member 2050 fluid-communicates with the communication opening 61 of the second passage member 2060. FIG. 16(c) illustrates a contact face of the second passage member 60 with respect to the first passage member 2050, FIG. 16(d) illustrates a cross-section of a center portion of the second passage member 60 in the thickness direction, and FIG. 16(e) is a diagram illustrating a contact face of the second passage member 2060 with respect to the liquid supply unit 2220. The function of the communication opening or the passage of the second passage member 2060 is similar to each color of the first application example. The common passage groove 71 of the second passage member 2060 is formed such that one side thereof is a common supply passage 2211 illustrated in FIG. 17 and the other side thereof is a common collection passage 2212. These passages are respectively provided along the longitudinal direction of the liquid ejection head 2003 so that the liquid is supplied from one end thereof to the other end thereof. The application example is different from the first application example in that the liquid flow directions in the common supply passage 2211 and the common collection passage 2212 are opposite to each other.

Figure 17:
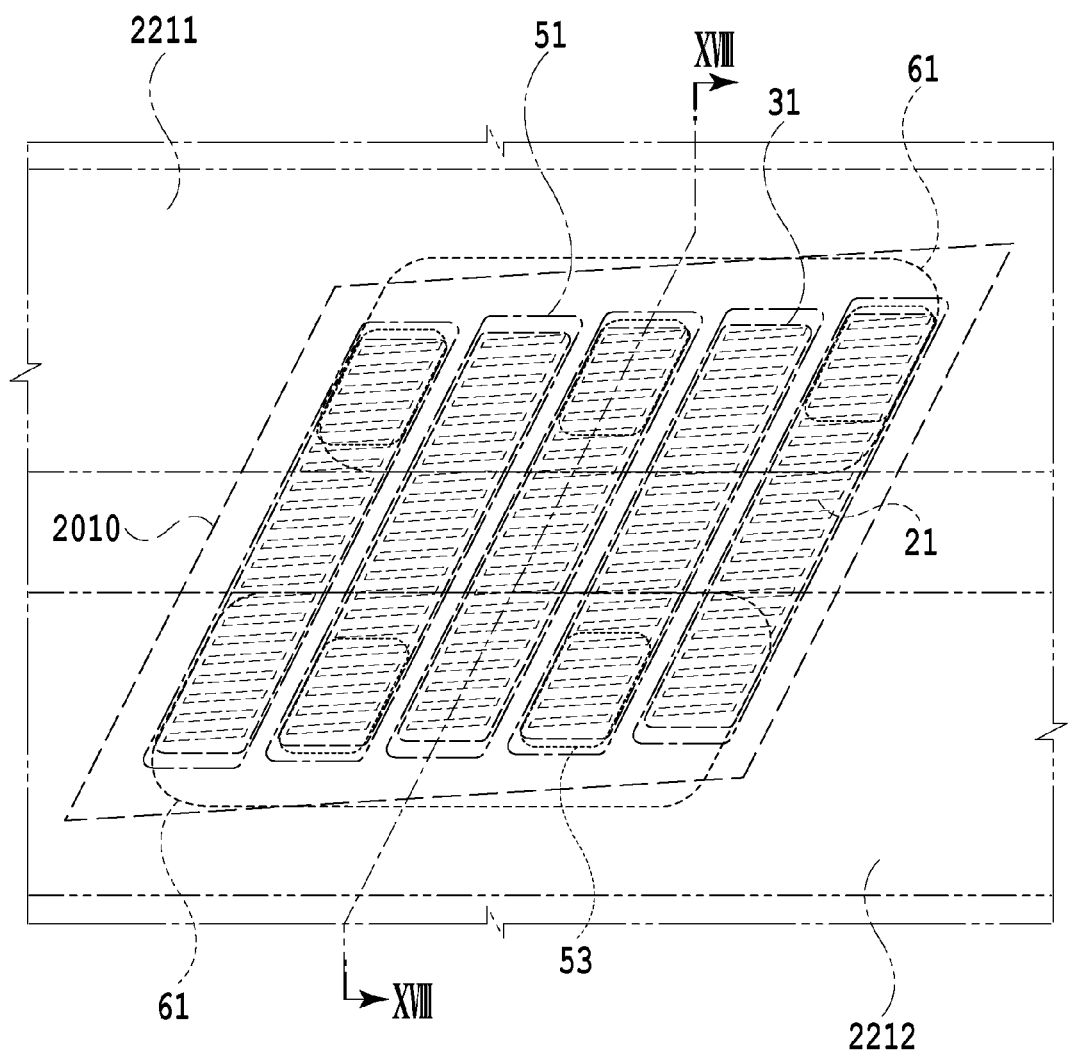
FIG. 17 is a perspective view illustrating a liquid connection relation between the print element board and the passage member.

FIG. 17 is a perspective view illustrating a liquid connection relation between the print element board 2010 and the passage member 2210. A pair of the common supply passage 2211 and the common collection passage 2212 extending in the longitudinal direction of the liquid ejection head 2003 is provided inside the passage member 2210. The communication opening 61 of the second passage member 2060 is connected to the individual communication opening 53 of the first passage member 2050 so that both positions match each other and the liquid supply passage communicating with the communication opening 51 of the first passage member 2050 through the communication opening from the common supply passage 2211 of the second passage member 2060 is formed. Similarly, the liquid the supply path communicating with the communication opening 51 of the first passage member 2050 through the common collection passage 2212 from the communication opening 72 of the second passage member 2060 is also formed.

Figure 18:
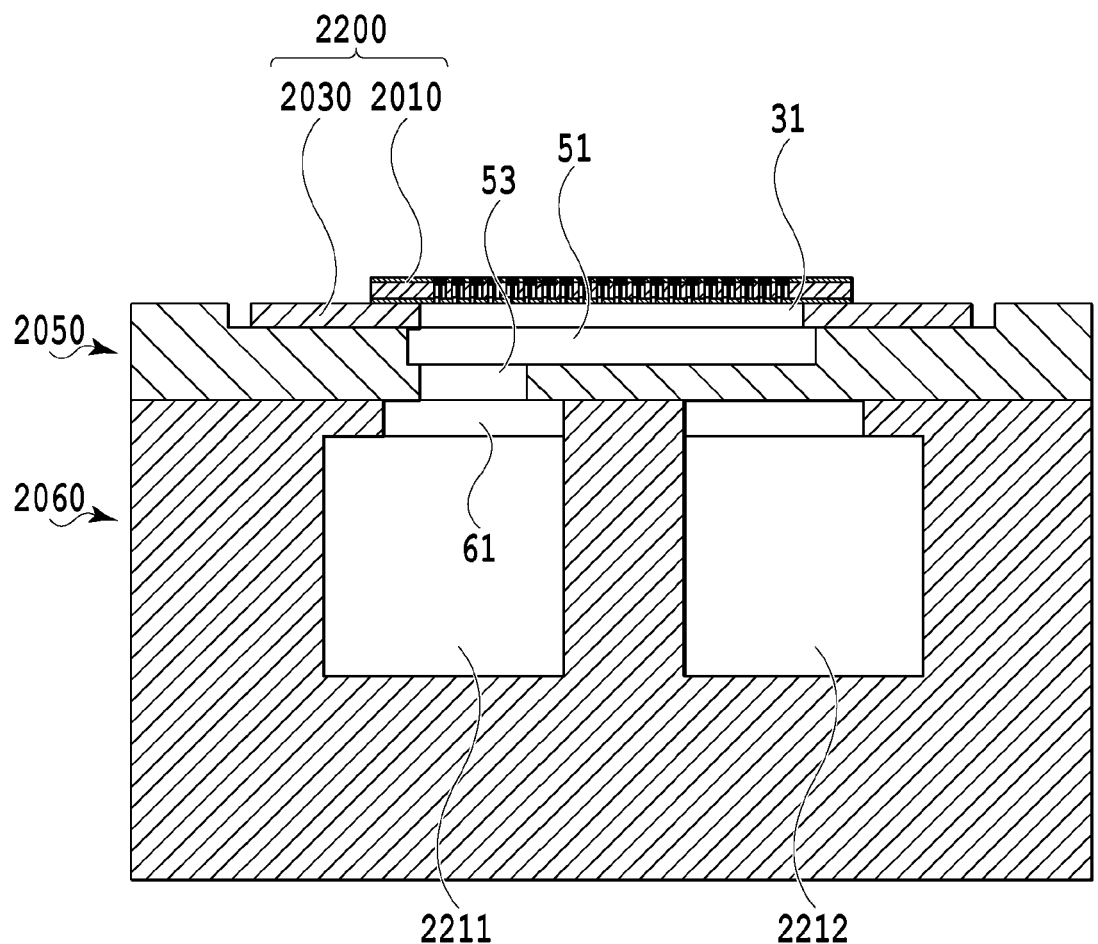
FIG. 18 is a cross-sectional view taken along a line XVIII-XVIII of FIG. 17.

FIG. 18 is a cross-sectional view taken along a line XVIII-XVIII of FIG. 17. The common supply passage 2211 is connected to the ejection module 2200 through the communication opening 61, the individual communication opening 53, and the communication opening 51. Although not illustrated in FIG. 18, it is obvious that the common collection passage 2212 is connected to the ejection module 2200 by the same path in a different cross-section in FIG. 17. Similarly to the first application example, each of the ejection module 2200 and the print element board 2010 is provided with a passage communicating with each ejection opening and thus a part or the entirety of the supplied liquid can be re-circulated while passing through the ejection opening that does not perform the ejection operation. Further, similarly to the first application example, the common supply passage 2211 is connected to the negative pressure control unit 2230 (the high pressure side) and the common collection passage 2212 is connected to the negative pressure control unit 2230 (the low pressure side) through the liquid supply unit 2220. Thus, a flow is formed so that the liquid flows from the common supply passage 2211 to the common collection passage 2212 through the pressure chamber of the print element board 2010 by the differential pressure.

(Description of Ejection Module)

Figure 19A:
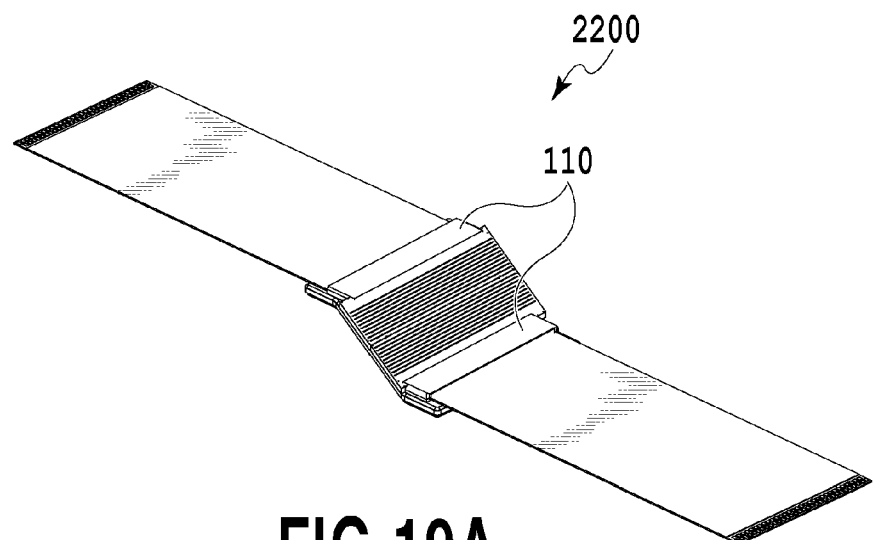
FIG. 19A is a perspective view illustrating one ejection module.
Figure 19B:
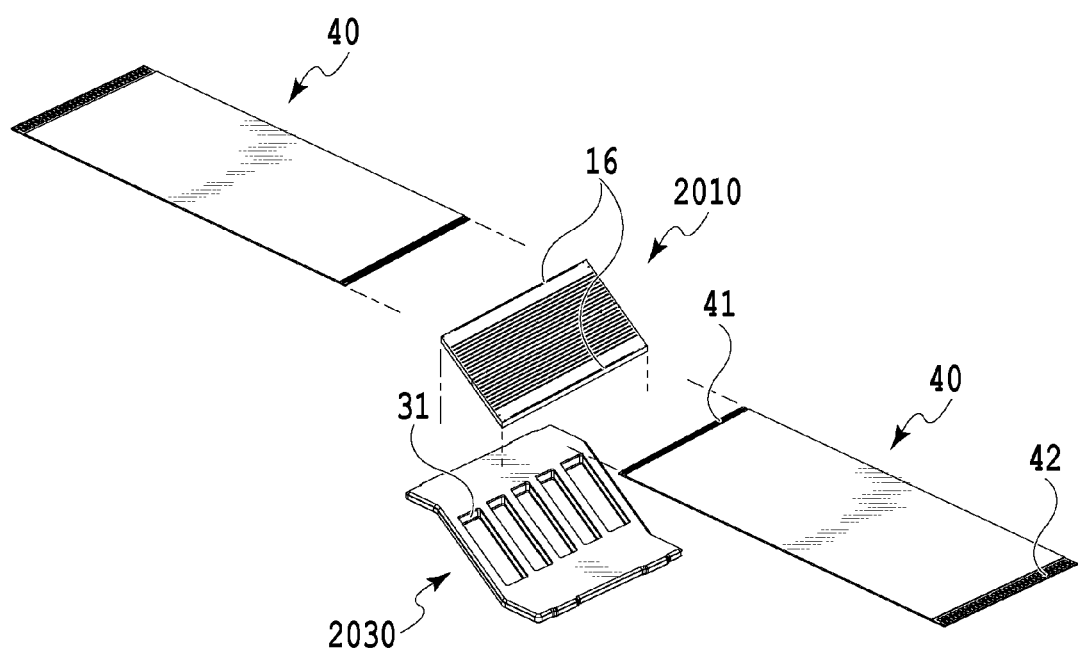
FIG. 19B is an exploded view illustrating one ejection module.

FIG. 19A is a perspective view illustrating one ejection module 2200 and FIG. 19B is an exploded view thereof. A difference from the first application example is that the terminals 16 are respectively disposed at both sides (the long side portions of the print element board 2010) in the ejection opening row directions of the print element board 2010. Accordingly, two flexible circuit boards 40 electrically connected to the print element board 2010 are disposed for each print element board 2010. Since the number of the ejection opening rows provided in the print element board 2010 is twenty, the ejection opening rows are more than eight ejection opening rows of the first application example. Here, since a maximal distance from the terminal 16 to the print element is shortened, a decrease in voltage or a delay of a signal generated in the wiring portion inside the print element board 2010 is reduced. Further, the liquid communication opening 31 of the support member 2030 is opened along the entire ejection opening row provided in the print element board 2010. The other configurations are similar to those of the first application example.

(Description of Structure of Print Element Board)

FIG. 20(a) is a schematic diagram illustrating a face on which the ejection opening 13 is disposed in the print element board 2010 and FIG. 20(c) is a schematic diagram illustrating a rear face of the face of FIG. 20(a). FIG. 20(b) is a schematic diagram illustrating a face of the print element board 2010 when a lid member 2020 provided in the rear face of the print element board 2010 in FIG. 20(c) is removed. As illustrated in FIG. 20(b), the liquid supply path 18 and the liquid collection path 19 are alternately provided along the ejection opening row direction at the rear face of the print element board 2010.

The number of the ejection opening rows is larger than that of the first application example. However, a basic difference from the first application example is that the terminal 16 is disposed at both sides of the print element board in the ejection opening row direction as described above. A basic configuration is similar to the first application example in that a pair of the liquid supply path 18 and the liquid collection path 19 is provided in each ejection opening row and the lid member 2020 is provided with the opening 21 communicating with the liquid communication opening 31 of the support member 2030.

(Third Application Example)

Configurations of the inkjet printing apparatus 1000 and the liquid ejection head 3 according to a third application example of the invention will be described. The liquid ejection head of the third application example is of a page wide type in which an image is printed on a print medium of a B2 size through one scan. Since the third application example is similar to the second application example in many respects, only difference from the second application example will be mainly described in the description below and a description of the same configuration as that of the second application example will be omitted.

(Description of Inkjet Printing Apparatus)

Figure 45:
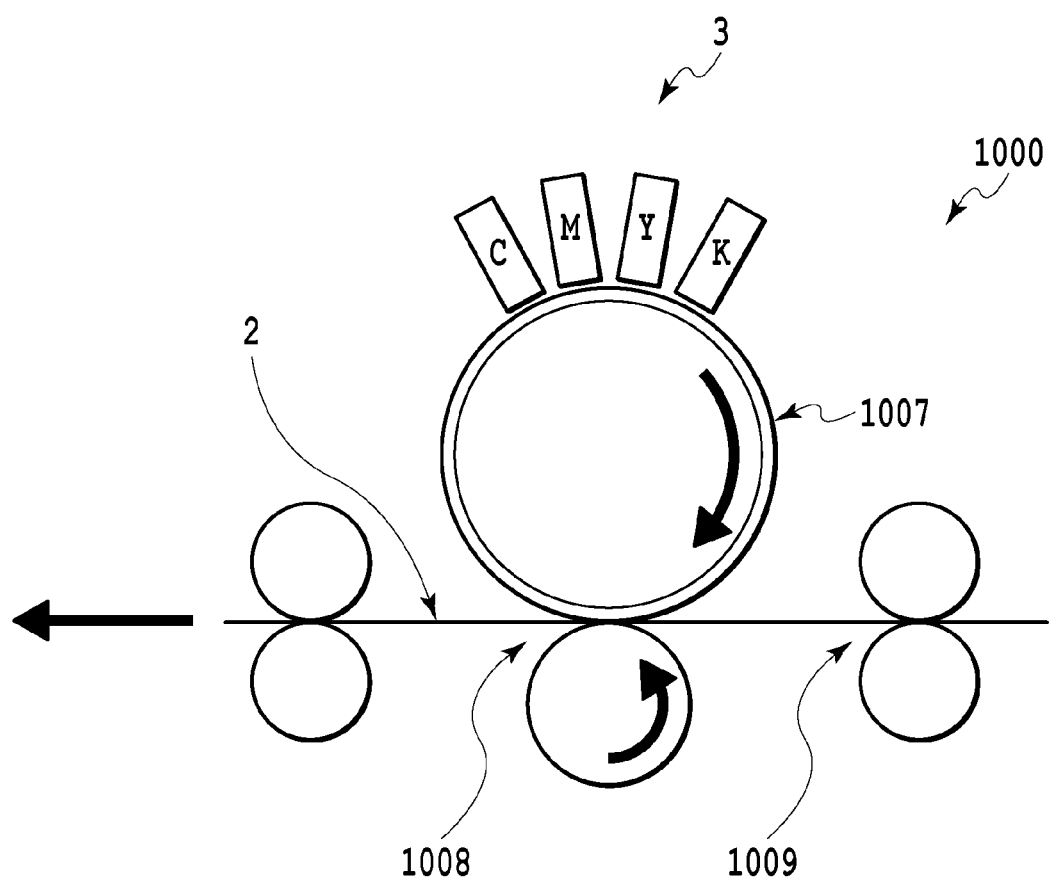
FIG. 45 is an explanatory schematic diagram illustrating a liquid ejection apparatus according to a third application example.

FIG. 45 is a schematic diagram illustrating an inkjet printing apparatus according to the application example. The printing apparatus 1000 has a configuration in which an image is not directly printed on a print medium by the liquid ejected from the liquid ejection head 3. That is, the liquid is first ejected to an intermediate transfer member (an intermediate transfer drum 1007) to form an image thereon and the image is transferred to the print medium 2. In the printing apparatus 1000, the liquid ejection heads 3 respectively corresponding to four colors (CMYK) of inks are disposed along the intermediate transfer drum 1007 in a circular-arc shape. Accordingly, a full-color printing process is performed on the intermediate transfer member, the printed image is appropriately dried on the intermediate transfer member, and the image is transferred to the print medium 2 conveyed by a sheet conveying roller 1009 in terms of a transfer portion 1008. The sheet conveying system of the second application example is mainly used to convey a cut sheet in the horizontal direction. However, the sheet conveying system of the application example can be also applied to a continuous sheet supplied from a main roll (not illustrated). In such a drum conveying system, since the sheet is conveyed while a predetermined tension is applied thereto, a conveying jam hardly occurs even at a high-speed printing operation. For this reason, the reliability of the apparatus is improved and thus the apparatus is suitable for a commercial printing purpose. Similarly to the first and second application examples, the supply system of the printing apparatus 1000, the buffer tank 1003, and the main tank 1006 are fluid-connected to each liquid ejection head 3. Further, an electrical control unit which transmits an ejection control signal and power to the liquid ejection head 3 is electrically connected to each liquid ejection head 3.

(Description of Fourth Circulation Mode)

Figure 46:
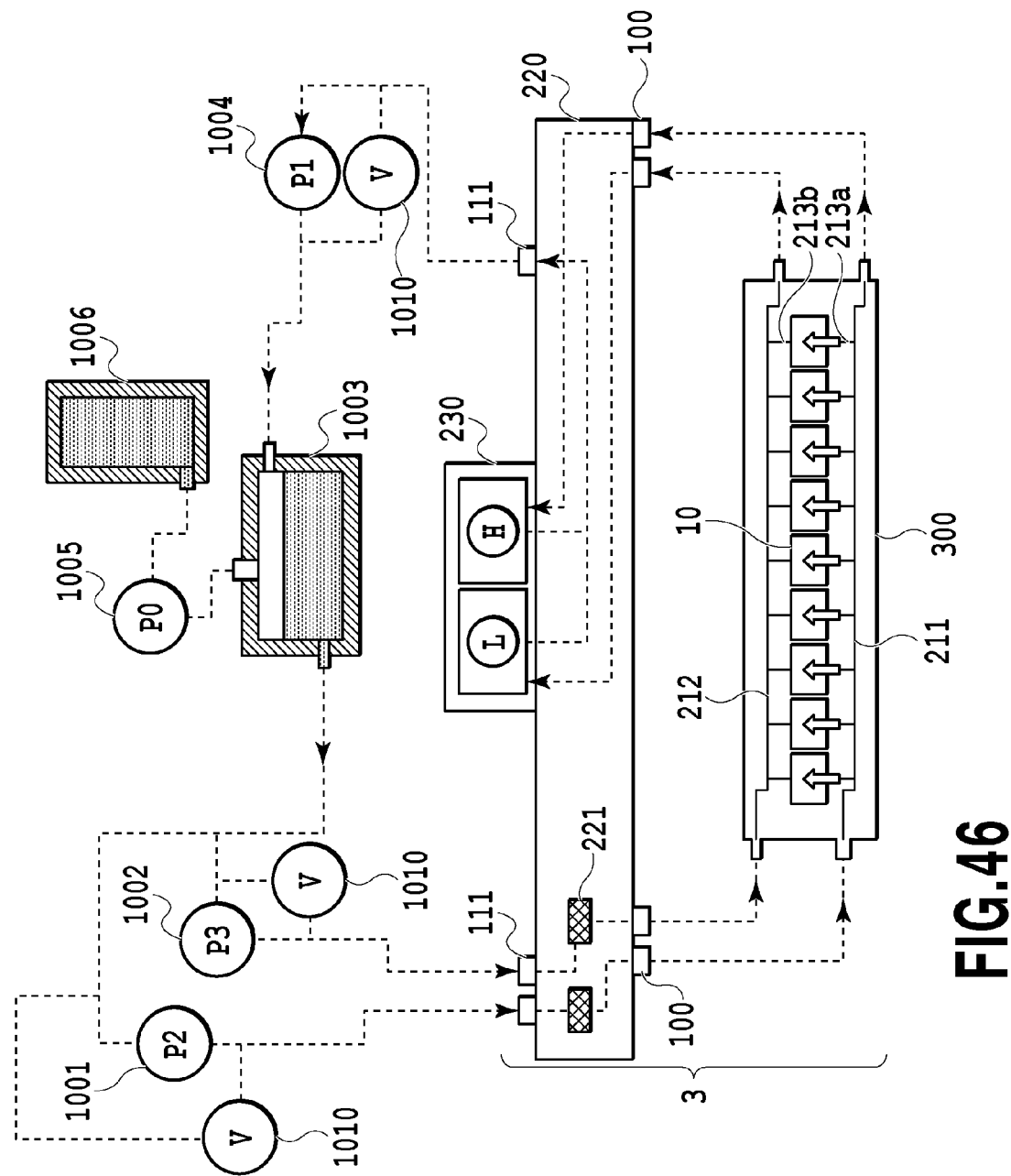
FIG. 46 is an explanatory diagram illustrating a fourth circulation mode.

Similarly to the second application example, the first and second circulation paths illustrated in FIG. 2 or can be also applied as the liquid circulation path between the liquid ejection head 3 and the tank of the printing apparatus 1000, but the circulation path illustrated in FIG. 46 is desirable. A main difference from the second circulation path of FIG. 3 is that a bypass valve 1010 is additionally provided to communicate with each of the passages of the first circulation pumps 1001 and 1002 and the second circulation pump 1004. The bypass valve 1010 has a function (a first function) of decreasing the upstream pressure of the bypass valve 1010 by opening the valve when a pressure exceeds a predetermined pressure. Further, the bypass valve has a function (a second function) of opening and closing the valve at an arbitrary timing by a signal from a control substrate of the printing apparatus body.

By the first function, it is possible to suppress a large or small pressure from being applied to the downstream side of the first circulation pumps 1001 and 1002 or the upstream side of the second circulation pump 1004. For example, when the functions of the first circulation pumps 1001 and 1002 are not operated properly, there is a case in which a large flow rate or pressure may be applied to the liquid ejection head 3. Accordingly, there is concern that the liquid may leak from the ejection opening of the liquid ejection head 3 or each bonding portion inside the liquid ejection head 3 may be broken. However, when the bypass valves are added to the first circulation pumps 1001 and 1002 as in the application example, the bypass valve 1010 is opened in the event of a large pressure. Accordingly, since the liquid path is opened to the upstream side of each circulation pump, the above-described trouble can be suppressed.

Further, when the circulation driving operation is stopped, all bypass valves 1010 are promptly opened on the basis of the control signal of the printing apparatus body after the operation of the first circulation pumps 1001 and 1002 and the second circulation pump 1004 are stopped by the second function. Accordingly, a high negative pressure (for example, several to several tens of kPa) at the downstream portion (between the negative pressure control unit 230 and the second circulation pump 1004) of the liquid ejection head 3 can be released within a short time. When a displacement pump such as a diaphragm pump is used as the circulation pump, a check valve is normally built inside the pump. However, when the bypass valve is opened, the pressure at the downstream portion of the liquid ejection head 3 can be also released from the downstream buffer tank 1003. Although the pressure at the downstream portion of the liquid ejection head 3 can be released only from the upstream side, pressure loss exists in the upstream passage of the liquid ejection head and the passage inside the liquid ejection head. For that reason, since some time is taken when the pressure is released, the pressure inside the common passage inside the liquid ejection head 3 transiently decreases too much. Accordingly, there is concern that the meniscus of the ejection opening may be broken. However, since the downstream pressure of the liquid ejection head is further released when the bypass valve 1010 at the downstream side of the liquid ejection head 3 is opened, the risk of the breakage of the meniscus of the ejection opening is reduced.

(Description of Structure of Liquid Ejection Head)

Figure 47A:
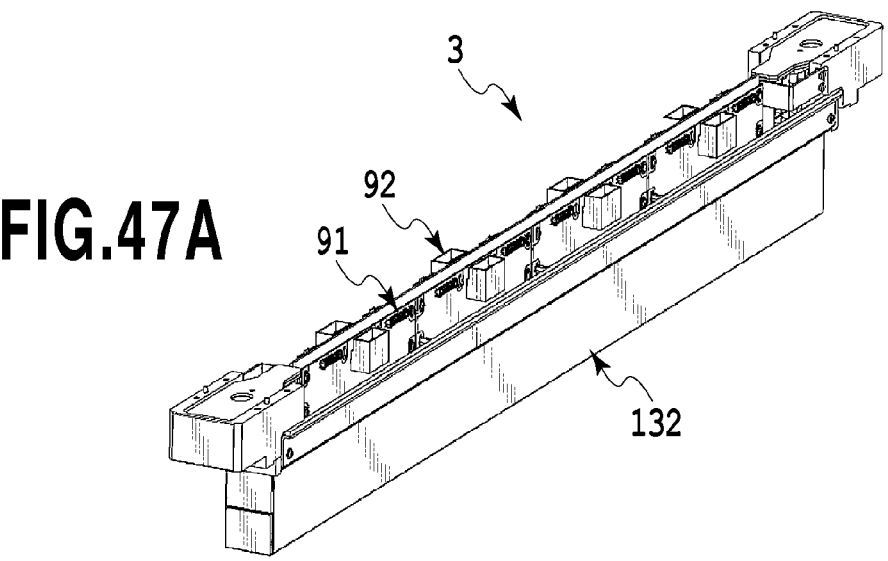
FIGS. 47A and 47B are explanatory diagrams respectively illustrating a liquid ejection head according to a third application example.
Figure 47B:
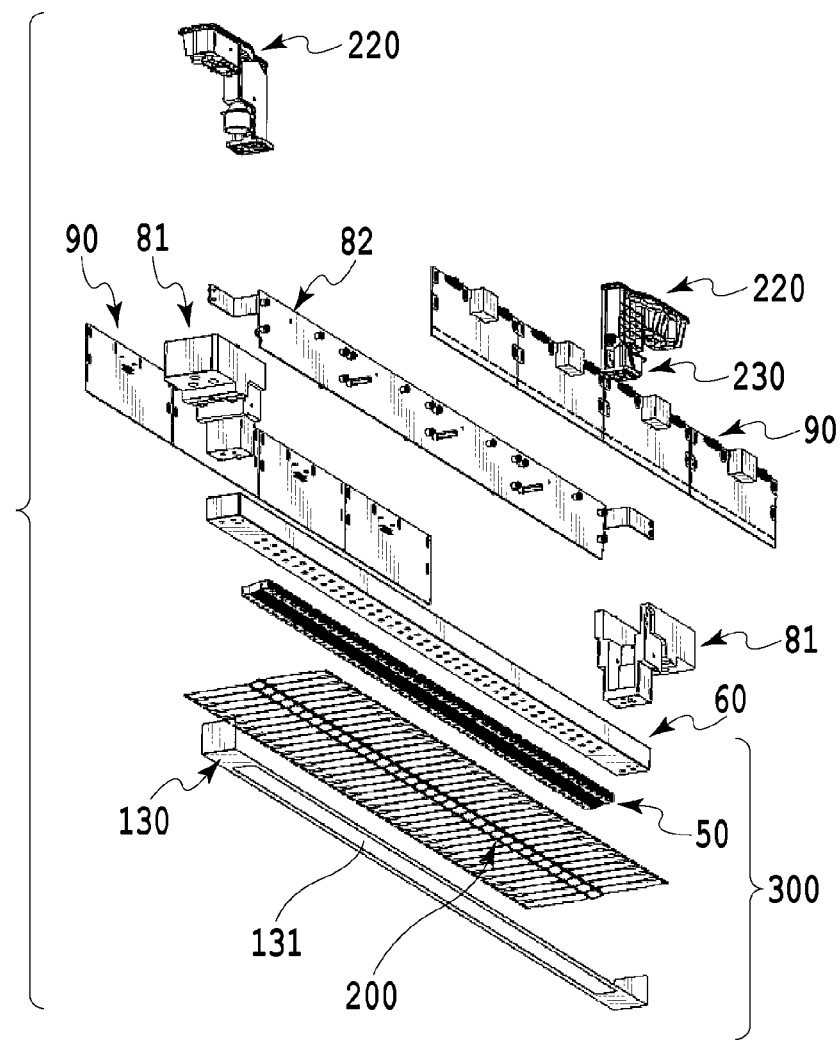

A structure of the liquid ejection head 3 according to the third application example of the invention will be described. FIG. 47A is a perspective view illustrating the liquid ejection head 3 according to the application example and FIG. 47B is an exploded perspective view thereof. The liquid ejection head 3 is an inkjet page wide type printing head which includes thirty six print element boards 10 arranged in a line shape (an in-line shape) in the longitudinal direction of the liquid ejection head 3 and prints an image by one color. Similarly to the second application example, the liquid ejection head 3 includes a shield plate 132 which protects a rectangular side face of the head in addition to the signal input terminal 91 and the power supply terminal 92.

FIG. 47B is an exploded perspective view illustrating the liquid ejection head 3 and components or units constituting the liquid ejection head 3 according to the functions thereof (where the shield plate 132 is not illustrated). The functions of the units and the members or the liquid circulation sequence inside the liquid ejection head 3 are similar to those of the second application example. A main difference from the second application example is that the divided electric wiring boards 90 and the negative pressure control unit 230 are disposed at different positions and the first passage member has a different shape. As in the application example, for example, in the case of the liquid ejection head 3 having a length corresponding to the print medium of a B2 size, the power consumed by the liquid ejection head 3 is large and thus eight electric wiring boards 90 are provided. Four electric wiring boards 90 are attached to each of both side faces of the elongated electric wiring board support portion 82 attached to the liquid ejection unit support portion 81.

Figure 48A:
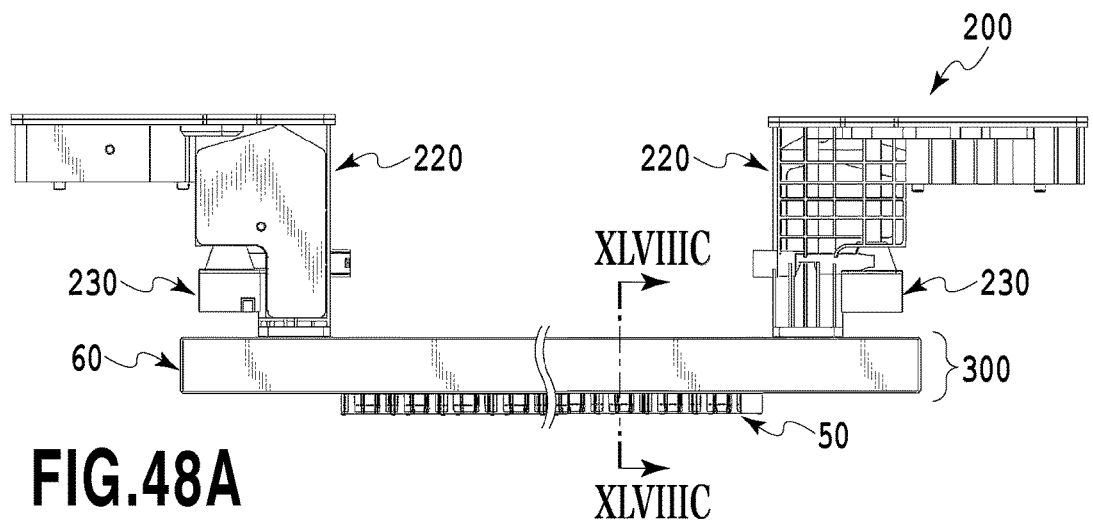
FIGS. 48A, 48B, and 48C are explanatory diagrams respectively illustrating the liquid ejection head according to the third application example.
Figure 48B:
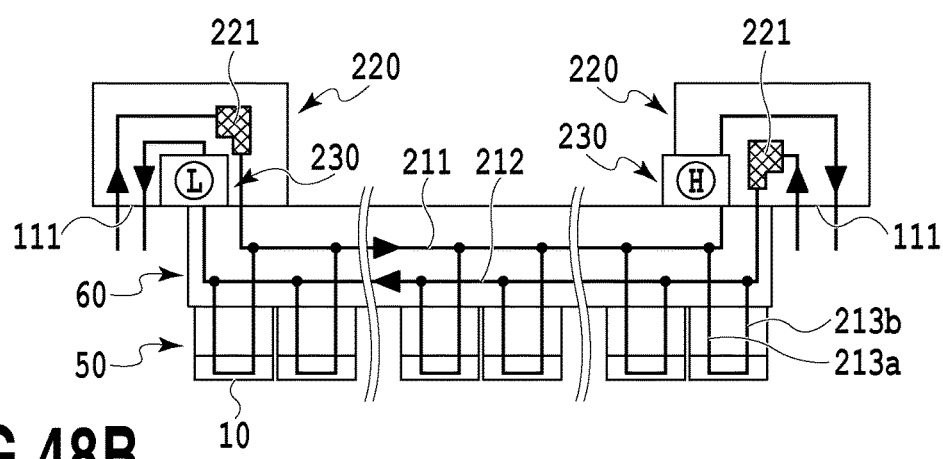
Figure 48C:
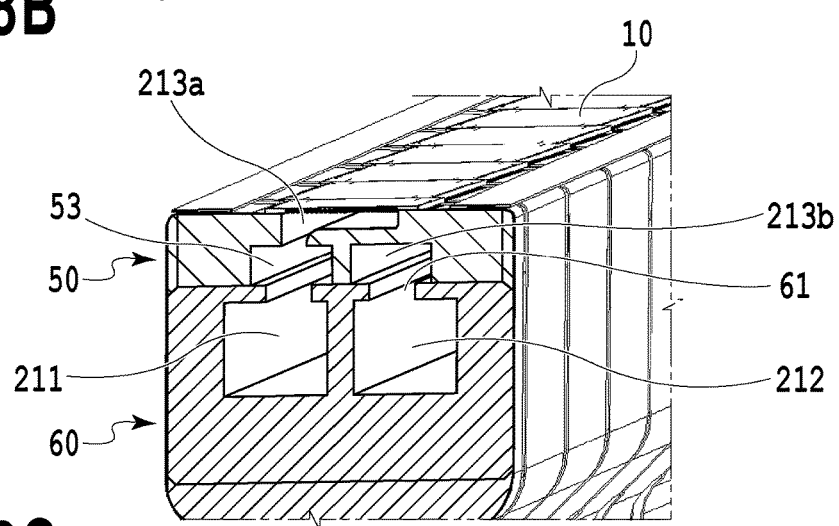

FIG. 48A is a side view illustrating the liquid ejection head 3 including the liquid ejection unit 300, the liquid supply unit 220, and the negative pressure control unit 230, FIG. 48B is a schematic diagram illustrating a flow of the liquid, and FIG. 48C is a perspective view illustrating a cross-section taken along a line XLVIIIC-XLVIIIC of FIG. 48A. In order to easily understand the drawings, a part of the configuration is simplified.

The liquid connection portion 111 and the filter 221 are provided inside the liquid supply unit 220 and the negative pressure control unit 230 is integrally formed at the lower side of the liquid supply unit 220. Accordingly, a distance between the negative pressure control unit 230 and the print element board 10 in the height direction becomes short compared with the second application example. With this configuration, the number of the passage connection portions inside the liquid supply unit 220 decreases. As a result, there is an advantage that the reliability of preventing the leakage of the printing liquid is improved and the number of components or steps decreases.

Further, since a water head difference between the negative pressure control unit 230 and the ejection opening forming face decreases relatively, this configuration can be suitably applied to the printing apparatus in which the inclination angle of the liquid ejection head 3 illustrated in 45 is different for each of the liquid ejection heads. Since the water head difference can be decreased, a difference in negative pressure applied to the ejection openings of the print element boards can be reduced even when the liquid ejection heads 3 having different inclination angles are used. Further, since a distance from the negative pressure control unit 230 to the print element board 10 decreases, a flow resistance therebetween decreases. Accordingly, a difference in pressure loss caused by a change in flow rate of the liquid decreases and thus the negative pressure can be more desirably controlled.

FIG. 48B is a schematic diagram illustrating a flow of the printing liquid inside the liquid ejection head 3. Although the circulation path is not similar to the circulation path illustrated in FIG. 46 in terms of the circuit thereof, FIG. 48B illustrates a flow of the liquid in the components of the actual liquid ejection head 3. A pair of the common supply passage 211 and the common collection passage 212 extending in the longitudinal direction of the liquid ejection head 3 is provided inside the elongated second passage member 60. The common supply passage 211 and the common collection passage 212 are formed so that the liquid flow therein in the opposite directions and the filter 221 is provided at the upstream side of each passage so as to trap foreign materials intruding from the connection portion 111 or the like. In this way, since the liquid flows through the common supply passage 211 and the common collection passage 212 in the opposite directions, a temperature gradient inside the liquid ejection head 3 in the longitudinal direction can be desirably reduced. In order to simplify the description of FIG. 46, the flows in the common supply passage 211 and the common collection passage 212 are indicated by the same direction.

The negative pressure control unit 230 is connected to the downstream side of each of the common supply passage 211 and the common collection passage 212. Further, a branch portion is provided in the course of the common supply passage 211 to be connected to the individual supply passages 213a and a branch portion is provided in the course of the common collection passage 212 to be connected to the individual collection passages 213b. The individual supply passage 213a and the individual collection passage 213b are formed inside the first passage members 50 and each individual supply passage communicates with the opening 21 (see FIG. 11C) of the lid member 20 provided at the rear face of the print element board 10.

The negative pressure control units 230 indicated by "H" and "L" of FIG. 48B are units at the high pressure side (H) and the low pressure side (L). The negative pressure control units 230 are back pressure type pressure adjustment mechanisms which control the upstream pressures of the negative pressure control units 230 to a high negative pressure (H) and a low negative pressure (L). The common supply passage 211 is connected to the negative pressure control unit 230 (the high pressure side) and the common collection passage 212 is connected to the negative pressure control unit 230 (the low pressure side) so that a differential pressure is generated between the common supply passage 211 and the common collection passage 212. By the differential pressure, the liquid flows from the common supply passage 211 to the common collection passage 212 while sequentially passing through the individual supply passage 213a, the ejection opening 11 (the pressure chamber 23) in the print element board 10, and the individual collection passage 213b.

FIG. 48C is a perspective view illustrating a cross-section taken along a line XLVIIIC-XLVIIIC of FIG. 48A. In the application example, each ejection module 200 includes the first passage member 50, the print element board 10, and the flexible circuit board 40. In the embodiment, the support member 2030 (FIG. 18) described in the second application example does not exist and the print element board 10 including the lid member 20 is directly bonded to the first passage member 50. The liquid is supplied from the communication opening 61 formed at the upper face of the common supply passage 211 provided at the second passage member to the individual supply passage 213a through the individual communication opening 53 formed at the lower face of the first passage member 50. Subsequently, the liquid passes through the pressure chamber 23 and passes through the individual collection passage 213b, the individual communication opening 53, and the communication opening 61 to be collected in the common collection passage 212.

Here, differently from the second application example illustrated in FIG. 15, the individual communication opening 53 formed at the lower face of the first passage member 50 (the face near the second passage member 60) is sufficiently large with respect to the communication opening 61 formed at the upper face of the second passage member 60. With this configuration, the first passage member and the second passage member reliably fluid-communicate with each other even when a positional deviation occurs when the ejection module 200 is mounted onto the second passage member 60. As a result, the yield in the head manufacturing process is improved and thus a decrease in cost can be realized.

In addition, the description of the above-described application example does not limit the scope of the invention. As an example, in the application example, a thermal type has been described in which bubbles are generated by a heating element to eject the liquid. However, the invention can be also applied to the liquid ejection head which employs a piezo type and the other various liquid ejection types.

In the application example, the inkjet printing apparatus (the printing apparatus) has been described in which the liquid such as ink is circulated between the tank and the liquid ejection head, but the other application examples may be also used. In the other application examples, for example, a configuration may be employed in which the ink is not circulated and two tanks are provided at the upstream side and the downstream side of the liquid ejection head so that the ink flows from one tank to the other tank. In this way, the ink inside the pressure chamber may flow.

In the application example, an example of using a so-called line type head having a length corresponding to the width of the print medium has been described, but the invention can be also applied to a so-called serial type liquid ejection head which prints an image on the print medium while scanning the print medium. As the serial type liquid ejection head, for example, the liquid ejection head may be equipped with a print element board ejecting black ink and a print element board ejecting color ink, but the invention is not limited thereto. That is, a liquid ejection head which is shorter than the width of the print medium and includes a plurality of print element boards disposed so that the ejection openings overlap each other in the ejection opening row direction may be provided and the print medium may be scanned by the liquid ejection head.

Embodiments of the present invention will hereinafter be described.

(First Embodiment)

Referring to FIGS. 22A to 28C, a liquid ejection head according to a first embodiment of the invention will be described. Further, a liquid supply path of the above-described application example corresponds to a first common supply passage of the embodiment. Similarly, a liquid collection path corresponds to a first common collection passage, a first communication opening corresponds to an opening, a common supply path corresponds to a third common supply passage, and a common collection path corresponds to a third common collection passage.

Figure 23A:
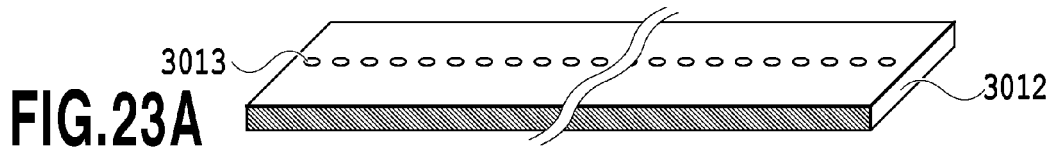
FIGS. 23A to 23G are exploded views illustrating a part of the liquid ejection head according to the first embodiment.
Figure 23B:
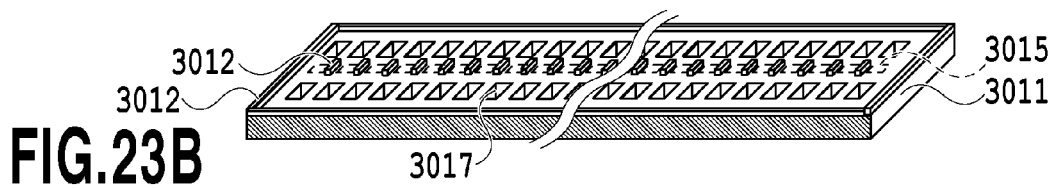
Figure 23C:
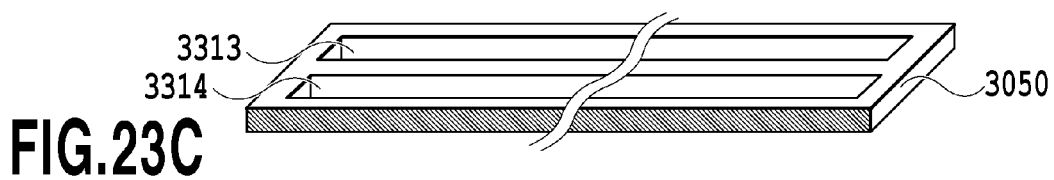
Figure 23D:
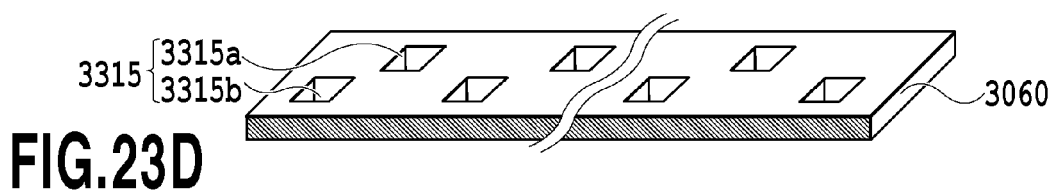
Figure 23E:
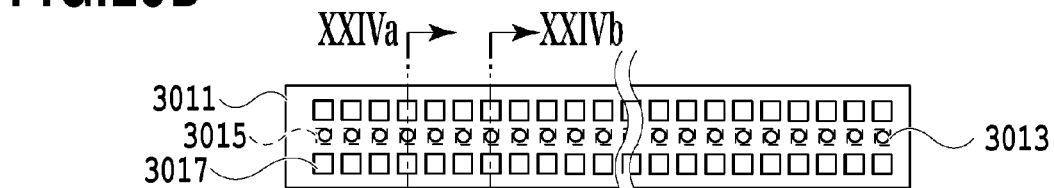
Figure 23F:
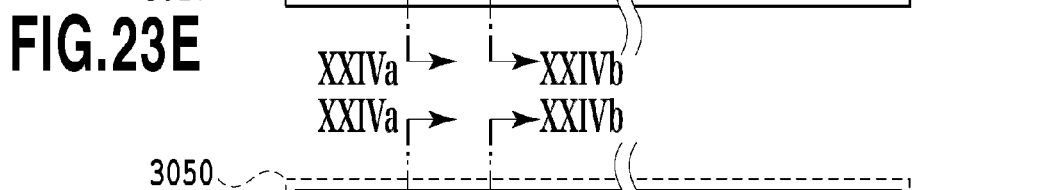
Figure 23G:
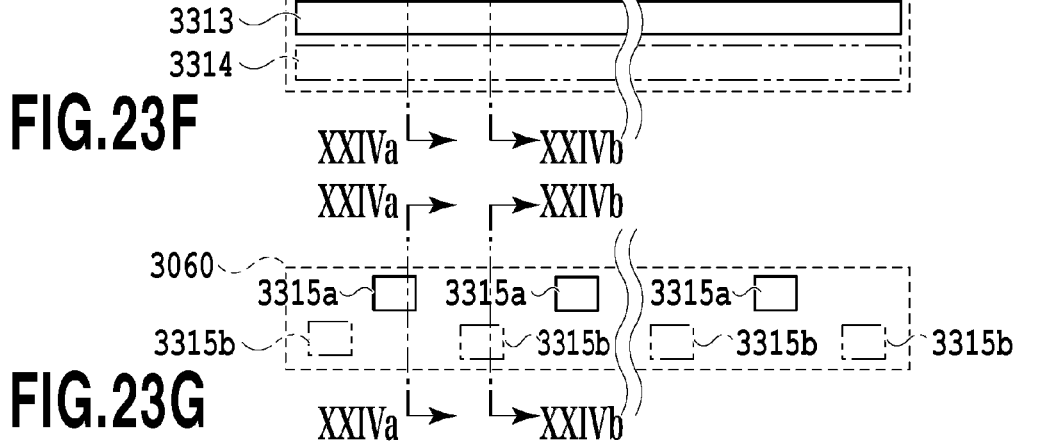
Figure 24A:
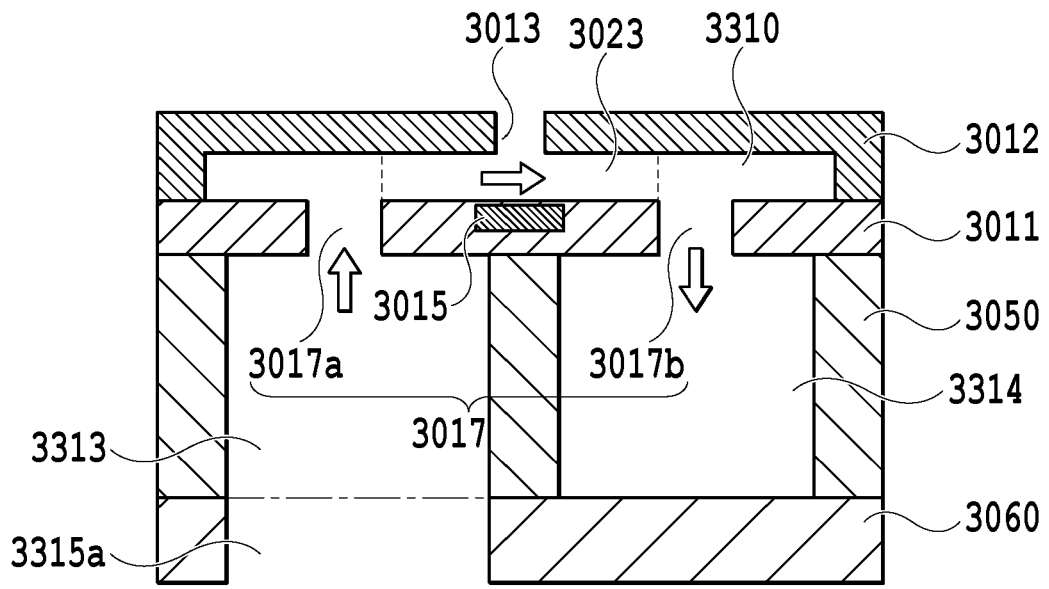
FIGS. 24A and 24B are cross-sectional views illustrating a part of the liquid ejection head according to the first embodiment.
Figure 24B:
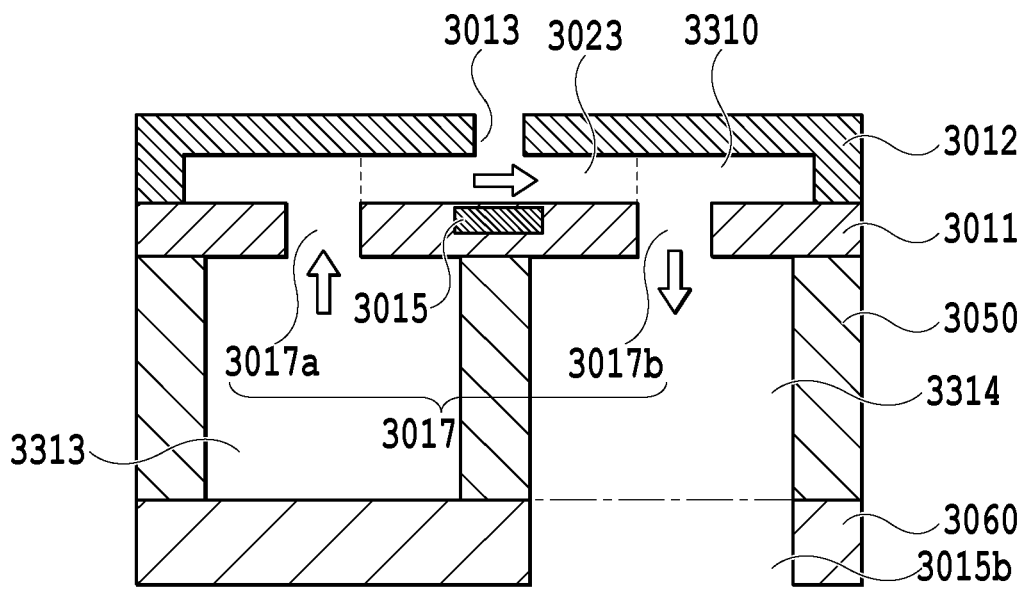
Figure 25:
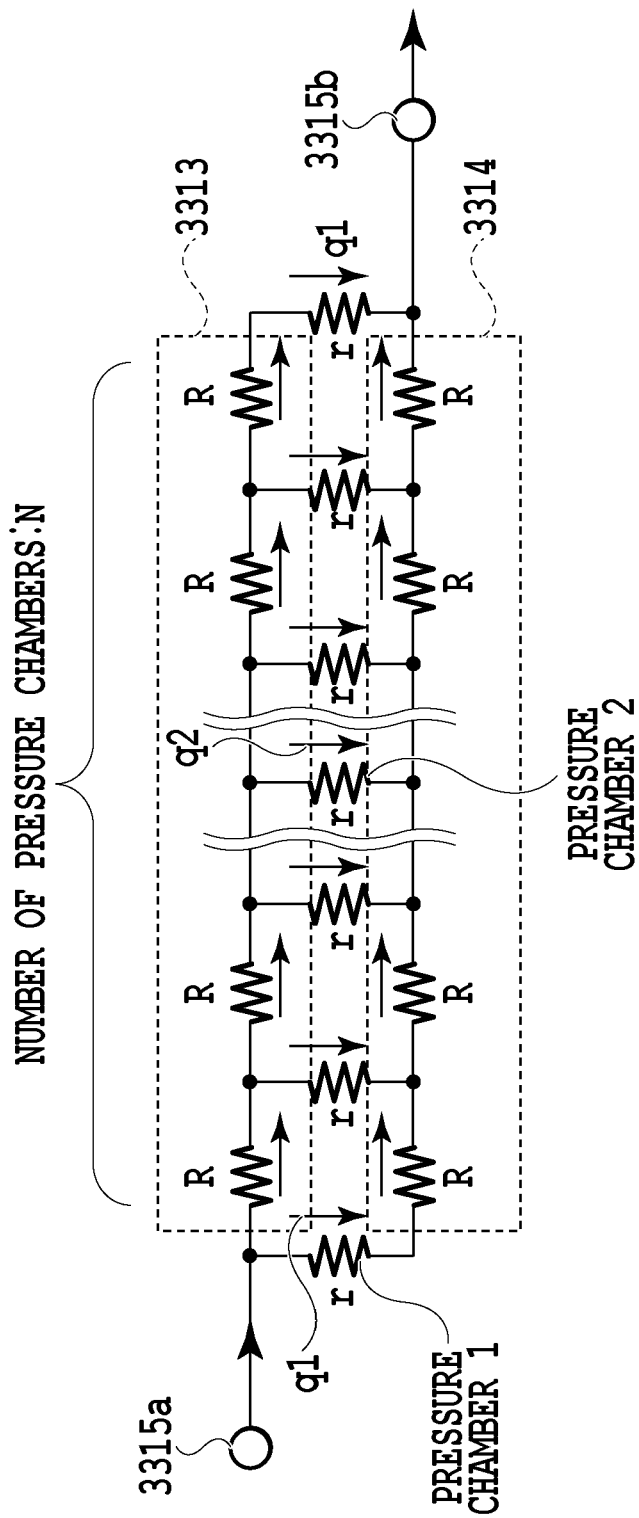
FIG. 25 is an equivalent circuit diagram illustrating a part of the liquid ejection head according to the first embodiment.
Figure 27:
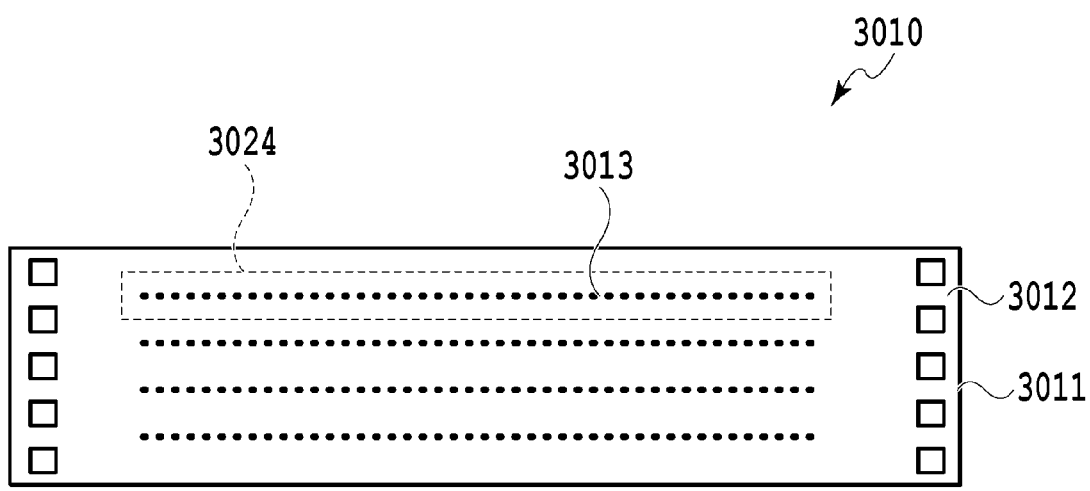
FIG. 27 is a top view illustrating a print element board according to the first embodiment.
Figure 28A:
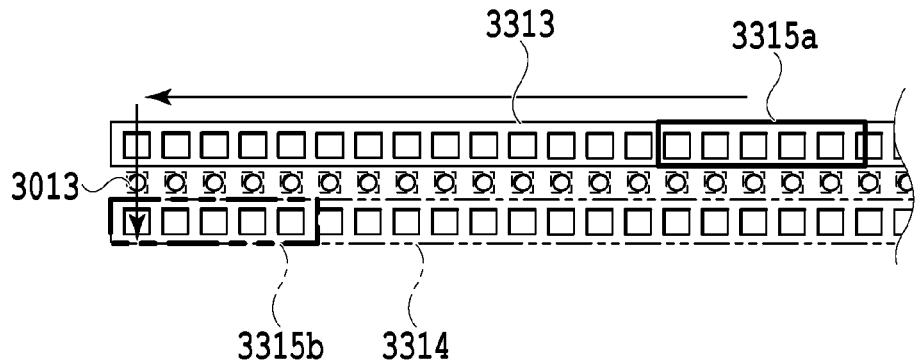
FIGS. 28A to 28C are top perspective views illustrating a part of the liquid ejection head according to the first embodiment.
Figure 28B:
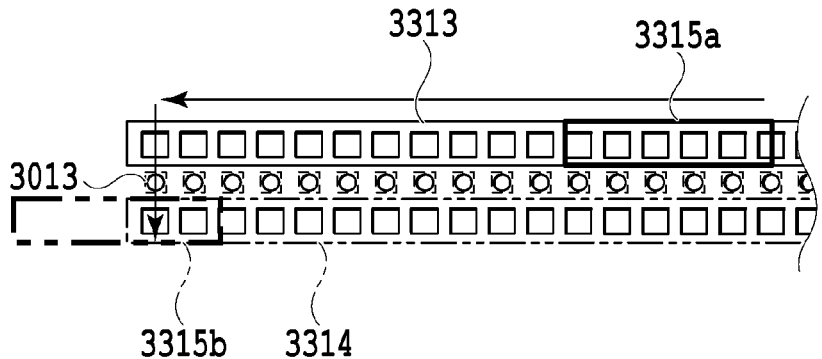
Figure 28C:
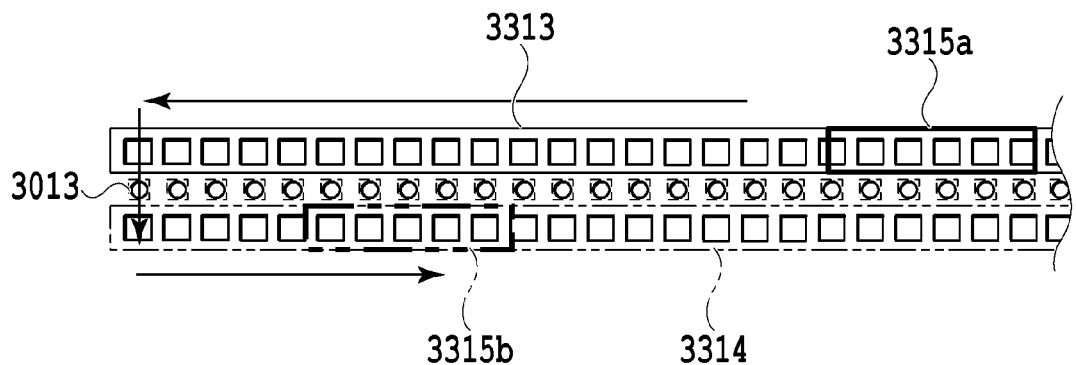

FIGS. 22A to 22M are exploded views illustrating a liquid ejection head according to the embodiment of the invention. FIGS. 22A to 22G are exploded perspective view illustrating components. FIGS. 22H to 22M are exploded top views corresponding to FIGS. 22B to 22G illustrating components. FIGS. 23A to 23G are schematic diagrams illustrating a structure of one ejection opening row 3024 among a plurality of the ejection opening rows 3024 illustrated in FIG. 22A. FIGS. 23A to 23D are perspective views respectively corresponding to FIGS. 22A to 22D. FIGS. 23E to 23G are top views respectively corresponding to FIGS. 22H to 22J. Further, FIG. 24A is a cross-sectional view taken along a line XXIVa-XXIVa of FIGS. 23E to 23G. FIG. 24B is a cross-sectional view taken along a line XXIVb-XXIVb. FIG. 25 is an equivalent circuit diagram illustrating a part of the liquid ejection head of the embodiment. FIGS. 26A and 26B are equivalent circuit diagrams illustrating a part of the liquid ejection head of the embodiment and a pressure distribution inside a passage. FIG. 27 is a top view illustrating a shape of a print element board of the embodiment. FIGS. 28A to 28C are schematic perspective views illustrating an end of the ejection opening row.

As illustrated in FIGS. 22A to 24B, the liquid ejection head of the embodiment has a six-lamination passage structure including an ejection opening forming member 3012, a first passage layer 3011, a second passage layer 3050, a third passage layer 3060, a fourth passage layer 3070, a fifth passage layer 3080, and a sixth passage layer 3090.

The ejection opening forming member 3012 is provided with a plurality of ejection opening rows 3024 each having a plurality of ejection openings 3013 arranged in a row. The first passage layer 3011 has a configuration in which a print element 3015 generating energy used to eject a liquid is provided at a position corresponding to the ejection opening 3013. The ejection opening forming member 3012 and the first passage layer 3011 are laminated so that a space forming a pressure chamber 3023 and a passage 3310 (FIGS. 24A and 24B) is formed therebetween. The liquid ejection head is able to eject a liquid such as ink inside the pressure chamber 3023 (the passage 3310) from the ejection opening 3013 by energy generated by the print element 3015. A pressure in the passage 3310 and the pressure chamber 3023 in a static state is kept at a negative pressure so that a meniscus of the liquid (the ink) in the ejection opening 3013 protrudes inward. When such a change in pressures is generated in the pressure chamber, ejection characteristics such as a liquid ejection speed or a volume of an ejected liquid droplet are influenced.

As illustrated in FIGS. 22A to 22C and FIGS. 22H to 22I, in the embodiment, the plurality of ejection opening rows 3024 are densely arranged into 600 dpi. A first common supply passage 3313 and a first common collection passage 3314 are formed along a principal face of the second passage layer 3050. The third passage layer 3060 is provided with a first communication opening 3315a (a supply side communication opening) and a first communication opening 3315b (a collection side communication opening). The first passage layer 3011 is provided with a print element row having the print elements 3015 arranged therein and a through-hole row having through-holes 3017 arranged therein to supply and collect the liquid. As illustrated in FIGS. 24A and 24B, the through-holes 3017 include a supply opening 3017a and a collection opening 3017b. A plurality of the supply openings 3017a extend in a direction (a second direction) intersecting a face provided with the print element 3015 to form a supply passage and are arranged in an arrangement direction (a first direction) of the print element 3015 serving as a row direction of the ejection opening row to form a supply opening row. Similarly, a plurality of the collection openings 3017b extend in a direction (the second direction) intersecting the face provided with the print element 3015 to form a collection passage and are arranged in the arrangement direction (the first direction) of the print element 3015 serving as the row direction of the ejection opening row to form a collection opening row.

As illustrated in FIGS. 24A and 24B, the first common supply passage 3313 communicates with the passage 3310 and the pressure chamber 3023 through the supply opening 3017a. Similarly, the first common collection passage 3314 communicates with the passage 3310 and the pressure chamber 3023 through the collection opening 3017b. Further, the first common supply passage 3313 receives the liquid from the first communication opening 3315a (the supply side communication opening) formed in the third passage layer 3060. Similarly, the first common collection passage 3314 communicates with the first communication opening 3315b (the collection side communication opening) formed in the third passage layer 3060. As illustrated in FIGS. 22D and 22J, a plurality of the first communication openings 3315a are arranged in a direction intersecting the row direction of the ejection opening row to form a first communication opening row. A plurality of the first communication openings 3315b are also arranged in the same direction to form a first communication opening row.

As illustrated in FIGS. 22E to 22G and FIGS. 22K to 22M, the fourth passage layer 3070 is provided with a second common supply passage 3331 and a second common collection passage 3332. The fifth passage layer 3080 is provided with a second communication opening 3333a (a supply side communication opening) and a second communication opening 3333b (a collection side communication opening). The sixth passage layer 3090 is provided with a third common supply passage 3335 and a third common collection passage 3336.

The first common supply passage 3313 of the second passage layer 3050 communicates with the plurality of supply openings 3017a at one face side and communicates with the first communication opening 3315a at the other face side. Similarly, the first common collection passage 3314 of the second passage layer 3050 communicates with the plurality of collection openings 3017b at one face side and communicates with the first communication opening 3315b at the other face side. Further, the second common supply passage 3331 of the fourth passage layer 3070 communicates with the first communication opening 3315a at one face side and communicates with the plurality of second communication openings 3333a at the other face side. Similarly, the second common collection passage 3332 of the fourth passage layer 3070 communicates with the first communication opening 3315b at one face side and communicates with the second communication opening 3333b at the other face side. Here, at least one of the first communication opening 3315a and the first communication opening 3315b is provided at a plurality of positions. Further, the third common supply passage 3335 of the sixth passage layer 3090 communicates with the plurality of second communication openings 3333a. Similarly, the third common collection passage 3336 of the sixth passage layer 3090 communicates with the plurality of second communication openings 3333b.

The plurality of first communication openings 3315a (the first supply side communication openings) are arranged in a direction (a third direction) intersecting the row direction (the first direction) of the ejection opening row to form a first supply side communication opening row. The plurality of first communication openings 3315b (the first collection side communication openings) are arranged in a direction (the third direction) intersecting the row direction (the first direction) of the ejection opening row to form a first collection side communication opening row.

The plurality of second communication openings 3333a (the second supply side communication openings) are arranged in the row direction (the first direction) of the ejection opening row to form a second supply side communication opening row. The plurality of second communication openings 3333b (the second collection side communication openings) are arranged in the row direction (the first direction) of the ejection opening row to form a second collection side communication opening row.

The arrangement density of the plurality of second communication openings 3333a and the arrangement density of the plurality of second communication openings 3333b are smaller than the arrangement density of the plurality of first communication openings 3315a and the arrangement density of the plurality of first communication openings 3315b. Further, the arrangement density of the plurality of first communication openings 3315a and the arrangement density of the plurality of first communication openings 3315b are smaller than the arrangement density of the plurality of supply openings 3017a and the arrangement density of the plurality of collection openings 3017b. The first common supply passage 3313 and the first common collection passage 3314 extend in the first direction and the first common supply passage 3313 and the first common collection passage 3314 are alternately arranged in parallel in the third direction intersecting the first direction. The second common supply passage 3331 and the second common collection passage 3332 extend in the third direction intersecting the first direction and the second common supply passage 3331 and the second common collection passage 3332 are alternately arranged in parallel in the first direction. The third common supply passage 3335 and the third common collection passage 3336 extend in the first direction.

The liquid ejection head of the embodiment can have a configuration in which the density of the passages gradually increases from the sixth passage layer 3090 toward the first passage layer 3011 by laminating a plurality of passage layers in this way. Accordingly, it is possible to provide a liquid ejection head having a plurality of ejection opening rows densely arranged while suppressing an increase in size of the print element board and each passage member.

A flow of the liquid (hereinafter, referred to as the ink) of the liquid ejection head of the embodiment will be described. The ink which is supplied from the outside flows into the liquid ejection head from the third common supply passage 3335 serving as an inflow opening. Next, the ink is supplied to the passage 3310 (the pressure chamber 3023) while sequentially passing through the second communication opening 3333a, the second common supply passage 3331, the first communication opening 3315a, the first common supply passage 3313, and the supply opening 3017a. Subsequently, the ink flows to the outside from the third common collection passage 3336 serving as an outflow opening while sequentially passing through the collection opening 3017b, the first common collection passage 3314, the first communication opening 3315b, the second common collection passage 3332, the second communication opening 3333b, and the third common collection passage 3336.

When the ink is caused to forcedly flow in this way, it is possible to suppress the ink inside the ejection head from being thickened. As a result, it is possible to suppress a decrease in ink ejection speed or a modulation in color concentration of each printed dot. Hereinafter, in the specification, such a forced flow of the ink will be referred to as an "ink circulation flow".

The embodiment has a following configuration to suppress a change in pressure of each pressure chamber or a change in flow amount of the ink circulation flow in each pressure chamber. That is, as illustrated in FIGS. 23A to 23G, the first communication opening 3315a communicates with one first common supply passage 3313. Similarly, the first communication opening 3315b communicates with one first common collection passage 3314. Here, at least one of the first communication opening 3315a and the first communication opening 3315b is provided at a plurality of positions. The first communication opening 3315a and the first communication opening 3315b are disposed so that a change in pressure of each pressure chamber or a change in flow amount of the ink circulation flow in each pressure chamber 3023 does not cause a large influence on the ejection characteristics. Particularly, one ejection opening row 3024 has a configuration in which the first communication opening 3315a and the first communication opening 3315b are alternately arranged in the row direction with respect to the ejection opening row. With the alternate arrangement, a gap between the first communication opening 3315a and the first communication opening 3315b can be narrowed. That is, even when the first common supply passage 3313 and the first common collection passage 3314 have relatively narrow passage widths, it is possible to suppress a change in pressure of each pressure chamber or a change in flow amount of the ink circulation flow in each pressure chamber 3023 (each passage 3310).

Further, the first communication opening 3315a and the first communication opening 3315b are arranged as below. First, in the plurality of pressure chambers 3023 (the passages 3310), a passage resistance of the passage between the first common collection passage 3314 and the first common supply passage 3313 including the pressure chamber 3023 (the passage 3310) is indicated by "r". Further, in the first common supply passage 3313, a passage resistance of the passage between the adjacent supply openings 3017a (that is, the supply passages) is indicated by "R". Similarly, in the first common collection passage 3314, a passage resistance of the passage between the adjacent collection openings 3017b (that is, the collection passages) is indicated by "R". Regarding the flow amount of the ink flowing through each passage 3310 (the pressure chamber 3023), an average flow amount is indicated by "q", a flow amount difference between a maximal flow amount and a minimal flow amount in a range in which the ejection characteristics are not influenced, that is, a deviation of a landing position or color unevenness does not affect on an image is indicated by "Δq", and a ratio therebetween is indicated by "X" (that is, the flow amount ratio X=Δq/q). At this time, the first communication opening 3315 is disposed so that the number N of the ejection openings between the first communication opening 3315a and the first communication opening 3315b satisfies the following equation.

[Equation 1]

$$N \leq 2\sqrt{\frac{r}{R} \times X}$$ Equation (1)

When the first communication opening 3315a and the first communication opening 3315b are disposed in such a condition, it is possible to suppress a change in flow amount of the ink circulation flow between pressure chambers in the pressure chambers 3023 (the passages 3310) at a flow amount difference in which the ejection characteristics are not influenced.

Equation (1) of suppressing a change in flow amount of the ink circulation flow between pressure chambers in the pressure chambers 3023 will be described in detail with reference to FIG. 25. FIG. 25 is an equivalent circuit diagram illustrating a part between the first communication opening 3315a and the first communication opening 3315b which are adjacent to each other with respect to the first direction. A case will be described in which N number of the pressure chambers 3023 (the passages 3310) are provided between the first communication opening 3315a and the first communication opening 3315b which are adjacent to each other.

In this case, a largest amount of the ink flows to the pressure chamber 3023 (the pressure chamber 1 in FIG. 25) which is closest to the first communication opening 3315a and flows to the pressure chamber 3023 which is closest to the first communication opening 3315b among N number of the pressure chambers 3023. Further, a smallest amount of the ink flows to the pressure chamber 3023 that lies in the middle of the first communication opening 3315a and the first communication opening 3315b among N number of the pressure chambers 3023. When the maximal flow amount and the minimal flow amount are respectively indicated by "$q_1$" and "$q_2$" and an average value of the flow amount of the ink flowing in each pressure chamber 3023 is indicated by "q", a total amount Q of the supplied ink satisfies a relation of Q=Nq.

Pressure loss $p_1$ of the ink which flows from the first communication opening 3315a to the pressure chamber 3023 (the pressure chamber 1 of FIG. 25) which is closest to the first communication opening 3315a and flows through the first common collection passage 3314 to reach the first communication opening 3315b is expressed below.

[Equation 2]

$$p_1 = q_1 r + \frac{1}{2}QNR$$ Equation (2)

Pressure loss $p_2$ of the ink which flows from the first communication opening 3315a through the first common supply passage 3313, passes through the pressure chamber (the pressure chamber 2 of FIG. 25) that lies in the middle of the first communication opening 3315a and the first communication opening 3315b, and passes through the first common collection passage 3314 to reach the first communication opening 3315b is expressed below.

[Equation 3]

$$p_2 \leq \frac{3}{4} \times \frac{1}{2}QNR + q_2 r + \frac{3}{4} \times \frac{1}{2}QNR$$ Equation (3)

Since the pressure loss $p_1$ and the pressure loss $P_2$ are equal to each other, a flow amount difference Δq' between the maximal flow amount $q_1$ and the minimal flow amount $q_2$ of the ink flowing through each pressure chamber satisfies a following equation from Equation (2) and Equation (3).

[Equation 4]

$$p_2 \leq \frac{3}{4} \times \frac{1}{2}QNR + q_2 r + \frac{3}{4} \times \frac{1}{2}QNR$$ Equation (4)

Here, in order to prevent an influence on the ejection characteristics, a ratio between the flow amount difference Δq'=$q_1$−$q_2$ between the maximal flow amount and the minimal flow amount of the ink flowing through each pressure chamber and the average flow amount q of the ink flowing through each pressure chamber needs to be set to a predetermined flow amount ratio X or less. For that reason, a condition in the following equation is needed.

[Equation 5]

$$\Delta q'/q \leq \frac{1}{4}N\frac{QR}{qr} = \frac{1}{4}N^2\frac{R}{r} \leq X$$ Equation (5)

When Equation (5) is modified by focusing on the number N of the pressure chambers between the first communication opening 3315a and the first communication opening 3315b, Equation (1) is obtained.

In the embodiment of the invention, when the flow amount of the ink circulation flow is increased and decreased by a certain ratio or more, an ink collection effect obtained by the ink circulation flow in an inferior portion of the ejection opening changes. Accordingly, it is understood that the ejection speed or the ejection liquid droplet volume changes or a color concentration largely changes. Particularly, in a non-limiting example of the embodiment, in a case where the flow amount is increased and decreased by 10% with respect to a certain flow amount of the ink circulation flow, the ejection speed or the ejection liquid droplet volume changes and thus a color concentration largely changes. Further, in this example, in a case where the ratio Δq/q between the flow amount difference between the maximal flow amount and the minimal flow amount and the average flow amount is set to a predetermined flow amount ratio X0.2 or less, the ejection characteristics or the color concentration is not largely influenced.

Next, an example of an influence on a change in flow amount of the ink circulation flow will be described with reference to FIG. 37.

Figure 37:
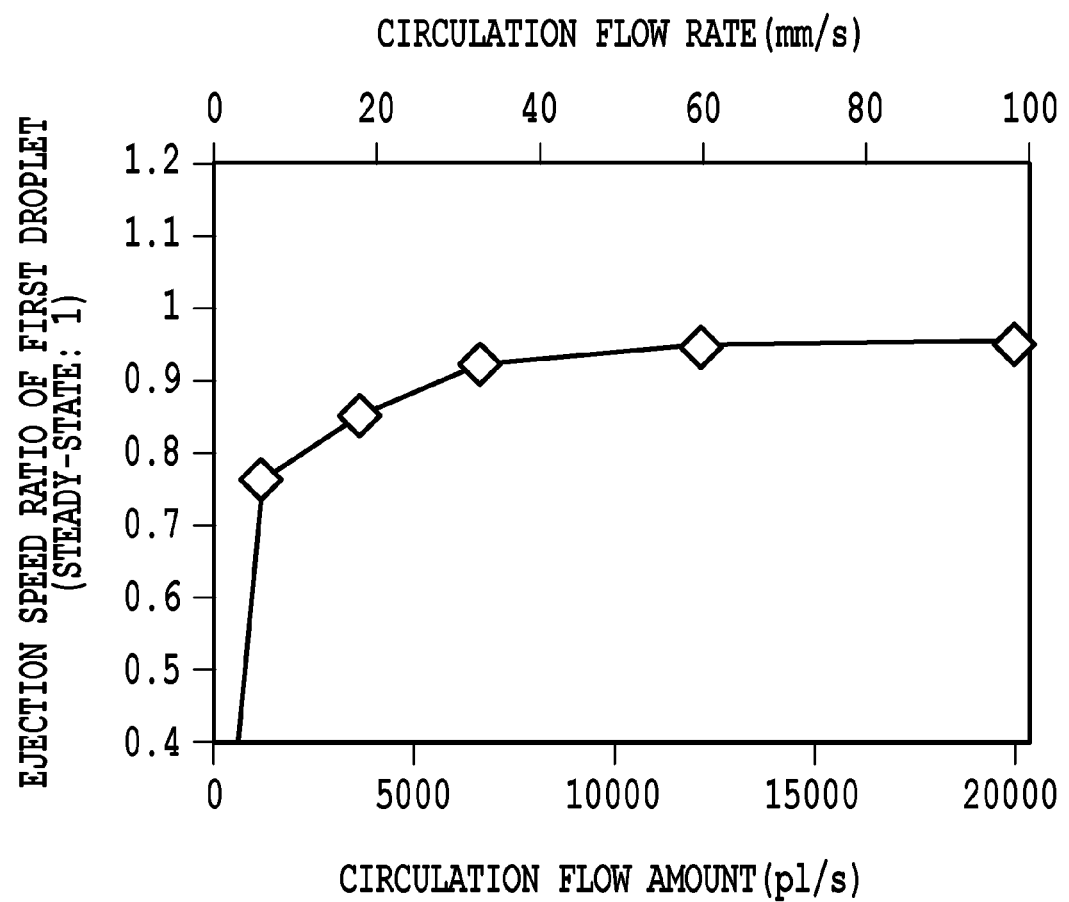
FIG. 37 is a diagram illustrating an influence of a change in flow amount of an ink circulation flow.

FIG. 37 is a graph illustrating a non-limiting example of a relation between the flow amount (the circulation flow amount) of the ink circulation flow in the inferior portion of each ejection opening and the ejection speed of the ink ejected as a first droplet after the ink ejection operation is temporarily stopped for a predetermined time when the ink is circulated at each circulation flow amount. In this example, in a case where the circulation flow amount is about 7000 pl/s or more on the condition that a boundary line is set around the circulation flow amount of 7000 pl/s, the ink can be ejected from a first droplet at an ejection speed equal to or higher than 90% of the normal ejection speed. On the contrary, in a case where the circulation flow amount is smaller than about 7000 pl/s, the ejection speed of the ink of the first droplet becomes lower than about 90% of the normal ejection speed. When the ink ejection speed decreases, a positional deviation occurs when the ejected ink arrives at (landed on) a print medium and thus a deterioration in image quality occurs.

Thus, it is important to increase the circulation flow amount by a certain degree so as that the decrease in the ink ejection speed is suppressed after the ink ejection operation is temporarily stopped for a predetermined time in order to prevent a deterioration in image quality caused by a positional deviation during a landing operation.

Figure 36:
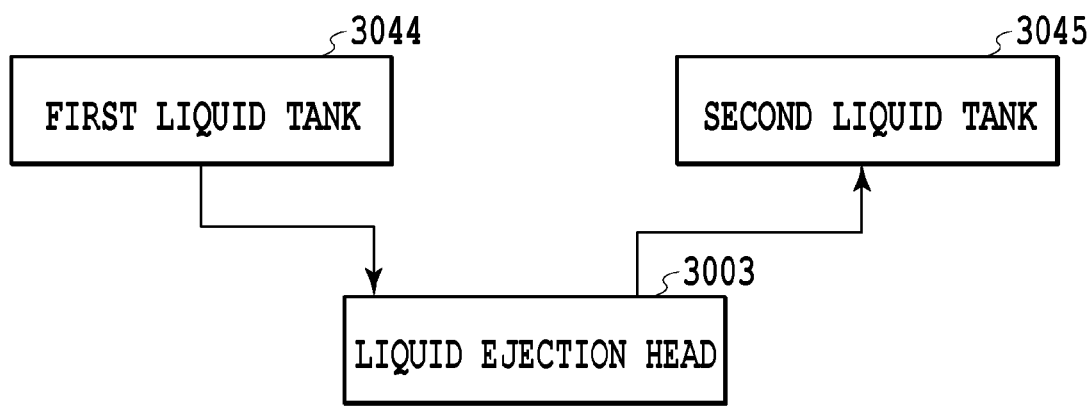
FIG. 36 is a conceptual diagram illustrating an example of an ink supply system of the invention.

Here, FIG. 36 illustrates an example of an ink supply system which can be applied to the liquid ejection head of the invention. In FIG. 36, a liquid ejection head 3003 fluid-communicates with a first upstream liquid tank 3044 and a second downstream liquid tank 3045. The first liquid tank 3044 supplies the ink to the third common supply passage 3335. The supplied ink passes through the second common supply passage 3331 and the first common supply passage 3313 while flowing through each communication opening to be supplied to the pressure chamber 3023 (the passage 3310). Further, the ink passes through the first common collection passage 3314 and the second common collection passage 3332 while flowing through each communication opening from the pressure chamber 3023 (the passage 3310) and is collected from the third common collection passage 3336 to the second liquid tank 3045. In such a structure, as a method of generating the ink circulation flow, there is a method of using a water head difference between the first liquid tank 3044 and the second liquid tank 3045. Further, there is also a method of controlling the pressures of the first liquid tank 3044 and the second liquid tank 3045 and using a pressure difference between the first liquid tank 3044 and the second liquid tank 3045. Further, there is a method of generating a flow by a pump or the like.

However, in a case where the circulation flow amount is increased by a pump or the like or a pressure difference between the first liquid tank 3044 and the second liquid tank 3045, there is a tendency that the pressure in the inferior of the ejection opening is not easily controlled. Thus, the circulation flow amount may be set to be small so that the ejection speed does not decrease too much in consideration of both a difficulty in pressure control and a deterioration in image quality caused by a positional deviation of the ink during a landing operation.

As described above, in the embodiment, the first communication opening 3315a and the first communication opening 3315b are respectively disposed in the first common supply passage 3313 and the first common collection passage 3314 so that at least one of the first communication opening 3315a and the first communication opening 3315b is provided at a plurality of positions to satisfy Equation (1). Accordingly, it is possible to decrease a value of a ratio (a flow amount ratio) X between the flow amount difference between the maximal flow amount and the minimal flow amount and the average flow amount while the ratio r/R of the fluid resistance is fixed. That is, it is possible to suppress a change in flow amount of the ink circulation flow between pressure chambers in the pressure chambers 3023 without widening the passage widths of the first common supply passage 3313 and the first common collection passage 3314.

Thus, since it is possible to suppress a modulation in color concentration or a decrease in ejection speed of the liquid droplet caused by the evaporation of moisture from the ejection opening 3013, it is possible to form a high-quality image with high accuracy.

Similarly, in the embodiment, it is possible to suppress a change in pressure between pressure chambers of the pressure chambers 3023. The pressure loss generated in the first common supply passage 3313 or the first common collection passage 3314 becomes a change in pressure between pressure chambers of the pressure chambers in the row direction of the ejection opening row. That is, when a change in pressure is indicated by "ΔP", a following equation is established.

[Equation 6]

$$\Delta P = \frac{1}{2} QNR \qquad \text{Equation (6)}$$

Here, when a maximal change in pressure allowed in a range in which the ejection characteristics are not influenced is indicated by "ΔPm", the first communication opening 3315a and the first communication opening 3315b are disposed so that the number N of the ejection openings therebetween satisfies a following equation.

[Equation 7]

$$N \leq \sqrt{\frac{2\Delta Pm}{qR}} \qquad \text{Equation (7)}$$

In this way, in the embodiment, the plurality of first communication openings 3315a and the plurality of first communication openings 3315b are respectively disposed in the first common supply passage 3313 and the first common collection passage 3314 to satisfy Equation (7). Accordingly, it is possible to suppress a change in pressure between pressure chambers in the pressure chambers without widening the passages width of the first common supply passage 3313 or the first common collection passage 3314. Thus, since it is possible to suppress a change in ink ejection speed or a change in volume of the liquid droplet of the ejected ink, it is possible to form a high-quality image with high accuracy.

Further, it is preferable that the embodiment has a following configuration in order to suppress a change in pressure between the pressure chambers of the pressure chambers or a change in flow amount of the ink circulation flow between the pressure chambers respectively corresponding to the ejection openings 3013 densely arranged. That is, as illustrated in FIGS. 22A to 22M, the second common supply passage 3331 extends in a direction (the third direction) intersecting the row direction (the first direction) of the ejection opening row 3024 and communicates with the plurality of first communication openings 3315a arranged in the third direction. Similarly, the second common collection passage 3332 extends in the third direction intersecting the row direction (the first direction) of the ejection opening row 3024 and communicates with the plurality of first communication openings 3315b arranged in the third direction. Further, the plurality of second common supply passages 3331 are integrated as one passage corresponding to the third common supply passage 3335 through the second communication opening 3333a. Similarly, the plurality of second common collection passages 3332 are integrated as one passage corresponding to the third common collection passage 3336 through the second communication opening 3333b.

In this way, in the embodiment, the passages are connected to the ejection opening forming member 3012 according to a six-layer structure including the first passage layer 3011, the second passage layer 3050, the third passage layer 3060, the fourth passage layer 3070, the fifth passage layer 3080, and the sixth passage layer 3090. Accordingly, a plurality of the first common supply passages 3313 which are arranged at a narrow pitch in the plurality of ejection opening rows 3024 which are densely arranged can be integrated while the first communication openings 3315a are arranged to satisfy Equation (1). Similarly, a plurality of the first common collection passages 3314 which are arranged at a narrow pitch in the plurality of ejection opening rows 3024 which are densely arranged can be integrated while the first communication openings 3315b are arranged to satisfy Equation (1). That is, it is possible to densely form the ejection opening rows without widening the passage widths of the first common supply passage 3313 and the first common collection passage 3314. Furthermore, it is possible to suppress a change in pressure between the pressure chambers in the pressure chambers or a change in flow amount of the ink circulation flow between the pressure chambers in the pressure chambers 23 (the passages 3310) respectively corresponding to the ejection openings 3013 of the plurality of ejection opening rows 3024 which are densely arranged. Further, it is possible to simply supply the ink from the liquid tank and collect the ink into the liquid tank with respect to the ejection openings 3013 which are densely arranged while suppressing a change in pressure of each pressure chamber or a change in flow amount of the ink circulation flow of each pressure chamber 3023 (the passage 3310). Accordingly, there are advantages that the liquid ejection head can be provided in a compact size and the entire system of the liquid ejection apparatus including the liquid ejection head can be provided in a compact size.

The embodiment is particularly effective in a case where the number of the pressure chambers 3023 respectively disposed at the ejection opening rows 3024 is large (for example, 100 or more) and the arrangement density of the plurality of ejection opening rows 3024 (the arrangement density of the ejection opening rows in a direction intersecting the ejection opening row) is high (for example, 50 dpi or more). In such a case, even when a ratio (r/R) between the passage resistances of the pressure chamber and the passage is small (for example, about 1/1000), there is a tendency that the flow amount of the ink circulation flow becomes uneven. That is, in a case where the number of the ejection openings constituting the ejection opening row is further increased or a gap between the ejection opening rows is narrowed, the configuration of the invention can be effectively used to suppress a change in pressure of each pressure chamber or a change in flow amount of the ink circulation flow of each pressure chamber. In particular, the configuration of the invention is effective for a line head which is a liquid ejection head having a length corresponding to a width of a print medium and a liquid ejection head in which ejection openings are densely arranged at 600 dpi or more.

Next, in the embodiment, a case will be described in which the ink is ejected from the plurality of ejection openings 3013. It is preferable that the embodiment has a following configuration in order to suppress a change in flow amount of the ink circulation flow in the pressure chamber 3023 which is temporarily stopped in a case where the ink is ejected from the plurality of ejection openings 3013. Here, the flow amount of the ink which is ejected from each ejection opening 3013 is indicated by "I". At this time, the first communication opening 3315a and the first communication opening 3315b are disposed so that the number N of the ejection openings 3013 therebetween satisfies a following equation.

[Equation 8]

$$N \leq \sqrt{2 \times \frac{r}{R} \times \frac{q}{I} \times X} \qquad \text{Equation (8)}$$

In the embodiment, the first communication opening 3315a and the first communication opening 3315b are disposed with such a condition. Accordingly, it is possible to suppress a change in flow amount of the ink circulation flow between the pressure chambers of the pressure chambers 3023 which are temporarily stopped to a flow amount difference in which the ejection characteristics are not influenced in a case where the ink is ejected from the plurality of ejection openings 3013.

Referring to FIGS. 26A and 26B, Equation (8) of suppressing a change in flow amount of the ink circulation flow in the pressure chamber 3023 which is temporarily stopped in a case where the ink is ejected from the plurality of ejection openings 3013 will be described in detail.

In a case where the ink circulation flow is generated at a flow amount enough to suppress an influence caused by the evaporation of moisture from the ejection opening 3013, there is a case in which the amount of the ink ejected from the plurality of ejection openings 3013 becomes larger than the flow amount of the ink circulation flow. In such a case, as illustrated in FIG. 26A, the ink of the first common collection passage 3314 flows reversely. That is, in FIG. 26A, the ink flows in the first common supply passage 3313 in a direction from the first communication opening 3315a to the first communication opening 3315b as indicated by the arrow. Further, the ink is ejected from the ejection openings to the plurality of pressure chambers 3023 at a flow amount I. Thus, the ink flows in the first common collection passage 3314 in a direction from the first communication opening 3315b to the first communication opening 3315a.

A graph obtained by imaging the relationship between the pressure distributions of the first common supply passage 3313 and the first common collection passage 3314 at this time is illustrated in FIG. 26B. In the graph, a horizontal axis indicates a relative position L in a direction from the first communication opening 3315a to the first communication opening 3315b at an adjacent position and a vertical axis thereof indicates a pressure P. In a case where the ink ejection operation from the pressure chamber 3023 in the state illustrated in FIG. 26A is temporarily stopped, an ink amount ratio between the amounts of the inks supplied from the pressure chambers to the first common supply passage 3313 and the first common collection passage 3314 is set to t:1−t. At this time, when the pressure loss generated in the first common supply passage 3313 is indicated by "ΔPin1" and the pressure loss generated in the first common collection passage 3314 is indicated by "ΔPout1", two following equations are established.

[Equation 9]

$$\Delta Pin1 = NR \times \frac{NIt}{2} \qquad \text{Equation (9)}$$

-continued

[Equation 10]

$$\Delta Pout1 = NR \times \frac{NI(1-t)}{2} \quad \text{Equation (10)}$$

Further, a pressure generated at the side of the first common supply passage 3313 in each pressure chamber is indicated by "Pin", a pressure generated at the side of the first common collection passage 3314 is indicated by "Pout", a maximal value of a change in pressure of each pressure chamber is indicated by "ΔPmax", and a minimal value thereof is indicated by "ΔPmin". At this time, since an equation of ΔPmax=Pin−Pout+ΔPout1 and an equation of ΔPmin=Pin−Pout−ΔPin1 are established, a change in flow amount Δq' of the ink circulation flow is expressed by a following equation.

[Equation 11]

$$\Delta q' = \frac{\Delta P\max - \Delta P\min}{r} = \frac{N^2 RI}{2r} \quad \text{Equation (11)}$$

In order to set a change in flow amount Δq' of the ink circulation flow at a predetermined flow amount ratio X or less, a condition of a following equation is necessary.

[Equation 12]

$$\Delta q'/q = \frac{N^2 RI}{2rq} \leq X \quad \text{Equation (12)}$$

When Equation (12) is modified by focusing on the number N of the pressure chambers between the first communication opening 3315a and the first communication opening 3315b, Equation (8) is obtained.

Here, in the embodiment, the passage widths of the first common supply passage 3313 and the first common collection passage 3314 of the liquid ejection head which is a non-limiting example of the invention are set to 200 μm and the passage heights thereof are set to 500 μm. Further, the ejection openings 3013 of the ejection opening row 3024 are arranged at the density of 600 dpi and the passage 3310 below the ejection opening 3013 is formed in a shape in which the passage width is 30 μm, the passage height is 14 μm, and the passage length is 100 μm. In the liquid ejection head, a case will be examined in which the ink is ejected while the flow rate of the ink circulation flow in the inferior of the ejection opening is set to 0.01 m/s, the ejection amount is set to 5 pl, and the driving frequency is set to 10 kHz. In this case, when the number N of the ejection openings between the first communication opening 3315a and the first communication opening 3315b is set to about 65 or less, an influence of a change in flow amount can be suppressed.

In this way, in the embodiment, the first communication opening 3315a and the first communication opening 3315b are respectively disposed in the first common supply passage 3313 and the first common collection passage 3314 so that at least one of the first communication opening 3315a and the first communication opening 3315b is provided at a plurality a positions in order to satisfy Equation (8). Accordingly, it is possible to decrease a value of the flow amount ratio X while a ratio r/R of the passage resistance is fixed. That is, it is possible to suppress a change in flow amount of the ink circulation flow in the pressure chamber 3023 (the passage 3310) which is temporarily stopped in a case where the ink is ejected from the plurality of ejection openings while the passage widths of the first common supply passage 3313 and the first common collection passage 3314 are not widened. Thus, since it is possible to suppress a modulation in color concentration or a decrease in ejection speed of the liquid droplet of the ink caused by the evaporation of moisture from the ejection opening 3013, it is possible to form a high-quality image with high accuracy.

Further, it is desirable that the embodiment have a following configuration in order to suppress a change in pressure of each pressure chamber or a change in flow amount of the ink circulation flow in each pressure chamber. That is, the first communication openings 3315a or the first communication openings 3315b disposed at both ends of the ejection opening row 3024 in the row direction are formed in a shape in which the opening areas are smaller than those of the first communication openings 3315a or the first communication openings 3315b which are disposed at a position other than both ends.

When viewed from the first communication openings 3315a or the first communication openings 3315b disposed at both ends, the ejection opening 3013 is disposed only at one side of the row direction of the ejection opening row. For that reason, the total ink amount Q of the ink passing through the first communication opening 3315a or the first communication opening 3315b becomes smaller than the total ink amount of the ink passing through the first communication opening 3315a or the first communication opening 3315b disposed at a position different from both ends in the row direction of the ejection opening row. For that reason, when the passage resistance increases while the first communication openings 3315a or the first communication openings 3315b at both ends are formed to be smaller than the center portion, the pressure loss generated in the first communication opening 3315a or the first communication opening 3315b disposed at a position different from the end can be substantially even. Thus, it is possible to decrease a difference between the ink circulation flow passing through the pressure chamber communicating with the first communication openings 3315a or the first communication openings 3315b at both ends and the ink circulation flow passing through the pressure chamber communicating with the first communication opening 3315a or the first communication opening 3315b disposed at a different position. Accordingly, it is possible to further suppress a change in flow amount of the ink circulation flow in each pressure chamber.

Referring to FIG. 27 and FIGS. 28A to 28C, another embodiment will be described. The embodiment has a following configuration in order to suppress a change in flow amount of the ink circulation flow in each pressure chamber 3023.

FIG. 27 is a top view illustrating a print element board of the liquid ejection head of the embodiment. As illustrated in FIG. 27, in a print element board 3010 of the embodiment, an area between the end of the ejection opening row 3024 and the end of the print element board 3010 is large. For example, a driving circuit or a pad transmitting and receiving an electric signal to and from the print element board 3010 is disposed in the area.

FIGS. 28A to 28C are schematic top perspective views illustrating a part of one ejection opening row 3024 in the liquid ejection head of the embodiment. In FIGS. 28A to 28C, an arrow indicates a direction of the ink circulation flow. In the case of the print element board 3010 illustrated in FIG. 27, as illustrated in FIGS. 28A and 28B, the first communication opening 3315*b* is disposed to overlap the ejection opening 3013 at the end of the ejection opening row 3024. On the contrary, FIG. 28C illustrates an example in which the first communication opening 3315*b* is disposed so as not to overlap the end of the ejection opening 3013. According to the configurations of FIGS. 28A and 28B, it is possible to shorten a length in which the ink flows from the first communication opening 3315*a* at the end of the ejection opening row 3024 to the first communication opening 3315*b* through the pressure chamber 3023 compared to the configuration of FIG. 28C. That is, it is possible to decrease a maximal pressure loss generated in the first common supply passage 3313 and the first common collection passage 3314 in the vicinity of the end of the ejection opening row 3024 according to the arrangement illustrated in FIG. 28A or 28B. For that reason, it is possible to suppress a change in flow amount of the ink circulation flow in each pressure chamber 3023. Further, the same applies to a configuration in which the first communication opening 3315*a* instead of the first communication opening 3315*b* is disposed to overlap the ejection opening of the end of the ejection opening row 24.

Referring to FIGS. 22A to 22M, another embodiment will be described. The embodiment has a following configuration in order to suppress a temperature distribution within a chip (the print element board 3010). That is, as illustrated in FIGS. 22D and 22J, the first communication openings 3315 at both ends of the ejection opening row 3024 in the row direction are formed as the first communication openings 3315*b*.

In a case where the ink of each pressure chamber is forcedly circulated as in the configuration of the embodiment, the temperature of the collection side ink flowing out from the pressure chamber increases when the heat emitted from the print element 3015 or the like is generally collected by the liquid (the ink). Further, there is a case in which the amount of the ink ejected from the plurality of ejection openings 3013 increases even when the ink circulation flow is generated at a flow amount enough to suppress an influence caused by the evaporation of moisture in the ejection opening 3013. At that time, the ink is also supplied from the first communication opening 3315*b* through the third common collection passage 3336. That is, there is a case in which the high-temperature ink is supplied from the first communication opening 3315*b* when the ink is ejected from the plurality of ejection openings 3013. Accordingly, the temperature in the vicinity of the first communication opening 3315*b* becomes higher than the temperature in the vicinity of the first communication opening 3315*a* and thus a difference in ejection speed occurs between the ejection opening 3013 in the vicinity of the first communication opening 3315*a* and the ejection opening 3013 in the vicinity of the first communication opening 3315*b*. Thus, in a case where the first communication openings 3315 at both ends of the ejection opening row 3024 are disposed such that the first communication opening 3315*a* is disposed at one end and the first communication opening 3315*b* is disposed at the other end, an inclined temperature distribution occurs in the row direction when viewed from the ejection opening row 3024 as a whole. For that reason, a temperature distribution width increases in the entire chip. As a result, a change in ejection characteristic occurs in the entire chip. That is, when the first communication opening 3315*b* corresponding to the same passage is disposed at both ends of the ejection.opening row 3024 in the row direction, such an inclined temperature distribution can be suppressed. Thus, it is possible to suppress a change in ejection characteristic.

In FIGS. 22D and 22J, the first communication opening 3315*b* is disposed at both ends, but an inclined temperature distribution can be suppressed even when the first communication opening 3315*a* is disposed at both ends. However, as illustrated in FIGS. 22D and 22J, it is desirable to dispose the first communication opening 3315*b* at both ends of the ejection opening row 3024 in the row direction. In the print element board 3010 of the embodiment, an area without the ejection opening 3013 between the end of the print element board 3010 and each of both ends of the ejection opening row 3024 is large and heat generated by the ink ejection operation is emitted from this area. For that reason, there is a tendency that the temperature at both ends of the ejection opening row 3024 in the row direction is lower than those of the other positions in a case where the ink is ejected from the plurality of ejection openings 3013. On the contrary, when the first communication opening 3315*b* is disposed at both ends, the high-temperature ink can be supplied to both ends and the temperatures at both ends can be further increased. Accordingly, it is possible to decrease a temperature difference with respect to the other positions. That is, since it is possible to decrease a temperature distribution with in the entire chip, it is possible to suppress a change in ejection characteristic.

Additionally, in the embodiment, a configuration has been described in which the first communication opening 3315*a* and the first communication opening 3315 are provided at a plurality of positions, but the invention may have a configuration in which at least one of the first communication opening 3315*a* and the first communication opening 3315 is provided at a plurality of positions. That is, the invention also includes a configuration in which at least one of the first communication opening 3315*a* and the first communication opening 3315*b* is provided at a plurality of positions and a change in ejection characteristic is suppressed. For example, the invention also includes a configuration in which the first communication opening 3315*a* is provided at two positions and the first communication opening 3315*b* is provided at one position. Further, as another example, the invention also includes a configuration in which the first communication opening 3315*a* is provided at one position and the first communication opening 3315*b* is provided at two positions.

Further, a relation between a component and a passage layer of each of the embodiments of the invention does not limit the invention. In the configurations of the ejection opening forming member and the first to sixth passage layers, the liquid ejection head may be obtained by laminating different members. Further, the liquid ejection head may be obtained by integrally molding a plurality of layers. As an example, two configuration examples below can be exemplified. As for a first configuration example, the first passage layer 3011 and the second passage layer 3050 are integrated as the print element board 10 of the above-described application example. Specifically, the supply opening 3017*a*, the collection opening 2017*b*, the first common supply passage 3313, and the first common collection passage 3314 are formed on a Si substrate provided with the print element 3015. The third passage layer 3060 is formed on a lid member 20 or 2020 and a part of the fourth passage layer 3070 is formed on the support member 30 of FIG. 10. The other part of the fourth passage layer 3070 is formed on the first passage member 50 of FIG. 7 and a part of the fifth passage layer 3080 and the sixth passage layer 3090 are formed on the second passage member 60. The other part of the sixth passage layer 3090 is formed on the third passage member 70. As for a second configuration example, the first passage layer 3011 and the second passage layer 3050 are formed on the print element board 10 of the above-described application example. The third passage layer 3060 is formed on the lid member 20 or 2020 and a part of the fourth passage layer 3070 is formed on the support member 2030. The other part of the fourth passage layer 3070 and the fifth passage layer 3080 are formed on the first passage member 2050 and the sixth passage layer 3090 is formed on the second passage member 2060. Further, the first passage layer 3011 may be formed on the print element board 10 and the second passage layer 3050 may be formed on a second substrate.

(Liquid Ejection Head Manufacturing Step)

Figure 38:
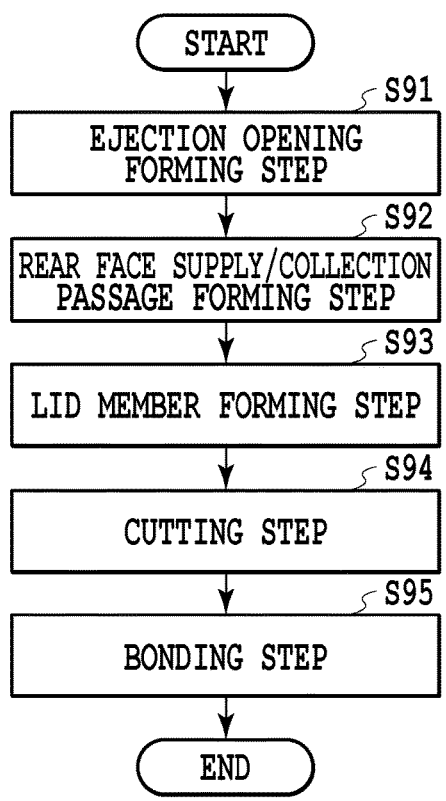
FIG. 38 is a diagram illustrating an example of a manufacturing step of a liquid ejection head of the invention.

FIG. 38 illustrates an example of a liquid ejection head manufacturing step of the embodiment. As illustrated in FIG. 38, in this example, first, in step S91, the ejection opening forming member 3012 is formed on the print element board 3010 having the print element 3015 or a necessary circuit formed thereon to form the ejection opening (an ejection opening forming step). Next, in step S92, the supply opening 3017a and the collection opening 3017b are formed at a rear face which is a face opposite to the ejection opening forming face of the print element board 3010 (a rear face supply/collection passage forming step). Next, in step S93, the lid member 20 is formed on a rear face of the print element board 10 to cover the supply opening 3017a and the collection opening 3017b (a lid member forming step). Next, in step S94, the print element board 10 having a lamination configuration obtained by step S93 is processed from a wafer shape into a chip shape (a cutting step). Further, in step S95, the print element board 10 which is obtained as a chip in step S94 is bonded to the support member 30 (a bonding step).

In this way, in this example, the third passage layer 3060 (the lid member 20) is formed on the rear face of the print element board 3010 (the print element board 10) by the lid member forming step (S93) before the bonding step (S95). Accordingly, the first communication opening 3315a and the first communication opening 3315b can be formed in a wafer step of processing a substrate into a wafer shape. Since the lid member 20 is formed by the wafer step, the accuracy of the member becomes satisfactory compared to a case where the member is formed by machining or molding. For that reason, finer holes can be formed with higher accuracy. Further, the lid member 20 can be formed to be thinner. Thus, the ejection opening can be disposed densely. Further, it is possible to decrease the passage resistance of the first communication opening 3315a or the first communication opening 3315b and to decrease a change therein. Thus, it is possible to stabilize a differential pressure generating the ink circulation flow and thus to decrease a change in circulation flow amount.

Here, the lid member 20 may be formed by a silicon substrate from the viewpoint of a manufacturing step. That is, since the lid member 20 which is formed by the wafer-shaped silicon substrate is bonded to the wafer-shaped print element board 10, it is possible to decrease the number of steps compared to the case where the lid member 20 is bonded to a chip obtained by cutting a wafer.

Alternatively, the lid member 20 may be formed of a resin film. Since it is possible to bond the lid member 20 by laminating a film-shaped resin on the wafer-shaped print element board 10 as in the case where the lid member is formed by the silicon substrate, it is possible to decrease the number of steps of bonding the lid member to each chip.

Here, the sequence or the content of the step of the embodiment is merely an example of the invention and does not limit the invention. That is, the sequences of the ejection opening forming step, the rear face supply/collection passage forming step, the lid member forming step, and the cutting step do not limit the invention and the lid member forming step (S93) may be performed before the bonding step (S95).

(Second Embodiment)

Referring to FIGS. 29A to 32D, a liquid ejection head according to a second embodiment of the invention will be described. The same reference numerals will be given to the same components as those of the above-described embodiment and the description thereof will be omitted.

FIGS. 29A to 29M are exploded views illustrating a main part of the liquid ejection head according to the embodiment of the invention. FIGS. 29A to 29G are exploded perspective views illustrating components and FIGS. 29H to 29M are exploded top views illustrating components.

Figure 30:
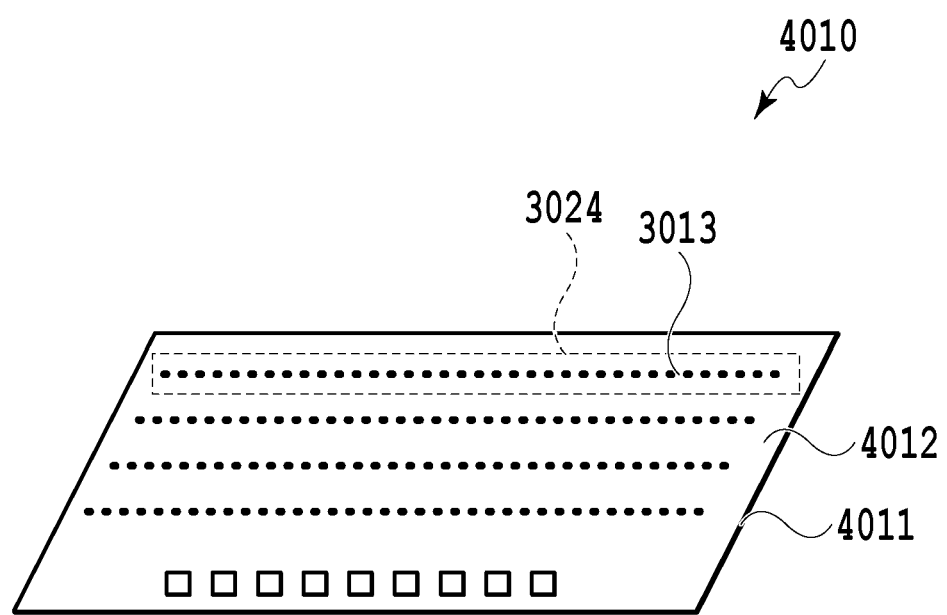
FIG. 30 is a top view illustrating a print element board according to the second embodiment.
Figure 31:
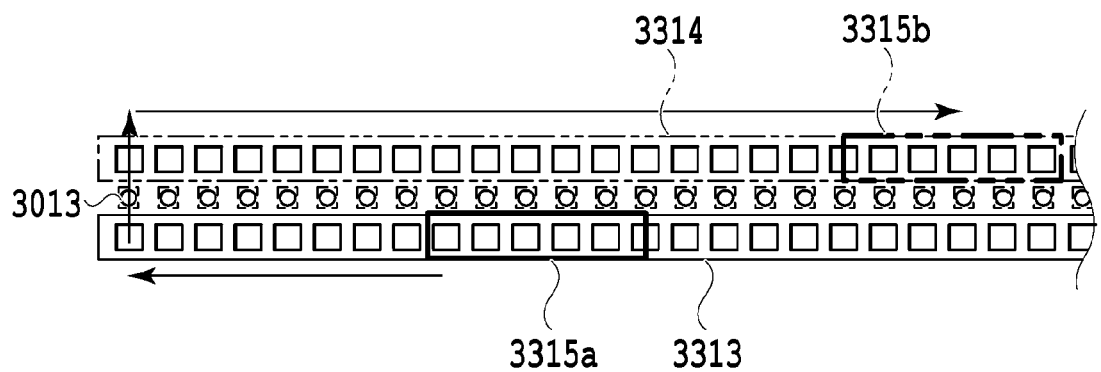
FIG. 31 is a top perspective view illustrating a part of the liquid ejection head according to the second embodiment.

FIG. 30 is a top view illustrating a shape of the print element board of the liquid ejection head of the embodiment. FIG. 31 is a schematic perspective view illustrating the liquid ejection head and illustrating the end of the ejection opening row. FIG. 32 is a diagram illustrating a change in circulation flow amount of the embodiment. FIGS. 32A and 32B are top perspective views illustrating the print element board and FIGS. 32C and 32D are diagrams illustrating pressure distributions inside the first common supply passage and the first common collection passage.

As illustrated in FIG. 30, a print element board 4010 of the embodiment is formed in a parallelogram shape and an area between the end of the ejection opening row 3024 and the end of the print element board 4010 is small compared to the configuration of the print element board 3010 of the first embodiment illustrated in FIG. 27. In such a case, a driving circuit or a pad transmitting and receiving an electric signal to and from the outside and provided on the print element board 4010 is disposed on the long side of the print element board 4010. In the embodiment, such a print element board 4010 is used. Accordingly, even in the line head in which the plurality of print element boards 4010 are substantially disposed in one line shape instead of a zigzag shape, the ejection opening rows of the adjacent print element boards 4010 can overlap each other in the scan direction at the adjacent portion between the print element boards 4010. Here, the scan direction indicates a relative movement direction with respect to the medium in the liquid ejection head when a printing operation is performed on the medium by the liquid ejection head. Further, the substantial one row shape indicates a state where the adjacent print element boards 4010 partially overlap each other in both the scan direction and the longitudinal direction of the liquid ejection head (the arrangement direction of the print element board).

As illustrated in FIG. 30, in the second embodiment, the ejection opening 3013 is disposed to the vicinity of the end of the print element board 4010. As described above with reference to FIGS. 28A and 28B, in the first embodiment, the first communication opening 3315a or the first communication opening 3315b is disposed at a position overlapping the end of the print element board 3010 in the ejection opening row. However, in the second embodiment, it is difficult to dispose the first communication opening 3315a or the first communication opening 3315b at a position overlapping the end of the print element board 4010 in the ejection opening row due to a positional relation of the members differently from the first embodiment. Thus, as illustrated in FIG. 31, the first communication opening 3315a and the first communication opening 3315b are disposed at a position separated toward the center side in the row direction of the ejection opening row in relation to the end of the ejection opening row 3024.

The embodiment has a following configuration in order to suppress a temperature distribution inside the print element board 4010, a change in pressure of each pressure chamber (each passage), and a change in flow amount of the ink circulation flow between the pressure chambers (between the passages). That is, as illustrated in FIGS. 29H and 29J, the first communication opening 3315a is disposed at both end sides of the ejection opening row 3024 in the row direction.

FIGS. 32A to 32D are diagrams illustrating an example of a state where the liquid is ejected from the plurality of ejection openings. In FIGS. 32A and 32B, an arrow indicates a direction of the flow of the ink and each of ΔPin2, ΔPout2, ΔPin3, and ΔPout3 indicates the pressure loss generated in each passage. FIG. 32C illustrates a pressure distribution corresponding to the state of FIG. 32A and FIG. 32D illustrates a pressure distribution corresponding to the state of FIG. 32B. In FIGS. 32C and 32D, a solid line indicates a pressure inside the first common supply passage 3313 and a two-dotted chain line indicates a pressure inside the first common collection passage 3314.

As illustrated in FIG. 32A, in a case where the first communication opening 3315 at the end of the row direction of the ejection opening row is formed as the first communication opening 3315a, a differential pressure between the first common supply passage 3313 and the first common collection passage 3314 at the end of the ejection opening row 3024 is indicated by "ΔP2". Similarly, as illustrated in FIG. 32B, in a case where the first communication opening 3315 at the end of the row direction of the ejection opening row is formed as the communication opening 3315b, a differential pressure between the first common supply passage 3313 and the first common collection passage 3314 at the end of the ejection opening row 3024 is indicated by "ΔP3". At this time, following equations are established.

$$\Delta P2 = (Pin - \Delta Pin2) - (Pout - \Delta Pout2) = (Pin - Pout) + (\Delta Pout2 - \Delta Pin2) \quad \text{Equation (13)}$$

$$\Delta P3 = (Pin - \Delta Pin3) - (Pout - \Delta Pout3) = (Pin - Pout) - (\Delta Pin3 - \Delta Pout3) \quad \text{Equation (14)}$$

Here, the pressure loss satisfies a relation of ΔPout2>ΔPin2 and ΔPin3>ΔPout3 from a positional relation between the end of the ejection opening row and the first communication opening 3315 (the first communication opening 3315a and the first communication opening 3315b). Accordingly, the differential pressure ΔP2 becomes larger than an initial differential pressure (Pin-Pout) in the initial non-ejection state and the differential pressure ΔP3 becomes smaller than the initial differential pressure. When the differential pressure decreases, the amount of the ink circulation flow decreases and an effect of suppressing a modulation in color concentration or a decrease in ejection speed of the liquid droplet caused by the evaporation of moisture in the ejection opening decreases. Accordingly, an influence is larger than a case where the differential pressure increases. Thus, when the first communication opening 3315a is disposed at both ends of the ejection opening row 3024 in the row direction, an influence of a change in flow amount can be reduced.

Further, the pressure of the first communication opening 3315a is set to be higher than that of the first communication opening 3315b in order to generate the ink circulation flow. Accordingly, the ink can be easily supplied during the ink ejection operation. The first communication opening 3315a capable of easily supplying the ink is disposed in the vicinity of the end of the ejection opening row 3024. Accordingly, the pressure loss generated in the first common supply passage 3313 or the first common collection passage 3314 when the ink is ejected from the plurality of ejection openings can be adjusted to be smaller than that of the case where the ink the communication opening 3315b is disposed in the vicinity of the end of the ejection opening row 24.

Further, as illustrated in FIG. 30, in the embodiment, an area without the ejection opening (the print element) between the end of the print element board 4010 and each of both ends of the ejection opening row 3024 in the row direction in the print element board 4010 is small differently from the first embodiment.

In case of such a structure, heat generated by the ink ejection operation is restricted to be emitted from this area. On the contrary, a length of each of the first common supply passage 3313 and the first common collection passage 3314 from the first communication opening 3315a or the first communication opening 3315b to the end of the ejection opening row 3024 in the row direction increases. The ink which flows through the elongated passage easily receives heat from the print element board 4010. Then, there is a tendency that the temperatures at both ends of the ejection opening row 3024 in the row direction are higher than those of the other positions when the ink is ejected from the plurality of ejection openings 3013. Further, the pressure loss generated in each passage during the ink ejection operation increases due to the length of the passage. Accordingly, there is a tendency that the pressure at the end of the ejection opening row 3024 becomes uneven.

On the contrary, in the embodiment, the first communication opening 3315a is disposed at both ends of the ejection opening row 3024. Accordingly, a large amount of the ink is supplied from the first communication opening 3315a corresponding to the first communication opening 3315 disposed at a near position to the ejection opening 3013 in the vicinity of the end of the ejection opening row 3024 in the row direction compared to the amount of the ink supplied from the first communication opening 3315b. Thus, since the amount of the high-temperature ink supplied from the first communication opening 3315b decreases when the ink is ejected from the plurality of ejection openings 3013, an increase in temperature of the end of the ejection opening row 3024 can be reduced.

In this way, in the embodiment, when the first communication opening 3315a is disposed at both ends of the ejection opening row 3024 in the row direction, it is possible to suppress an influence of a change in flow amount, a change in pressure, or a temperature distribution inside a chip. Thus, since it is possible to suppress a change in ejection characteristic or to suppress a modulation in color concentration or a decrease in ejection speed of the liquid droplet caused by the evaporation of moisture in the ejection opening, it is possible to form a high-quality image with high accuracy.

Next, a temperature distribution in the entire print element board 4010 of the embodiment will be described with reference to FIGS. 39A to 39D. FIGS. 39A to 39D are graphs illustrating a temperature distribution when the ink is ejected from all ejection openings in the row direction of the ejection opening row 3024. The print element board 4010 is controlled at a temperature of 50° C.

A case will be described in which the flow amount of the ink ejected from the ejection opening is larger than the flow amount of the ink circulation flow. A direction of the ink circulation flow in the first communication opening 3315*a* and the first communication opening 3315*b* is directed toward the ejection opening 3013. Further, there is a tendency that the ink flow amount in the first communication opening 3315*a* and the first communication opening 3315*b* becomes larger than that of the first communication opening 3315*a*.

Figure 39A:
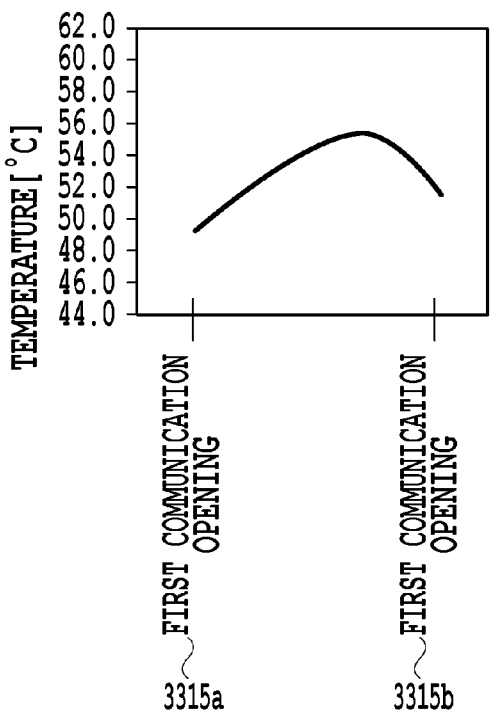
FIGS. 39A to 39D are diagrams illustrating a temperature distribution of the print element board according to the second embodiment.
Figure 39B:
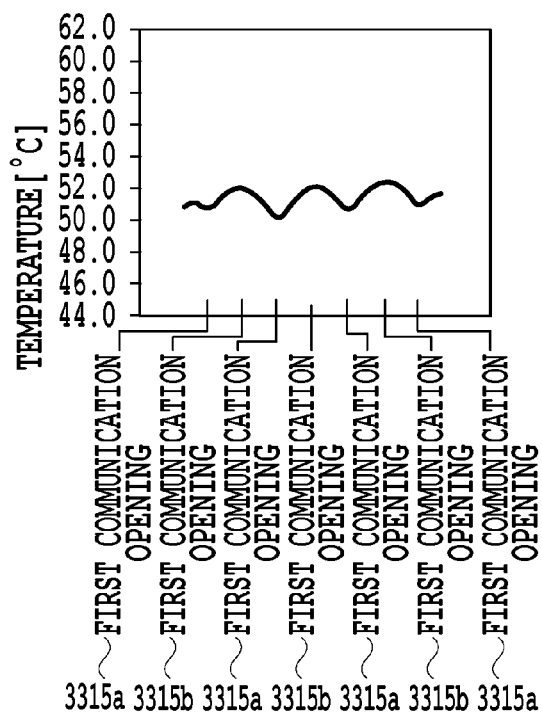

FIGS. 39A and 39B are graphs illustrating a relation of a temperature and a position between the first communication opening 3315*a* and the first communication opening 3315*b* in one ejection opening row 3024.

FIG. 39A illustrates a temperature distribution in a case where each of the first communication opening 3315*a* and the first communication opening 3315*b* is disposed at one position in one ejection opening row 3024 as a comparative example. Since the ink which flows through the first common supply passage 3313 and the first common collection passage 3314 receives heat from the print element board 4010, the temperature at the center portion of the passage separated from the communication opening increases. Further, when the temperatures of the first communication opening 3315*a* and the first communication opening 3315*b* are compared with each other, the temperature of the first communication opening 3315*a* is low due to a large flow amount of the ink circulation flow.

Additionally, even in a condition in which the ink does not flow reversely toward the ejection opening 3013 in the first communication opening 3315*b*, the ink which flows through the passage and receives heat from the print element board flows to the first communication opening 3315*b*. Accordingly, there is a tendency that the temperature near the first communication opening 3315*a* decreases.

FIG. 39B illustrates a temperature distribution in a case where the first communication opening 3315*a* and the first communication opening 3315*b* are alternately disposed at a plurality of positions in one ejection opening row of the embodiment.

In the embodiment, the first communication opening 3315*a* and the first communication opening 3315*b* are disposed at a plurality of positions. For that reason, a distance between the first communication opening 3315*a* and the first communication opening 3315*b* which are adjacent to each other is short compared to the comparative example of FIG. 39A. Thus, a length in which the ink flows through the first common supply passage 3313 and the first common collection passage 3314 becomes shortened and thus an increase in temperature of the ink due to the heat transmitted from the print element board while the ink flows through the passage is suppressed to be small. In this example, particularly, the temperature of the first communication opening 3315*b* is equal to the temperature of the first communication opening 3315*a*.

In the embodiment, since the first communication opening 3315*a* and the first communication opening 3315*b* are alternately arranged in respect to the row direction of the ejection opening row, a maximal length in which the ink passes through the first common supply passage 3313 and the first common collection passage 3314 becomes short. Accordingly, an increase in temperature of the ink caused by the heat transmitted from the print element board while the ink flows through the passage is suppressed to be small.

In this way, in the embodiment, since the first communication opening 3315*a* and the first communication opening 3315*b* are disposed alternately at a plurality of positions in one ejection opening row, it is possible to reduce a temperature difference inside the print element board 4010 compared to the comparative example illustrated in FIG. 39A. Thus, since it is possible to suppress a change in ejection characteristic, it is possible to form a high-quality image with high accuracy.

Figure 39C:
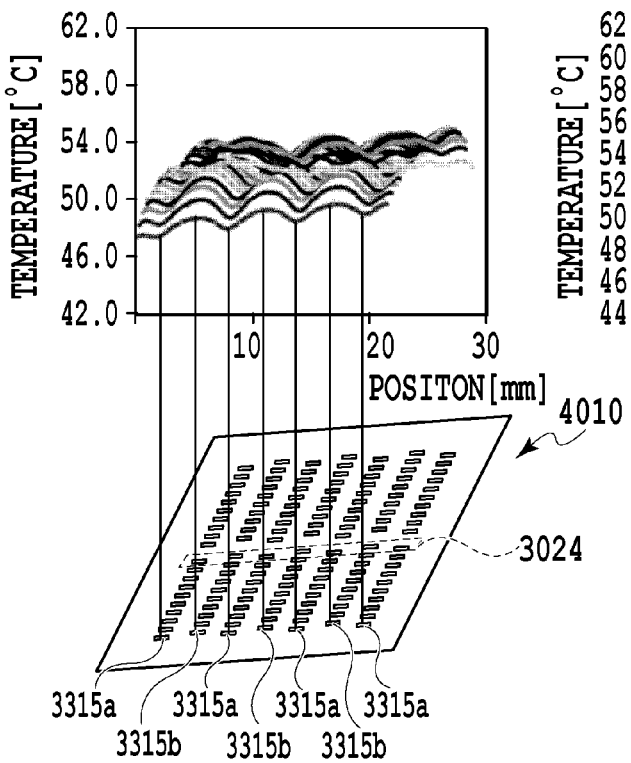

FIG. 39C illustrates a temperature distribution of the communication openings in each ejection opening row 3024 in a case where the first communication opening 3315*a* and the first communication opening 3315*b* in the plurality of ejection opening rows 3024 are deviated in accordance with a parallelogram shape of the print element board 4010. In the drawing, the ejection opening forming member and the ejection opening are not illustrated.

Although the absolute temperature values of the ejection opening rows are different from each other in accordance with the positions of the ejection opening rows, it is understood that a high-temperature position and a low-temperature position are deviated from each other in accordance with a positional deviation between the first communication opening 3315*a* and the first communication opening 3315*b* in the row direction of the ejection opening row among the plurality of ejection opening rows.

Figure 39D:
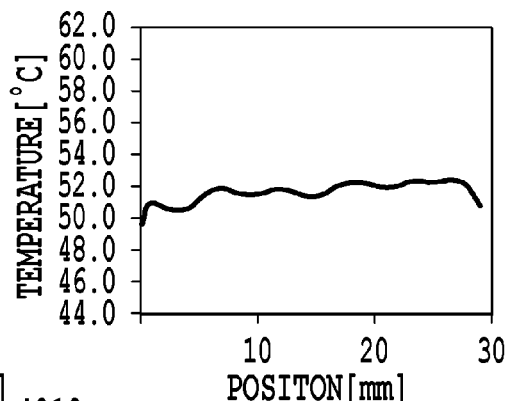

FIG. 39D is a graph illustrating an average of the temperature distribution of FIG. 39C in the arrangement direction of the plurality of ejection opening rows 3024. Since a high-temperature position and a low-temperature position in the ejection opening rows are deviated from each other, a temperature difference inside the print element board 4010 in the average state is smaller than a temperature difference of each of all ejection opening rows of FIG. 39C. Thus, when a print medium scan direction (a relative scan direction between the liquid ejection head and the print medium) is a direction (particularly, a vertical direction) intersecting the row direction of the ejection opening row 3024, an influence of a change in ejection characteristic caused by a temperature difference can equally divided.

In this way, in the embodiment, the positions of the first communication opening 3315*a* and the first communication opening 3315*b* in the row direction of the ejection opening row are deviated from each other between the ejection opening rows in the plurality of ejection opening rows. Accordingly, it is possible to equally adjust a temperature difference caused by a positional relation between the first communication opening 3315*a* and the first communication opening 3315*b*. Thus, since it is possible to suppress a change in ejection characteristic, it is possible to form a high-quality image with high accuracy.

(Third Embodiment)

FIGS. 33A to 33L are diagrams illustrating a liquid ejection head according to a third embodiment of the invention. The same reference numerals will be given to the same components as those of the above-described embodiment and the description thereof will be omitted. FIGS. 33A to 33L are exploded views illustrating a main part of the liquid ejection head according to the embodiment of the invention. FIGS. 33A to 33F are perspective views. FIGS. 33G to 33L are top views.

Figure 33A:
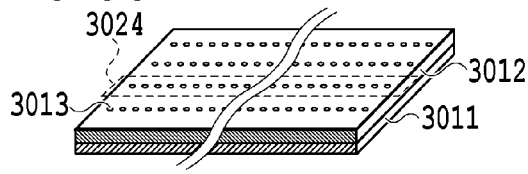
FIGS. 33A to 33L are exploded views illustrating a liquid ejection head according to a third embodiment of the invention.
Figure 33G:
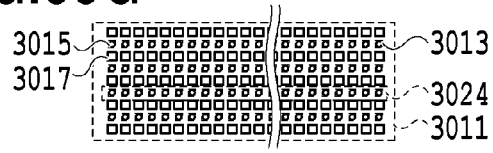
Figure 33B:
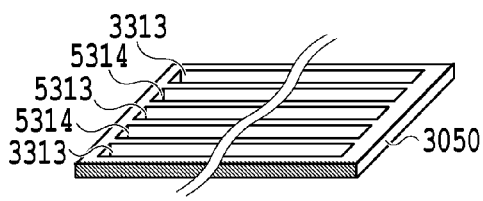
Figure 33H:
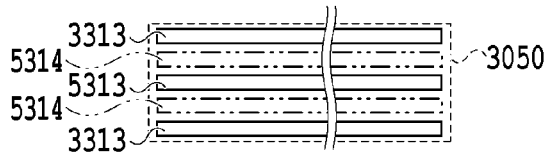
Figure 33C:
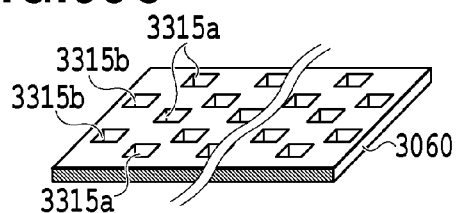
Figure 33I:
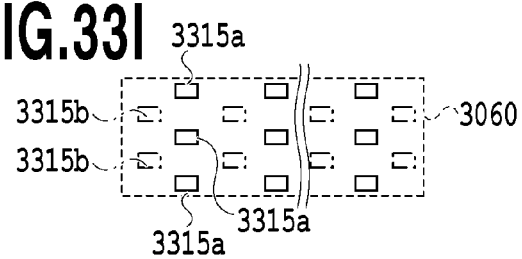
Figure 33D:
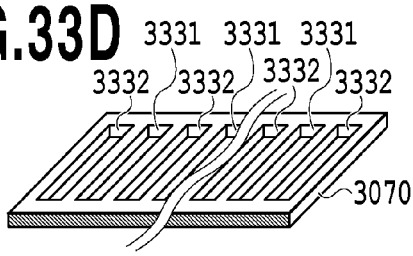
Figure 33J:
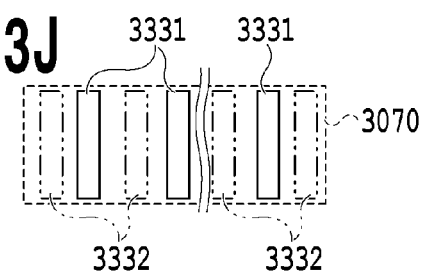
Figure 33E:
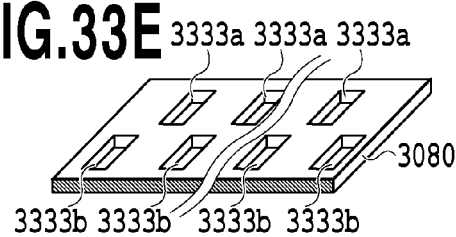
Figure 33K:
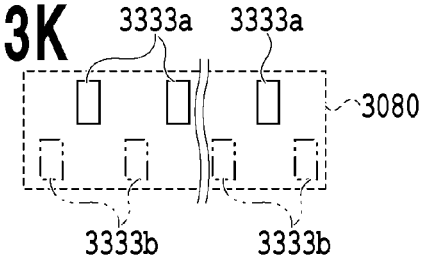
Figure 33F:
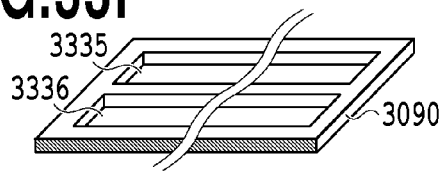
Figure 33L:
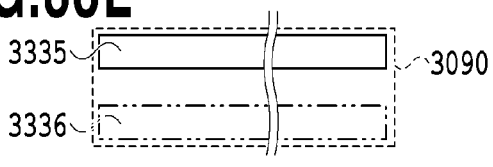

In the embodiment, as illustrated in FIGS. 33G and 33H, one first common supply passage 5313 communicates with the pressure chamber 3023 disposed at two ejection opening rows 3024. Similarly, one first common collection passage 5314 communicates with the pressure chamber 3023 disposed at two ejection opening rows 3024. That is, as illustrated in FIGS. 33G and 33H, one first common supply passage 5313 or one first common collection passage 5314 is positioned between two adjacent ejection opening rows 3024.

The embodiment is desirable due to the following reasons in addition to the effect of the first embodiment. That is, when the first common supply passage 5313 and the first common collection passage 5314 in two adjacent ejection opening rows are shared, the number of the partition walls between the passages can be decreased. Further, since the passage resistance is proportional to the square root of the passage width, Equation (1) can be established for two ejection opening rows at the passage width smaller than the passage widths of two first common supply passages 3313 or two first common collection passages 3314 of the first embodiment in the case of the same number N of the ejection openings. Further, since it is possible to decrease the passage resistance R of the first common supply passage 5313 or the first common collection passage 5314 of Equation (1) in one ejection opening row in the case of the same interval of the ejection opening rows, it is possible to increase the number N of the ejection openings.

Accordingly, it is possible to further densely dispose the ejection opening row 3024 compared to the above-described embodiment while further suppressing a change in pressure of each pressure chamber or a change in flow amount of the ink circulation flow in each pressure chamber. For that reason, it is possible to decrease the size (the chip size) of the print element board. Further, in a case where the ejection opening rows 3024 are disposed at the same density, it is possible to decrease the number of the first communication openings 3315a or the first communication openings 3315b while further suppressing a change in pressure between the pressure chambers or a change in flow amount of the ink circulation flow between the pressure chambers. Thus, it is possible to further simplify the passage structure of the liquid ejection head.

(Fourth Embodiment)

FIGS. 34A to 34M are diagrams illustrating a liquid ejection head according to a fourth embodiment of the invention. Here, the same reference numerals will be given to the same components as those of the above-described embodiment and the description thereof will be omitted. FIGS. 34A to 34M are exploded views illustrating a main part of the liquid ejection head of the embodiment of the invention. FIGS. 34A to 34G are perspective views. FIGS. 34H to 34M are top views.

As illustrated in FIGS. 34A to 34M, in the embodiment, an ejection opening 6051 for first ink and an ejection opening 6061 for second ink are disposed within one liquid ejection head in order to eject different colors or different types of ink. The first passage member 3050 is provided with a first common supply passage 6052 for the first ink, a first common supply passage 6062 for the second ink, a first common collection passage 6053 for the first ink, and a first common collection passage 6063 for the second ink. Further, the second passage member 3060 is provided with a first communication opening 6054a for the first ink, a first communication opening 6064a for the second ink, a first communication opening 6054b for the first ink, and a first communication opening 6064b for the second ink. Furthermore, the third passage member 3070 is provided with a second common supply passage 6056 for the first ink, a second common supply passage 6066 for the second ink, a second common collection passage 6057 for the first ink, and a second common collection passage 6067 for the second ink. Further, the fourth passage member 3080 is provided with a second communication opening 6058a for the first ink, a second communication opening 6068a for the second ink, a second communication opening 6058b for the first ink, and a second communication opening 6068b for the second ink. Then, the fifth passage member 3090 is provided with a third common supply passage 6070 for the first ink, a third common supply passage 6080 for the second ink, a third common collection passage 6071 for the second ink, and a third common collection passage 6081 for the second ink. Regarding the first and second inks, the ink which is supplied from the third common supply passages 6070 and 6080 flows out from the third common collection passages 6071 and 6081 through the pressure chamber 3024 (the passage 3310) similarly to the third embodiment.

Further, as in the third embodiment, one first common supply passage may communicate with the pressure chamber disposed at two ejection opening rows. Similarly, one first common collection passage may communicate with the pressure chamber disposed at two ejection opening rows.

Further, the third common supply passage 6070 and the third common collection passage 6071 for the first ink and the third common supply passage 6080 and the third common collection passage 6081 for the second ink may be formed in a size in which the sixth passage layer 3090 is larger than the print element board 3010. That is, the sixth passage layer 3090 may be formed widely in, for example, a direction (for example, a vertical direction) intersecting the row direction of the ejection opening row 3024.

Further, as in the embodiment, when a following configuration is employed in a case where different colors of liquids are ejected from one liquid ejection head, it is possible to decrease the size of the liquid ejection head while suppressing the colors of the liquids from being mixed with one another. Specifically, in FIGS. 34(c) and 34(i), a gap (a thickness of a wall dividing both passages) between the first common supply passage 6052 and the first common collection passage 6053 supplying the same color of the liquids can be appropriately smaller than a gap (a thickness of a wall dividing both passage) between the passages supplying different colors of the liquids. More specifically, a gap between the passages of the same color is set to be smaller than a gap between the first common supply passage 6052 supplying the liquid of the first ink and the first common collection passage 6053 collecting the liquid of the second ink and being adjacent thereto.

In this way, even in the liquid ejection head for a plurality of colors of inks or a plurality of kinds of inks, it is possible to suppress a change in pressure of each pressure chamber and a change in ink circulation amount between the pressure chambers without widening the widths of the first common supply passage and the first common collection passage. Thus, since it is possible to suppress a modulation in color concentration or a decrease in ejection speed of the liquid droplet caused by the evaporation of moisture in the ejection opening, it is possible to form a high-quality image with high accuracy.

(Fifth Embodiment)

FIGS. 35A to 35E are perspective views illustrating various liquid ejection heads of the invention.

Figure 35A:
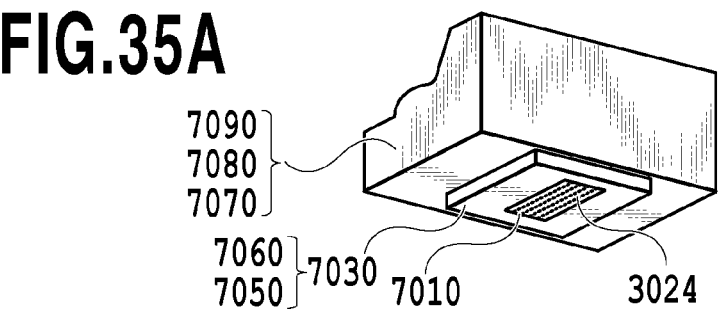
FIGS. 35A to 35E are overall views illustrating a liquid ejection head of the invention.

FIG. 35A illustrates an example of the liquid ejection head having one the print element board of the invention. The liquid ejection head prints an image while moving in a reciprocating manner with respect to the print medium. A fifth passage layer 7080 is disposed on a sixth passage layer 7090 and a fourth passage layer 7070 is disposed thereon. Further, a print element board 7010 including a third passage layer 7060 and a second passage layer 7050 is disposed on a support member 7030.

Figure 35B:
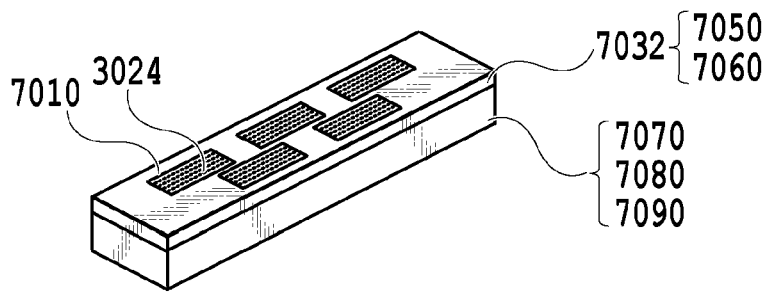
Figure 35C:
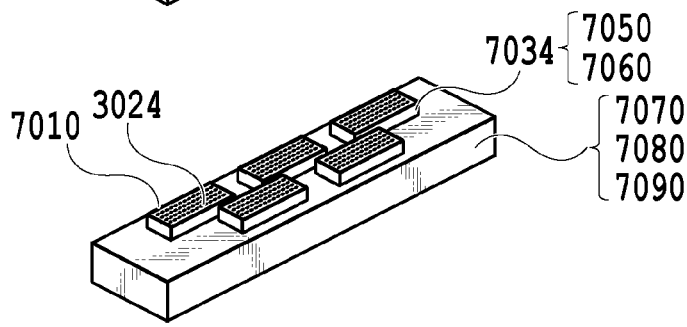

FIGS. 35B and 35C illustrate an example of the liquid ejection head corresponding to the line head in which the plurality of print element boards 7010 are disposed in a zigzag shape. In FIG. 35B, each print element board 7010 is disposed at a common support member 7032. Further, in FIG. 35C, each print element board 7010 is disposed at each individual support member 7034.

Figure 35D:
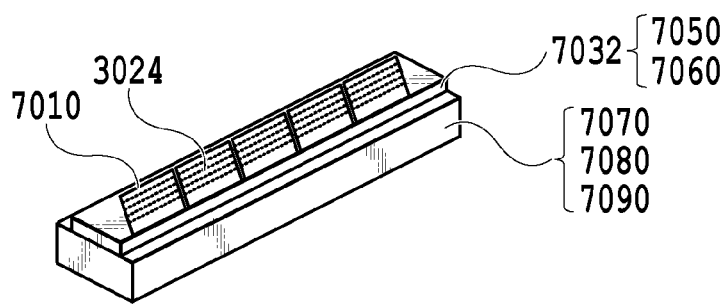
Figure 35E:
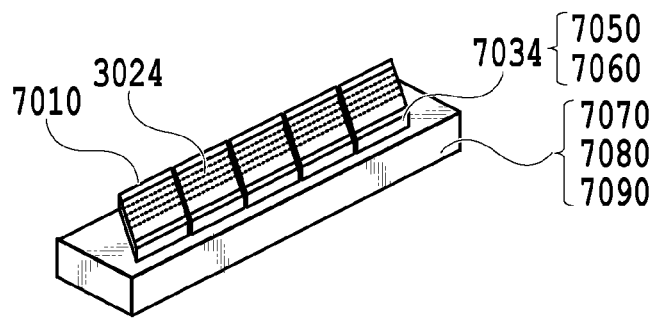

FIGS. 35D and 35E illustrate an example of the liquid ejection head which corresponds to the line head in which the plurality of print element boards 7010 are disposed in one row shape. In FIG. 35D, the print element boards 7010 are disposed on the common support member 7032. Further, in FIG. 35E, each print element board 7010 is disposed at each individual support member 7034. In this case, the print element board 7010 may have the same shape as that of the print element board 4010 of the fourth embodiment.

Various liquid ejection heads of the embodiment can generate the above-described ink circulation flow. Accordingly, it is possible to suppress a change in pressure of each pressure chamber or a change in ink circulation amount between the pressure chambers. Thus, since it is possible to suppress a modulation in color concentration or a decrease in ejection speed of the liquid droplet caused by the evaporation of moisture in the ejection opening, it is possible to form a high-quality image with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-003082 filed Jan. 8, 2016, and No. 2016-242619 filed Dec. 14, 2016, which are hereby incorporated by reference herein in their entirety.

What is claimed is:

1. A liquid ejection head comprising:
    an ejection opening row in which a plurality of ejection openings configured to eject a liquid are disposed in a first direction;
    a pressure chamber in which a print element configured to generate energy to be used to eject a liquid is disposed;
    a passage which communicates with the pressure chamber;
    a supply opening row in which a plurality of supply openings extending in a second direction intersecting a face provided with the print element and configured to supply a liquid to the passage are arranged in the first direction;
    a collection opening row in which a plurality of collection openings extending in the second direction and configured to collect a liquid from the passage are arranged in the first direction;
    a first common supply passage which extends in the first direction and is configured to supply a liquid to the supply opening row;
    a first common collection passage which extends in the first direction and is configured to collect a liquid from the collection opening row;
    a first supply side communication opening which extends in the second direction and is configured to supply a liquid to the first common supply passage;
    a first collection side communication opening which extends in the second direction and is configured to collect a liquid from the first common collection passage;
    a substrate comprising the first common supply passage and the first common collection passage; and
    a lid member including the first supply side communication opening and the first collection side communication opening, the lid member being disposed on the substrate,
    wherein at least one of the first supply side communication opening and the first collection side communication opening is provided two or more in number.

2. The liquid ejection head according to claim 1,
    wherein the first supply side communication opening is provided two or more in number and a first supply side communication opening row having the plurality of first supply side communication openings arranged therein extends in the first direction.

3. The liquid ejection head according to claim 2,
    wherein an arrangement density of the plurality of first supply side communication openings included in the first supply side communication opening row is smaller than an arrangement density of the plurality of supply openings included in the supply opening row.

4. The liquid ejection head according to claim 1,
    wherein the first collection side communication opening is provided two or more in number and a first collection side communication opening row having the plurality of first collection side communication openings arranged therein extends in the first direction.

5. The liquid ejection head according to claim 4,
    wherein an arrangement density of the plurality of first collection side communication openings included in the first collection side communication opening row is smaller than an arrangement density of the plurality of collection openings included in the collection opening row.

6. The liquid ejection head according to claim 1,
    wherein the supply opening, the first common supply passage, and the first supply side communication opening are respectively formed at different substrates.

7. The liquid ejection head according to claim 1, further comprising:
    a second common supply passage which extends in a third direction intersecting the first direction and the second direction and communicates with the plurality of first supply side communication openings.

8. The liquid ejection head according to claim 7, further comprising:
    a plurality of second supply side communication openings which extend in the second direction and are configured to supply a liquid to the second common supply passage.

9. The liquid ejection head according to claim 8, further comprising:
    a third common supply passage which extends in the first direction and is configured to supply a liquid to the plurality of second supply side communication openings.

10. The liquid ejection head according to claim 8,
    wherein a second supply side communication opening row having the plurality of second supply side communication openings arranged therein extends in the first direction.

11. The liquid ejection head according to claim 10,
    wherein an arrangement density of the second supply side communication openings included in the second supply side communication opening row is smaller than an arrangement density of the plurality of first supply side communication openings included in a first supply side communication opening row having the plurality of first supply side communication openings arranged therein extending in the first direction.

12. The liquid ejection head according to claim 1, further comprising:
a second common collection passage which extends in a third direction intersecting the first direction and the second direction and communicates with the plurality of first collection side communication openings.

13. The liquid ejection head according to claim 12, further comprising:
a plurality of second collection side communication openings which extend in the second direction and are configured to collect a liquid from the second common collection passage.

14. The liquid ejection head according to claim 13, further comprising:
a third common collection passage which extends in the first direction and is configured to collect a liquid from the plurality of second collection side communication openings.

15. The liquid ejection head according to claim 13, wherein a second collection side communication opening row having the plurality of second collection side communication openings arranged therein extends in the first direction.

16. The liquid ejection head according to claim 15, wherein an arrangement density of the second collection side communication openings included in the second collection side communication opening row is smaller than an arrangement density of the plurality of first collection side communication openings included in a first collection side communication opening row having the plurality of first collection side communication openings arranged therein extending in the first direction.

17. The liquid ejection head according to claim 1, wherein the first supply side communication opening and the first collection side communication opening are alternately arranged in the first direction.

18. The liquid ejection head according to claim 1, wherein in a case where a passage resistance of the passage causing the supply opening and the collection opening to communicate with each other is indicated by "r", a passage resistance between the supply openings communicating with the first common supply passage and a passage resistance between the collection openings communicating with the first common collection passage are respectively indicated by "R", an average flow amount of a liquid flowing through the passage is indicated by "q", a flow amount difference between a maximal flow amount and a minimal flow amount not influencing ejection characteristics from the ejection opening is indicated by "Δq", a ratio Δq/q between q and Δq is indicated by "X", and the number of the ejection openings between the first supply side communication opening and the first collection side communication opening which are adjacent to each other is indicated by "N", a following equation is established:

$$N \leq 2\sqrt{\frac{r}{R} \times X}.$$

19. The liquid ejection head according to claim 18, wherein a value of X is 0.2 or less.

20. The liquid ejection head according to claim 1, wherein the first supply side communication opening is provided two or more in number with first supply side communication openings being disposed at both ends of the liquid ejection head in the first direction.

21. The liquid ejection head according to claim 1, wherein the first collection side communication opening is provided two or more in number with first collection side communication openings being disposed at both ends of the liquid ejection head in the first direction.

22. The liquid ejection head according to claim 21, wherein passage resistances of the first collection side communication openings disposed at both ends are larger than a passage resistance of the first communication opening disposed at a center of the liquid ejection head in the first direction.

23. The liquid ejection head according to claim 1, wherein the first common supply passage includes a first common supply passage supplying a first kind of liquid and a first common supply passage supplying a second kind of liquid, and
wherein the first common collection passage includes a first common collection passage collecting the first kind of liquid and a first common collection passage collecting the second kind of liquid.

24. The liquid ejection head according to claim 23, wherein a gap between the first common supply passage supplying the first kind of liquid and the first common collection passage collecting the first kind of liquid is smaller than a gap between the first common supply passage supplying the first kind of liquid and the first common collection passage collecting the second kind of liquid.

25. The liquid ejection head according to claim 1, wherein the liquid inside the pressure chamber is circulated to the outside of the pressure chamber.

26. A liquid ejection apparatus comprising:
a liquid ejection head comprising:
an ejection opening row in which a plurality of ejection openings configured to eject a liquid are disposed in a first direction,
a pressure chamber in which a print element configured to generate energy to be used to eject a liquid is disposed,
a passage which communicates with the pressure chamber,
a supply opening row in which a plurality of supply openings extending in a second direction intersecting a face provided with the print element and configured to supply a liquid to the passage are arranged in the first direction,
a collection opening row in which a plurality of collection openings extending in the second direction and configured to collect a liquid from the passage are arranged in the first direction,
a first common supply passage which extends in the first direction and is configured to supply a liquid to the supply opening row,
a first common collection passage which extends in the first direction and is configured to collect a liquid from the collection opening row,
a first supply side communication opening which extends in the second direction and is configured to supply a liquid to the first common supply passage, a first collection side communication opening which extends in the second direction and is configured to collect a liquid from the first common collection passage, a substrate comprising the first common supply passage and the first common collection passage; and a lid member including the first supply side communication opening and the first collection side communication opening, the lid member being disposed on the substrate, wherein at least one of the first supply side communication opening and the first collection side communication opening is provided two or more in number; and a supply unit configured to sequentially supply a liquid to the first supply side communication opening, the first common supply passage, the pressure chamber, the first common collection passage, and the first collection side communication opening.

27. A liquid ejection head including an ejection opening configured to eject a liquid, comprising:

a first substrate which includes a pressure chamber having a plurality of print elements configured to generate energy to be used to eject a liquid, a plurality of supply openings serving as through-holes configured to supply a liquid to the pressure chamber, and a plurality of collection openings serving as through-holes configured to collect a liquid from the pressure chamber;

a second substrate which includes a first common supply passage communicating with the plurality of supply openings and extending in a direction along a face provided with the print elements of the first substrate and a first common collection passage communicating with the plurality of collection openings and extending in the direction; and a lid member that includes a first supply side communication opening serving as a through-hole configured to supply a liquid to the first common supply passage and a first collection side communication opening serving as a through-hole configured to collect a liquid from the first common collection passage, wherein at least one of the first supply side communication opening and the first collection side communication opening is provided two or more in number.

28. A liquid ejection head including an ejection opening configured to eject a liquid, comprising:

a print element board which includes a pressure chamber having a plurality of print elements configure to generate energy to be used to eject a liquid, a plurality of supply openings serving as through-holes configured to supply a liquid to the pressure chamber, a plurality of collection openings serving as through-holes configured to collect a liquid from the pressure chamber, a first common supply passage communicating with the plurality of supply openings and extending in a direction along a face provided with the print elements, and a first common collection passage communicating with the plurality of collection openings and extending in the direction; and a lid member that includes a first supply side communication opening serving as a through-hole configured to supply a liquid to the first common supply passage and a first collection side communication opening serving as a through-hole configured to collect a liquid from the first common collection passage, wherein at least one of the first supply side communication opening and the first collection side communication opening is provided two or more in number.

29. The liquid ejection head according to claim 28, further comprising:

a print element row in which the print elements are disposed in a first direction, wherein both the first common supply passage and the first common collection passage extend in the first direction.

30. The liquid ejection head according to claim 28, further comprising:

a print element row in which the print elements are arranged in a first direction;

a supply opening row in which the plurality of supply openings are arranged in the first direction; and a collection opening row in which the plurality of collection openings are arranged in the first direction.

31. The liquid ejection head according to claim 28, further comprising:

a print element row in which the print elements are arranged in a first direction;

a first supply side communication opening row in which the plurality of first supply side communication openings are arranged in the first direction; and a first collection side communication opening row in which the plurality of first collection side communication openings are arranged in the first direction.

32. The liquid ejection head according to claim 31, wherein an arrangement density of the first supply side communication openings included in the first supply side communication opening row is smaller than an arrangement density of the supply openings included in a supply opening row in which the plurality of supply openings are arranged in the first direction, and wherein an arrangement density of the plurality of first collection side communication openings included in the first collection side communication opening row is smaller than an arrangement density of the plurality of collection passages included in a collection opening row in which the plurality of collection openings are arranged in the first direction.

33. The liquid ejection head according to claim 28, further comprising:

a support member that includes a second common supply passage supplying a liquid to the plurality of first supply side communication openings and extending in a direction along a face provided with the print elements and a direction intersecting the extension direction of the first common supply passage and a second common collection passage collecting a liquid from the plurality of first collection side communication openings and extending in a direction along a face provided with the print elements and a direction intersecting the extension direction of the first common collection passage.

34. The liquid ejection head according to claim 33, further comprising:

a first passage member that includes a plurality of second supply side communication openings serving as through-holes supplying a liquid to the second common supply passage and a plurality of second collection side communication openings serving as through-holes collecting a liquid from the second common collection passages.

35. The liquid ejection head according to claim 34, further comprising:

a second passage member that includes a third common supply passage supplying a liquid to the plurality of second supply side communication openings and extending in a direction along a face provided with the print elements of the print element board and a third common collection passage collecting a liquid from the plurality of second collection side communication openings and extending in a direction along a face provided with the print elements of the print element board.

36. The liquid ejection head according to claim 28, wherein the liquid inside the pressure chamber is circulated to the outside of the pressure chamber.

\* \* \* \* \*